US011797873B2

(12) United States Patent
King et al.

(10) Patent No.: US 11,797,873 B2
(45) Date of Patent: Oct. 24, 2023

(54) SCALABLE NEUTRAL ATOM BASED QUANTUM COMPUTING

(71) Applicant: Atom Computing Inc., Berkeley, CA (US)

(72) Inventors: Jonathan King, Berkeley, CA (US); Benjamin Bloom, Berkeley, CA (US); Brian Lester, Berkeley, CA (US)

(73) Assignee: Atom Computing Inc., Berkeley, CA (US)

( * ) Notice: Subject to any disclaimer, the term of this patent is extended or adjusted under 35 U.S.C. 154(b) by 512 days.

(21) Appl. No.: 17/143,030

(22) Filed: Jan. 6, 2021

(65) Prior Publication Data

US 2021/0272006 A1     Sep. 2, 2021

Related U.S. Application Data

(63) Continuation of application No. PCT/US2020/067740, filed on Dec. 31, 2020.
(Continued)

(51) Int. Cl.
*G06N 10/00* (2022.01)
*G02F 1/33* (2006.01)
*G06E 3/00* (2006.01)

(52) U.S. Cl.
CPC .............. *G06N 10/00* (2019.01); *G02F 1/33* (2013.01); *G06E 3/00* (2013.01)

(58) Field of Classification Search
CPC .......... G06N 10/00; G06N 5/01; G06N 20/00; G06N 10/20; G06N 10/40; G06N 10/60;
(Continued)

(56) References Cited

U.S. PATENT DOCUMENTS 4,225,938 A     9/1980  Turpin
4,320,300 A     3/1982  Mariella, Jr.
(Continued)

FOREIGN PATENT DOCUMENTS

CN     113808774 A     12/2021
CN     216119577 U      3/2022
(Continued)

OTHER PUBLICATIONS

Schlosser et al. Scalable architecture for quantum information processing with atoms in optical micro-structures. Quantum Inf Process (2011) 10:907-924 DOI 10.1007/s11128-011-0297-z. (Year: 2011).*

(Continued)

*Primary Examiner* — Collin X Beatty
(74) *Attorney, Agent, or Firm* — WILSON SONSINI GOODRICH & ROSATI

(57) ABSTRACT

The present disclosure provides methods and systems for performing non-classical computations. The methods and systems generally use a plurality of spatially distinct optical trapping sites to trap a plurality of atoms, one or more electromagnetic delivery units to apply electromagnetic energy to one or more atoms of the plurality to induce the atoms to adopt one or more superposition states of a first atomic state and a second atomic state, one or more entanglement units to quantum mechanically entangle at least a subset of the one or more atoms in the one or more superposition states with at least another atom of the plurality, and one or more readout optical units to perform measurements of the superposition states to obtain the non-classical computation.

24 Claims, 29 Drawing Sheets

Related U.S. Application Data

(60) Provisional application No. 62/984,205, filed on Mar. 2, 2020.

(58) Field of Classification Search
CPC .. G02F 1/33; G06E 3/00; B82Y 20/00; B82Y 10/00
See application file for complete search history.

(56) References Cited

U.S. PATENT DOCUMENTS

| | | | |
|---|---|---|---|
| 4,335,938 A | 6/1982 | Giglia et al. | |
| 6,548,809 B2 | 4/2003 | Bouyer et al. | |
| 6,751,009 B2 | 6/2004 | Khoshnevisan et al. | |
| 6,930,318 B2 | 8/2005 | Vion et al. | |
| 6,943,368 B2 | 9/2005 | Amin et al. | |
| 6,979,822 B1 | 12/2005 | Stewart et al. | |
| 6,995,840 B2 | 2/2006 | Hagler | |
| 7,018,852 B2 | 3/2006 | Wu et al. | |
| 7,109,593 B2 | 9/2006 | Freedman et al. | |
| 7,126,112 B2 | 10/2006 | Anderson et al. | |
| 7,133,173 B2 | 11/2006 | Beausoleil, Jr. et al. | |
| 7,277,872 B2 | 10/2007 | Raussendorf et al. | |
| 7,364,923 B2 | 4/2008 | Lidar et al. | |
| 7,398,162 B2 | 7/2008 | Downs et al. | |
| 7,411,181 B2 | 8/2008 | Plewa et al. | |
| 7,451,292 B2 | 11/2008 | Routt | |
| 7,483,142 B2 | 1/2009 | Kent et al. | |
| 7,560,726 B2 | 7/2009 | Beausoleil et al. | |
| 7,769,173 B2 | 8/2010 | Munro et al. | |
| 7,777,177 B2 | 8/2010 | Klotzer | |
| 7,778,951 B2 | 8/2010 | Gilbert et al. | |
| 7,791,780 B2 | 9/2010 | Munro et al. | |
| 7,836,007 B2 | 11/2010 | Beausoleil et al. | |
| 7,955,551 B2 | 6/2011 | McBride et al. | |
| 8,080,778 B2 | 12/2011 | McBride | |
| 8,174,742 B2 | 5/2012 | Roichman et al. | |
| 8,237,105 B1 | 8/2012 | Bulatowicz et al. | |
| 8,373,112 B2 | 2/2013 | Bouyer et al. | |
| 8,374,994 B2 | 2/2013 | Roshen et al. | |
| 8,405,021 B2 | 3/2013 | Anderson et al. | |
| 8,415,162 B2 | 4/2013 | Cerda et al. | |
| 8,415,612 B2 | 4/2013 | McBride et al. | |
| 8,488,232 B2 | 7/2013 | Nakamura et al. | |
| 8,817,254 B2 | 8/2014 | Santori et al. | |
| 8,832,164 B2 | 9/2014 | Allen et al. | |
| 8,849,580 B2 | 9/2014 | Kauffman et al. | |
| 8,860,515 B2 | 10/2014 | Aoyama et al. | |
| 8,913,900 B2 | 12/2014 | Lukin et al. | |
| 8,941,053 B1 | 1/2015 | Biedermann et al. | |
| 9,007,088 B2 | 4/2015 | Liao et al. | |
| 9,086,429 B1 | 7/2015 | Biedermann et al. | |
| 9,117,563 B2 | 8/2015 | Hughes et al. | |
| 9,317,473 B2 | 4/2016 | Yao et al. | |
| 9,355,750 B2 | 5/2016 | Saffman et al. | |
| 9,443,200 B2 | 9/2016 | Schroff | |
| 9,506,868 B2 | 11/2016 | Boufendi et al. | |
| 9,543,052 B2 | 1/2017 | Jackson | |
| 9,564,734 B2 | 2/2017 | Blauvelt et al. | |
| 9,841,375 B2 | 12/2017 | Chen et al. | |
| 9,858,531 B1 | 1/2018 | Monroe et al. | |
| 9,934,469 B1* | 4/2018 | Jau | G06N 10/00 |
| 9,958,710 B1 | 5/2018 | Morse et al. | |
| 9,960,025 B1 | 5/2018 | Hughes | |
| 9,960,026 B1 | 5/2018 | Hughes | |
| 10,056,908 B2 | 8/2018 | Rigetti et al. | |
| 10,069,504 B2 | 9/2018 | Maki | |
| 10,096,376 B2 | 10/2018 | Benjamin et al. | |
| 10,102,479 B2 | 10/2018 | Tucci | |
| 10,103,463 B1 | 10/2018 | Hughes | |
| 10,192,168 B2 | 1/2019 | Rigetti et al. | |
| 10,278,275 B2 | 4/2019 | Imhof | |
| 10,311,370 B2 | 6/2019 | Bravyi et al. | |
| 10,339,466 B1 | 7/2019 | Ding et al. | |
| 10,352,992 B1 | 7/2019 | Zeng et al. | |
| 10,460,918 B2 | 10/2019 | Hughes | |
| 10,473,943 B1 | 11/2019 | Hughes | |
| 10,504,033 B1 | 12/2019 | King et al. | |
| 10,531,554 B2 | 1/2020 | Imhof | |
| 10,559,392 B1 | 2/2020 | Saffman | |
| 10,613,319 B2 | 4/2020 | Mihailovich et al. | |
| 10,629,417 B1 | 4/2020 | Hughes et al. | |
| 10,648,934 B2 | 5/2020 | Kim et al. | |
| 10,676,350 B2 | 6/2020 | Hughes | |
| 10,712,406 B2 | 7/2020 | Lukin et al. | |
| 10,755,831 B2 | 8/2020 | Anderson | |
| 10,809,177 B2 | 10/2020 | Cooper-Roy et al. | |
| 10,975,852 B2 | 4/2021 | Hughes | |
| 11,002,777 B2 | 5/2021 | Salim et al. | |
| 11,033,981 B2* | 6/2021 | Amini | B23K 26/064 |
| 11,069,790 B2 | 7/2021 | Anderson et al. | |
| 11,120,360 B2 | 9/2021 | Kim et al. | |
| 2006/0179029 A1 | 8/2006 | Vala et al. | |
| 2010/0140458 A1 | 6/2010 | Meyers et al. | |
| 2010/0200739 A1 | 8/2010 | Anderson et al. | |
| 2011/0276526 A1 | 11/2011 | Turbin et al. | |
| 2012/0319085 A1 | 12/2012 | Gambetta et al. | |
| 2015/0000644 A1 | 1/2015 | Freeman | |
| 2016/0125311 A1 | 5/2016 | Fuechsle et al. | |
| 2016/0321559 A1 | 11/2016 | Rose et al. | |
| 2017/0140298 A1 | 5/2017 | Wabnig et al. | |
| 2017/0214410 A1 | 7/2017 | Hincks et al. | |
| 2017/0255871 A1 | 9/2017 | Macready et al. | |
| 2017/0323195 A1 | 11/2017 | Crawford et al. | |
| 2017/0357539 A1 | 12/2017 | Dadashikelayeh et al. | |
| 2018/0096085 A1 | 4/2018 | Rubin | |
| 2018/0114138 A1 | 4/2018 | Monroe et al. | |
| 2018/0232652 A1 | 8/2018 | Curtis et al. | |
| 2018/0246851 A1 | 8/2018 | Zaribafiyan et al. | |
| 2018/0247217 A1 | 8/2018 | Heeres et al. | |
| 2018/0260730 A1 | 9/2018 | Reagor et al. | |
| 2018/0308007 A1 | 10/2018 | Amin et al. | |
| 2018/0341874 A1 | 11/2018 | Puri et al. | |
| 2019/0087743 A1 | 3/2019 | Heeres et al. | |
| 2019/0138928 A1 | 5/2019 | Monroe et al. | |
| 2019/0200445 A1 | 6/2019 | Imhof | |
| 2019/0205784 A1 | 7/2019 | Monroe et al. | |
| 2020/0023462 A1 | 1/2020 | Amini et al. | |
| 2020/0082291 A1* | 3/2020 | Debnath | G06N 10/00 |
| 2020/0103032 A1 | 4/2020 | Hughes | |
| 2020/0116623 A1* | 4/2020 | Cooper-Roy | G01N 21/6404 |
| 2020/0175411 A1 | 6/2020 | King et al. | |
| 2020/0185120 A1* | 6/2020 | Keesling Contreras | G02F 3/00 |
| 2020/0274554 A1 | 8/2020 | Aspuru-Guzik et al. | |
| 2020/0284862 A1 | 9/2020 | Lukin et al. | |
| 2020/0301241 A1* | 9/2020 | Duan | G02F 1/33 |
| 2020/0395726 A1 | 12/2020 | Lien et al. | |
| 2020/0402681 A1 | 12/2020 | Anderson et al. | |
| 2021/0049494 A1 | 2/2021 | King et al. | |
| 2021/0049495 A1 | 2/2021 | King et al. | |
| 2021/0072139 A1 | 3/2021 | Cooper-Roy et al. | |
| 2021/0166147 A1* | 6/2021 | Kim | G02F 3/00 |
| 2021/0255228 A1 | 8/2021 | Salim et al. | |
| 2021/0272005 A1 | 9/2021 | King et al. | |
| 2021/0279631 A1 | 9/2021 | Pichler et al. | |
| 2023/0237358 A1 | 7/2023 | King et al. | |

FOREIGN PATENT DOCUMENTS

| | | | |
|---|---|---|---|
| EP | 1310910 | A1 | 5/2003 |
| EP | 1130949 | B1 | 9/2005 |
| EP | 2941659 | B1 | 6/2021 |
| KR | 20120046121 | A | 5/2012 |
| WO | WO-2015178992 | A2 | 11/2015 |
| WO | WO-2016089711 | A1 | 6/2016 |
| WO | WO-2016111441 | A1 | 7/2016 |
| WO | WO-2016138378 | A1 | 9/2016 |
| WO | WO-2016161935 | A1 | 10/2016 |
| WO | WO-2016196005 | A1 | 12/2016 |
| WO | WO-2016205330 | A1 | 12/2016 |
| WO | WO-2017066695 | A1 | 4/2017 |
| WO | WO-2017151200 | A1 | 9/2017 |
| WO | WO-2017195114 | A1 | 11/2017 |
| WO | WO-2018033823 | A1 | 2/2018 |
| WO | WO-2018064535 | A1 | 4/2018 |

(56) References Cited

FOREIGN PATENT DOCUMENTS

| | | |
|---|---|---|
| WO | WO-2018147208 A1 | 8/2018 |
| WO | WO-2018236922 A1 | 12/2018 |
| WO | WO-2019014589 A1 | 1/2019 |
| WO | WO-2019018544 A1 | 1/2019 |
| WO | WO-2019021010 A1 | 1/2019 |
| WO | WO-2019055843 A1 | 3/2019 |
| WO | WO-2019092412 A1 | 5/2019 |
| WO | WO-2019094490 A1 | 5/2019 |
| WO | WO-2019117922 A1 | 6/2019 |
| WO | WO-2019117955 A1 | 6/2019 |
| WO | WO-2020102256 A1 | 5/2020 |
| WO | WO-2020172588 A1 | 8/2020 |
| WO | WO-2020205037 A1 | 10/2020 |
| WO | WO-2020236574 A1 | 11/2020 |
| WO | WO-2020253957 A1 | 12/2020 |
| WO | WO-2021007560 A1 | 1/2021 |
| WO | WO-2021048287 A1 | 3/2021 |
| WO | WO-2021055217 A1 | 3/2021 |
| WO | WO-2021165155 A1 | 8/2021 |
| WO | WO-2021178037 A1 | 9/2021 |
| WO | WO-2021178038 A1 | 9/2021 |
| WO | WO-2022251435 A1 | 12/2022 |
| WO | WO-2022256166 A2 | 12/2022 |

OTHER PUBLICATIONS

Benseny et al. Spatial non-adiabatic passage using geometric phases. EPJ Quantum 4(3):1-15 (2017).
PCT/US2020/067721 International Search Report and Written Opinion dated Mar. 25, 2021.
PCT/US2020/067740 International Search Report and Written Opinion dated Apr. 1, 2021.
International Application No. PCT/US2023/022780 filed on May 18, 2023.
International Application No. PCT/US2023/023897 filed on May 30, 2023.
Nielsen et al.: Quantum Computation and Quantum Information. Cambridge University Press 10th Anniversary Edition, pp. 1-704 (2010).
Pedersen: Neutral Atom Quantum Computing with Rydberg Blockade. Lundbeck Foundation Theoretical Center for Quantum System Research Department of Physics and Astronomy, University of Aarhus Denmark. PhD Thesis, pp. 1-127. (2008).
U.S. Appl. No. 16/676,317 Final Office Action dated Aug. 30, 2021.
U.S. Appl. No. 16/900,641 Final Office Action dated Aug. 30, 2021.
U.S. Appl. No. 16/900,644 Office Action dated Jul. 14, 2021.
Weiss et al.: Quantum computing with neutral atoms. Physics Today 70(7):44-50 doi:10.1063/PT.3.3626 (2017).
PCT/US2022/029464 International Search Report and Written Opinion dated Feb. 27, 2023.
Theis et al.: High-fidelity Rydberg-blockade entangling gate using shaped, analytic pulses. arXiv:1605.08891v3 [quant-ph] American Physical Society, Physical Review A. 94(3):1-7 (2016).
Wolfowicz et al.: Pulse Techniques for Quantum Information Processing. eMagRes 5:1515-1528. DOI:10.1002/9780470034590.emrstm1521 (2016).
Akerman et al. Universal gate-set for trapped-ion qubits using a narrow linewidth diode laser. New Journal of Physics 17(11):1-20 (2015).
Barredo et al. An atom-by-atom assembler of defect-free arbitrary 2d atomic arrays. Science 354(6315):1021-1023 (2016).
Beloy et al. Micromagic clock: microwave clock based on atoms in an engineered optical lattice. Phys. Rev. Lett. 102:120801 (2009).
Berry. Transitionless Quantum Driving. Journal of Physics A: Mathematical and Theoretical 42(36):365303 (2009).
Bloom et al. An optical lattice clock with accuracy and stability at the 10(-18) level. Nature 506:71-75 (2014).
Bowden et al. An adaptable dual species effusive source and Zeeman slower design demonstrated with Rb and Li. Review of Scientific Instruments 87(4):043111 (2016).
Butts et al. Efficient broadband Raman pulses for large-area atom interferometry. J. Opt. Soc. Am. B 30:922-927 (2013).
Carpentier et al. Preparation of a single atom in an optical microtrap. Laser Phys. Lett. 10:125501 (2013).
Covey et al. 2000 Times Repeated Imaging of Strontium Atoms in Clock-Magic Tweezer Arrays. Physical Review Letters 122(17):173201 (2019).
IBM Collaborating With Top Startups to Accelerate Quantum Computing. IBM Blog Research (2015). Available at: http://www.ibm.com/blogs/research/2018/04/ibm-startups-accelerate-quantum/. (10 pgs (Apr. 5, 2018).
Jau et al. Entangling Atomic Spins with a Strong Rydberg-Dressed Interaction. Nature Physics 12(1):71-74 (2016).
Jones et al. Fast quantum state control of a single trapped neutral atom. Phys. Rev. A 75:040301 (R) (2007).
Katori et al. Ultrastable Optical Clock with Neutral Atoms in an Engineered Light Shift Trap. Phys. Rev. Lett. 91:173005 (2003).
Keating et al. Robust Quantum Logic in Neutral Atoms via Adiabatic Rydberg Dressing. Physical Review A 91:012337 (2015).
Khaneja et al. Optimal Control of Coupled Spin Dynamics: Design of NMR Pulse Sequences by Gradient Ascent Algorithms. Journal of Magnetic Resonance 172(2), 296-305 (2005).
Kim et al. In situ single-atom array synthesis using dynamic holographic optical tweezers. Nat. Commun. 7:13317 (2016).
King et al. Room-temperature in situ nuclear spin hyperpolarization from optically pumped nitrogen vacancy centres in diamond. Nat. Commun. 6:8965 (2015).
Kotru et al. Large-Area Atom Interferometry with Frequency-Swept Raman Adiabatic Passage. Phys. Rev. Lett. 115:103001 (2015).
Lee et al. Defect-Free Atomic Array Formation Using Hungarian Rearrangement Algorithm. Physical Review A 95:053424 (2017).
Levine et al. High-Fidelity Control and Entanglement of Rydberg-Atom Qubits. Physical Review Letters 121:123603 (2018).
Merrill et al. Progress in Compensating Pulse Sequences for Quantum Computation. Advances in Chemical Physics 154:241-294 (2014).
Mitra et al. Robust Mølmer-Sørenson Gate for Neutral Atoms Using Rapid Adiabatic Rydberg Dressing. Phys. Rev A 101:030301 (2020).
Muldoon et al. Control and manipulation of cold atoms in optical tweezers. New Journal of Physics 14(7):073051 (2012).
Nogrette et al. Single-Atom Trapping in Holographic 2D Arrays of Microtraps with Arbitrary Geometries. Physical Review X 4:021034 (2014).
Norcia et al. Microscopic control and detection of ultracold strontium in optical-tweezer arrays. Phys rev. 8:041054 (2018).
Papageorge et al. Coupling to modes of a near-confocal optical resonator using a digital light modulator. Opt. Express 24:11447-11457 (2016).
Parsons et al. Site-resolved imaging of fermionic A{6}Li in an optical lattice. Phys. Rev. Lett. 114:213002 (2015).
PCT/US2019/061029 International Search Report and Written Opinion dated Apr. 10, 2020.
Reagor et al. Demonstration of universal parametric entangling gates on a multi-qubit lattice. Sci Adv 4:eaao3603 (2018).
Saffman. Quantum computing with atomic qubits and Rydberg interactions: Progress and challenges. Journal of Physics B: Atomic, Molecular and Optical Physics 49(20):202001 (2016).
Theis et al., Counteracting Systems of Diabaticities Using DRAG Controls: The Status after 10 Years. Europhysics Letters 123(6):60001 (2018).
U.S. Appl. No. 16/676,317 Office Action dated Feb. 3, 2021.
U.S. Appl. No. 16/900,641 Office Action dated Jan. 25, 2021.
U.S. Appl. No. 16/900,644 Office Action dated Dec. 24, 2020.
Wang et al. Coherent Addressing of Individual Neutral Atoms in a 3D Optical Lattice. Phys. Rev. Lett. 115:043003 (2015).
Willems et al. Creating long-lived neutral-atom traps in a cryogenic environment. Phys. Rev. A 51:1403-1406 (1995).
Wineland. Nobel Lecture: Superposition, entanglement, and raising Schrodinger's cat. Rev. Mod. Phys. 85:1103-1114 (2013).
Yamaguchi. Metastable State of Ultracold and Quantum Degenerate Ytterbium Atoms: High-Resolution Spectroscopy and Cold Collisions. Thesis Kyoto University (3 pgs.) (2008).

(56) References Cited

OTHER PUBLICATIONS

Yamamoto et al. An ytterbium quantum gas microscope with narrow-line laser cooling. New J. Phys. 18:023016 (2016).
Bennetts et al.: Steady-State Magneto-Optical Trap with 100-Fold Improved Phase-Space Density. Phys Rev Lett. 119(22):223202, pp. 1-6. doi:10.1103/PhysRevLett.119.223202 (2017).
PCT/US2023/022780 Invitation to Pay Additional Fees dated Jul. 7, 2023.
U.S. Appl. No. 16/900,641 Non-Final Office Action dated Jul. 19, 2023.
Bluvstein et al.: A quantum processor based on coherent transport of entangled atom arrays. arXiv:2112.03923v1 [quant-ph], pp. 1-23 URL: https://arxiv.org/abs/2112.03923v1 (2021).
Brown et al.: Gray-molasses optical-tweezer loading: controlling collisions for scaling atom-array assembly. Phys. Rev. X 9, 011057, pp. 1-8 (2019).
Cai et al.: Monolithic bowtie cavity traps for ultra-cold gases. pre-Print arXiv:2011.01992v1 [cond-mat.quant-gas], pp. 1-15 DOI:10.1364/JOSAB.401262 (2020).
Deutsch et al.: Quantum computing with neutral atoms in an optical lattice. Fortschr. Physics 48(9-11):925-943 (2000).
EP Application No. 19883636.3 Extended European Search Report dated Aug. 10, 2022.
Graham et al.: Rydberg-Mediated Entanglement in a Two-Dimensional Neutral Atom Qubit Array. Phys Rev Lett. 123(23):230501, pp. 1-21 doi:10.1103/PhysRevLett. 123.230501 (2019).
Heinz et al.: Crossed optical cavities with large mode diameters. pre-Print arXiv:2011.01616v2 [cond-mat.quant-gas], pp. 1-5 DOI:10.1364/OL.414076 (2021).
Lester et al.: Raman cooling imaging: Detecting single atoms near their ground state of motion. Phys. Rev. A 90, 011804(R), pp. 1-5 arXiv:1405.6156v3 [physics.atom-ph] doi:https://arxiv.org/abs/1405.6156 (2014).
Levine et al.: Parallel Implementation of High-Fidelity Multiqubit Gates with Neutral Atoms. Phys Rev Lett. 123(17):170503, pp. 1-6 doi:10.1103/PhysRevLett.123.170503 (2019).
Lundblad: Designer atom arrays for quantum computing. Nature 561:43-44 doi:10.1038/d41586-018-06107-8 (2018).
Madjarov et al.: High-Fidelity Entanglement and Detection of Alkaline-Earth Rydberg Atoms. pre-Print arXiv:2001.04455v2 [physics.atom-ph] Nature Physics 16:857-861, pp. 1-16 DOI:10.1038/s41567-020-0903-z (2020).
Mitra et al.: Robust Mølmer-Sørenson gate for neutral atoms using rapid adiabatic Rydberg dressing. [arXiv:1911.04045v2 [quant-ph]] American Physical Society 101(3):030301, pp. 1-7 doi:10.1103/physreva.101.030301 (2020).
Nelson et al.: Imaging single atoms in a three-dimensional array. Nature Physics 3(8):556-560 DOI:10.1038/nphys645 (2007).
Pagano et al.: Fast and scalable quantum information processing with two-electron atoms in optical tweezer arrays. ArXiv pre-print arXiv:1808.02503v1 [quant-ph], pp. 1-14 doi:10.48550/arXiv.1808.02503 (2018).
PCT/US2022/031047 International Search Report and Written Opinion dated Sep. 29, 2022.
Schlosser et al.: Collisional blockade in microscopic optical dipole traps. Phys Rev Lett 89(2):023005, pp. 1-4 doi:10.1103/PhysRevLett.89.023005 (2002).
Schlosser et al.: Scalable architecture for quantum information processing with atoms in optical micro-structures. arXiv:1108.5136v1, Quantum Information Processing 10(6):907-924 doi:10.1007/s11128-011-0297-z (2011).
Smith et al.: A practical quantum instruction set architecture. arXiv preprint arXiv:1608.03355, pp. 1-15 (2016).
U.S. Appl. No. 16/676,317 Non-Final Office Action dated Mar. 23, 2022.
U.S. Appl. No. 16/900,641 Final Office Action dated Oct. 20, 2022.
U.S. Appl. No. 16/900,641 Non-Final Office Action dated Mar. 17, 2022.
U.S. Appl. No. 16/900,644 Non-Final Office Action dated Mar. 18, 2022.
Yang et al.: Site-resolved imaging of ultracold fermions in a triangular-lattice quantum gas microscope. PRX Quantum, American Physical Society 2(2):020344, pp. 1-9 DOI:10.1103/PRXQuantum.2.020344 (2021).
Wei et al., Determination of the coefficient of thermal expansion of ultra-low-expansion glass using an ultrasonic immersion testing method. Appl Opt. 62(13):3347-3356 (2023).

* cited by examiner

Fig. 9 Dichroic Mirrors: System of custom dichroic mirrors for overlapping four different colors in the objective.

Fig. 2 Qubit Scheme: Simplified energy level diagram showing the qubit levels ($m_F=-09/2$ and $m_F=-7/2$ within $^1S_0$) and the transitions used for single qubit, two-qubit, shelving, and imaging.

SCALABLE NEUTRAL ATOM BASED QUANTUM COMPUTING

CROSS-REFERENCE

This application is the by-pass continuation of International Application No. PCT/US2020/067740, filed on Dec. 31, 2020, which claims the benefit of U.S. Provisional Application No. 62/984,205, filed on Mar. 2, 2020, entitled "Scalable Neutral Atom Based Quantum Computing," the contents of each are incorporated herein by reference for all purposes.

STATEMENT AS TO FEDERALLY SPONSORED RESEARCH

This invention was made with the support of the United States Government under Small Business Innovation Research Grant Nos. 1843926 and 1951188 awarded by the National Science Foundation. The United States Government has certain rights in this invention.

BACKGROUND

Quantum computers typically make use of quantum-mechanical phenomena, such as superposition and entanglement, to perform operations on data. Quantum computers may be different from digital electronic computers based on transistors. For instance, whereas digital computers require data to be encoded into binary digits (bits), each of which is always in one of two definite states (0 or 1), quantum computation uses quantum bits (qubits), which can be in superpositions of states.

SUMMARY

Recognized herein is the need for methods and systems for performing non-classical computations.

The present disclosure provides systems and methods for utilizing atoms (such as neutral or uncharged atoms) to perform non-classical or quantum computations. The atoms may be optically trapped in large arrays. Quantum mechanical states of the atoms (such as hyperfine states or nuclear spin states of the atoms) may be configured to function as quantum bit (qubit) basis states. The qubit states may be manipulated through interaction with optical, radiofrequency, or other electromagnetic radiation, thereby performing the non-classical or quantum computations.

In an aspect, the present disclosure provides a system for performing a non-classical computation, comprising: a plurality of trapping sites configured to trap a plurality of atoms, which plurality of atoms correspond to a plurality of qubits; a light unit configured to provide a first light and a second light; a first optical modulator configured to receive the first light and direct the first light along a plurality of first light paths to at least a subset of trapping sites of the plurality of trapping sites, the at least the subset of trapping sites comprising at least two trapping sites; a second optical modulator configured to receive the second light and direct the second light along a plurality of second light paths to the at least the subset of trapping sites; and a controller operably coupled to the light unit, wherein the controller is configured to direct the light unit to emit the first light and to emit the second light to implement one or more qubit operations on at least a subset of atoms of the plurality of atoms trapped at the at least the subset of trapping sites, the at least the subset of atoms comprising at least two atoms.

In some embodiments, the first optical modulator and the second optical modulator are oriented such that a frequency difference between the first light and the second light is substantially constant at each trapping site of the at least the subset of trapping sites. In some embodiments, the plurality of first light paths comprise one or more first positive-order light paths and one or more first negative-order light paths and the plurality of second light paths comprise one or more second positive-order light paths and one or more second negative-order light paths. In some embodiments, the first positive-order light paths and the second negative-order light paths each terminate at the same trapping sites of the at least the subset of trapping sites or wherein the first negative-order light paths and the second positive-order light paths each terminate at the same trapping sites of the at least the subset of trapping sites. In some embodiments, the first positive-order light paths are substantially parallel with the second negative-order light paths or wherein the first negative-order light paths are substantially parallel with the second positive-order light paths. In some embodiments, the first positive-order light paths and the second positive-order light paths each terminate at the same trapping sites of the at least the subset of trapping sites or wherein the first negative-order light paths and the second negative-order light paths each terminate at the same trapping sites of the at least the subset of trapping sites. In some embodiments, the first optical modulator or the second optical modulator comprises an acousto-optic deflector (AOD). In some embodiments, the first optical modulator or the second optical modulator comprises a two-dimensional (2D) AOD. In some embodiments, the first optical modulator or the second optical modulator comprises a pair of crossed one-dimensional (1D) AODs. In some embodiments, the one or more qubit operations comprise one or more single-qubit operations. In some embodiments, the one or more single-qubit operations comprise one or more single-qubit gate operations. In some embodiments, the one or more qubit operations comprise one or more two-qubit operations. In some embodiments, the one or more two-qubit operations comprise one or more two-qubit gate operations. In some embodiments, the one or more qubit operations comprise multi-qubit operations. In some embodiments, the one or more qubit operations comprise one or more multi-qubit gate operations. In some embodiments, a first wavelength of the first light is different from a second wavelength of the second light. In some embodiments, a first wavelength of the first light is the same as a second wavelength of the second light. In some embodiments, the one or more qubit operations comprise one or more two-photon excitations of the at least the subset of atoms. In some embodiments, the one or more qubit operations comprise one or more Rydberg excitations of the at least the subset of atoms. In some embodiments, the first light and the second light arrive at the at least the at least the subset of trapping sites substantially simultaneously. In some embodiments, the first light and the second light overlap at each trapping site of the at least the subset of trapping sites. In some embodiments, the plurality of atoms comprises a 2D array of atoms. In some embodiments, the at least the subset of atoms comprises a one-dimensional (1D) line of atoms of the 2D array of atoms. In some embodiments, the plurality of atoms comprises a three-dimensional (3D) array of atoms. In some embodiments, the at least the subset of atoms comprises a 1D line of atoms of the 3D array of atoms. In some embodiments, the at least the subset of atoms comprises a 2D array of atoms of the 3D array of atoms. The system of claim 1, further comprising one or more phase modulators or wavelength modulators configured to modulate a phase or a wavelength of the first light or the second light. In some embodiments, the one or more phase modulators or wavelength modulators are located between the light unit and the first optical modulator or between the light unit and the second optical modulator. In some embodiments, the one or more phase modulators or wavelength modulators comprise one or more members selected from the group consisting of: electro-optic modulators (EOMs) and acousto-optic modulators (AOMs). In some embodiments, the light unit comprises a single light source configured to emit light and one or more beamsplitters configured to receive the light and to split the light into the first light and the second light. In some embodiments, the light unit comprises a first light source configured to emit the first light and a second light source configured to emit the second light. In some embodiments, the at least the subset of trapping sites comprises all trapping sites of the plurality of trapping sites.

In another aspect, the present disclosure provides a method for performing a non-classical computation, comprising: (a) activating a non-classical computation unit comprising: (i) a plurality of trapping sites; (ii) a light unit; (ii) a first optical modulator; and (iv) a second optical modulator; (b) using the plurality of trapping sites to trap a plurality of atoms, which plurality of atoms correspond to a plurality of qubits; (c) using the light unit to provide a first light and a second light; (d) using the first optical modulator to receive the first light and to direct the first light along a plurality of first light paths to at least a subset of trapping sites of the plurality of trapping sites, the at least the subset of trapping sites comprising at least two trapping sites; (e) using the second optical modulator to receive the second light and to direct the second light along a plurality of light paths to the at least the subset of trapping sites; and (f) using the first light and the second light to implement one or more qubit operations on at least a subset of atoms of the plurality of atoms trapped at the at least the subset of trapping sites, the at least the subset of atoms comprising at least two atoms Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
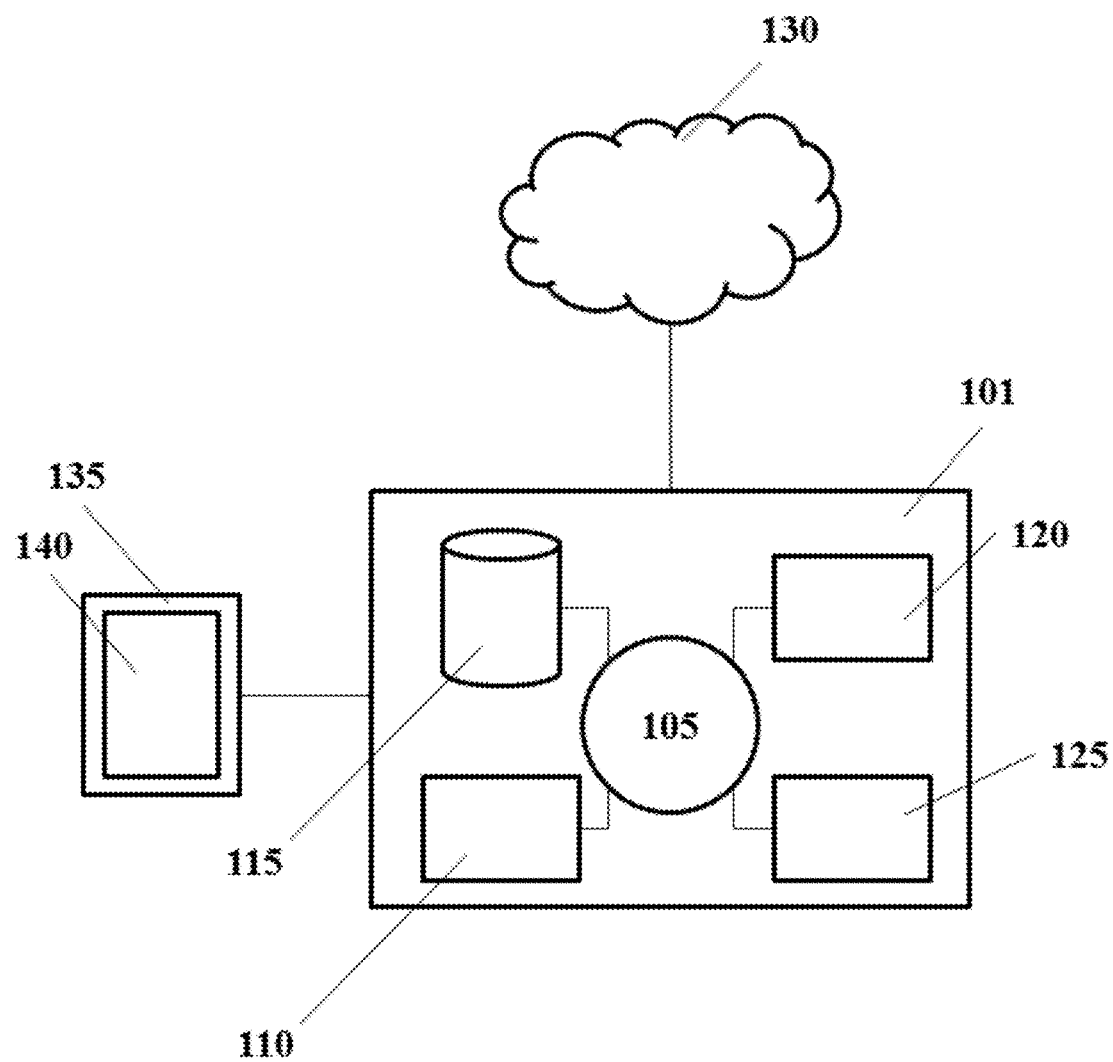
FIG. 1 shows a computer control system that is programmed or otherwise configured to implement methods provided herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein, like characters refer to like elements.

As used herein, the terms "artificial intelligence," "artificial intelligence procedure", "artificial intelligence operation," and "artificial intelligence algorithm" generally refer to any system or computational procedure that takes one or more actions to enhance or maximize a chance of successfully achieving a goal. The term "artificial intelligence" may include "generative modeling," "machine learning" (ML), and/or "reinforcement learning" (RL).

As used herein, the terms "machine learning," "machine learning procedure," "machine learning operation," and "machine learning algorithm" generally refer to any system or analytical and/or statistical procedure that progressively improves computer performance of a task. Machine learning may include a machine learning algorithm. The machine learning algorithm may be a trained algorithm. Machine learning (ML) may comprise one or more supervised, semi-supervised, or unsupervised machine learning techniques. For example, an ML algorithm may be a trained algorithm that is trained through supervised learning (e.g., various parameters are determined as weights or scaling factors). ML may comprise one or more of regression analysis, regularization, classification, dimensionality reduction, ensemble learning, meta learning, association rule learning, cluster analysis, anomaly detection, deep learning, or ultra-deep learning. ML may comprise, but is not limited to: k-means, k-means clustering, k-nearest neighbors, learning vector quantization, linear regression, non-linear regression, least squares regression, partial least squares regression, logistic regression, stepwise regression, multivariate adaptive regression splines, ridge regression, principle component regression, least absolute shrinkage and selection operation, least angle regression, canonical correlation analysis, factor analysis, independent component analysis, linear discriminant analysis, multidimensional scaling, non-negative matrix factorization, principal components analysis, principal coordinates analysis, projection pursuit, Sammon mapping, t-distributed stochastic neighbor embedding, AdaBoosting, boosting, gradient boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, or generative adversarial networks.

As used herein, the terms "reinforcement learning," "reinforcement learning procedure," "reinforcement learning operation," and "reinforcement learning algorithm" generally refer to any system or computational procedure that takes one or more actions to enhance or maximize some notion of a cumulative reward to its interaction with an environment. The agent performing the reinforcement learning (RL) procedure may receive positive or negative reinforcements, called an "instantaneous reward", from taking one or more actions in the environment and therefore placing itself and the environment in various new states.

A goal of the agent may be to enhance or maximize some notion of cumulative reward. For instance, the goal of the agent may be to enhance or maximize a "discounted reward function" or an "average reward function". A "Q-function" may represent the maximum cumulative reward obtainable from a state and an action taken at that state. A "value function" and a "generalized advantage estimator" may represent the maximum cumulative reward obtainable from a state given an optimal or best choice of actions. RL may utilize any one of more of such notions of cumulative reward. As used herein, any such function may be referred to as a "cumulative reward function". Therefore, computing a best or optimal cumulative reward function may be equivalent to finding a best or optimal policy for the agent.

The agent and its interaction with the environment may be formulated as one or more Markov Decision Processes (MDPs). The RL procedure may not assume knowledge of an exact mathematical model of the MDPs. The MDPs may be completely unknown, partially known, or completely known to the agent. The RL procedure may sit in a spectrum between the two extents of "model-based" or "model-free"

with respect to prior knowledge of the MDPs. As such, the RL procedure may target large MDPs where exact methods may be infeasible or unavailable due to an unknown or stochastic nature of the MDPs.

The RL procedure may be implemented using one or more computer processors described herein. The digital processing unit may utilize an agent that trains, stores, and later on deploys a "policy" to enhance or maximize the cumulative reward. The policy may be sought (for instance, searched for) for a period of time that is as long as possible or desired. Such an optimization problem may be solved by storing an approximation of an optimal policy, by storing an approximation of the cumulative reward function, or both. In some cases, RL procedures may store one or more tables of approximate values for such functions. In other cases, RL procedure may utilize one or more "function approximators".

Examples of function approximators may include neural networks (such as deep neural networks) and probabilistic graphical models (e.g. Boltzmann machines, Helmholtz machines, and Hopfield networks). A function approximator may create a parameterization of an approximation of the cumulative reward function. Optimization of the function approximator with respect to its parameterization may consist of perturbing the parameters in a direction that enhances or maximizes the cumulative rewards and therefore enhances or optimizes the policy (such as in a policy gradient method), or by perturbing the function approximator to get closer to satisfy Bellman's optimality criteria (such as in a temporal difference method).

During training, the agent may take actions in the environment to obtain more information about the environment and about good or best choices of policies for survival or better utility. The actions of the agent may be randomly generated (for instance, especially in early stages of training) or may be prescribed by another machine learning paradigm (such as supervised learning, imitation learning, or any other machine learning procedure described herein). The actions of the agent may be refined by selecting actions closer to the agent's perception of what an enhanced or optimal policy is. Various training strategies may sit in a spectrum between the two extents of off-policy and on-policy methods with respect to choices between exploration and exploitation.

As used herein, the terms "non-classical computation," "non-classical procedure," "non-classical operation," any "non-classical computer" generally refer to any method or system for performing computational procedures outside of the paradigm of classical computing. A non-classical computation, non-classical procedure, non-classical operation, or non-classical computer may comprise a quantum computation, quantum procedure, quantum operation, or quantum computer.

As used herein, the terms "quantum computation," "quantum procedure," "quantum operation," and "quantum computer" generally refer to any method or system for performing computations using quantum mechanical operations (such as unitary transformations or completely positive trace-preserving (CPTP) maps on quantum channels) on a Hilbert space represented by a quantum device. As such, quantum and classical (or digital) computation may be similar in the following aspect: both computations may comprise sequences of instructions performed on input information to then provide an output. Various paradigms of quantum computation may break the quantum operations down into sequences of basic quantum operations that affect a subset of qubits of the quantum device simultaneously. The quantum operations may be selected based on, for instance, their locality or their ease of physical implementation. A quantum procedure or computation may then consist of a sequence of such instructions that in various applications may represent different quantum evolutions on the quantum device. For example, procedures to compute or simulate quantum chemistry may represent the quantum states and the annihilation and creation operators of electron spin-orbitals by using qubits (such as two-level quantum systems) and a universal quantum gate set (such as the Hadamard, controlled-not (CNOT), and π/8 rotations) through the so-called Jordan-Wigner transformation or Bravyi-Kitaev transformation.

Additional examples of quantum procedures or computations may include procedures for optimization such as quantum approximate optimization algorithm (QAOA) or quantum minimum finding. QAOA may comprise performing rotations of single qubits and entangling gates of multiple qubits. In quantum adiabatic computation, the instructions may carry stochastic or non-stochastic paths of evolution of an initial quantum system to a final one.

Quantum-inspired procedures may include simulated annealing, parallel tempering, master equation solver, Monte Carlo procedures and the like. Quantum-classical or hybrid algorithms or procedures may comprise such procedures as variational quantum eigensolver (VQE) and the variational and adiabatically navigated quantum eigensolver (VanQver).

A quantum computer may comprise one or more adiabatic quantum computers, quantum gate arrays, one-way quantum computers, topological quantum computers, quantum Turing machines, quantum annealers, Ising solvers, or gate models of quantum computing.

As used herein, the term "adiabatic" refers to any process performed on a quantum mechanical system in which the parameters of the Hamiltonian are changed slowly in comparison to the natural timescale of evolution of the system.

As used herein, the term "non-adiabatic" refers to any process performed quantum mechanical system in which the parameters of the Hamiltonian are changed quickly in comparison to the natural timescale of evolution of the system or on a similar timescale as the natural timescale of evolution of the system.

Systems for Performing a Non-Classical Computation

In an aspect, the present disclosure provides a system for performing a non-classical computation. The system may comprise: one or more optical trapping units configured to generate a plurality of spatially distinct optical trapping sites, the plurality of optical trapping sites configured to trap a plurality of atoms, the plurality of atoms comprising greater than 60 atoms; one or more electromagnetic delivery units configured to apply electromagnetic energy to one or more atoms of the plurality of atoms, thereby inducing the one or more atoms to adopt one or more superposition states of a first atomic state and at least a second atomic state that is different from the first atomic state; one or more entanglement units configured to quantum mechanically entangle at least a subset of the one or more atoms in the one or more superposition states with at least another atom of the plurality of atoms; and or more readout optical units configured to perform one or more measurements of the one or more superposition state to obtain the non-classical computation.

Figure 2:
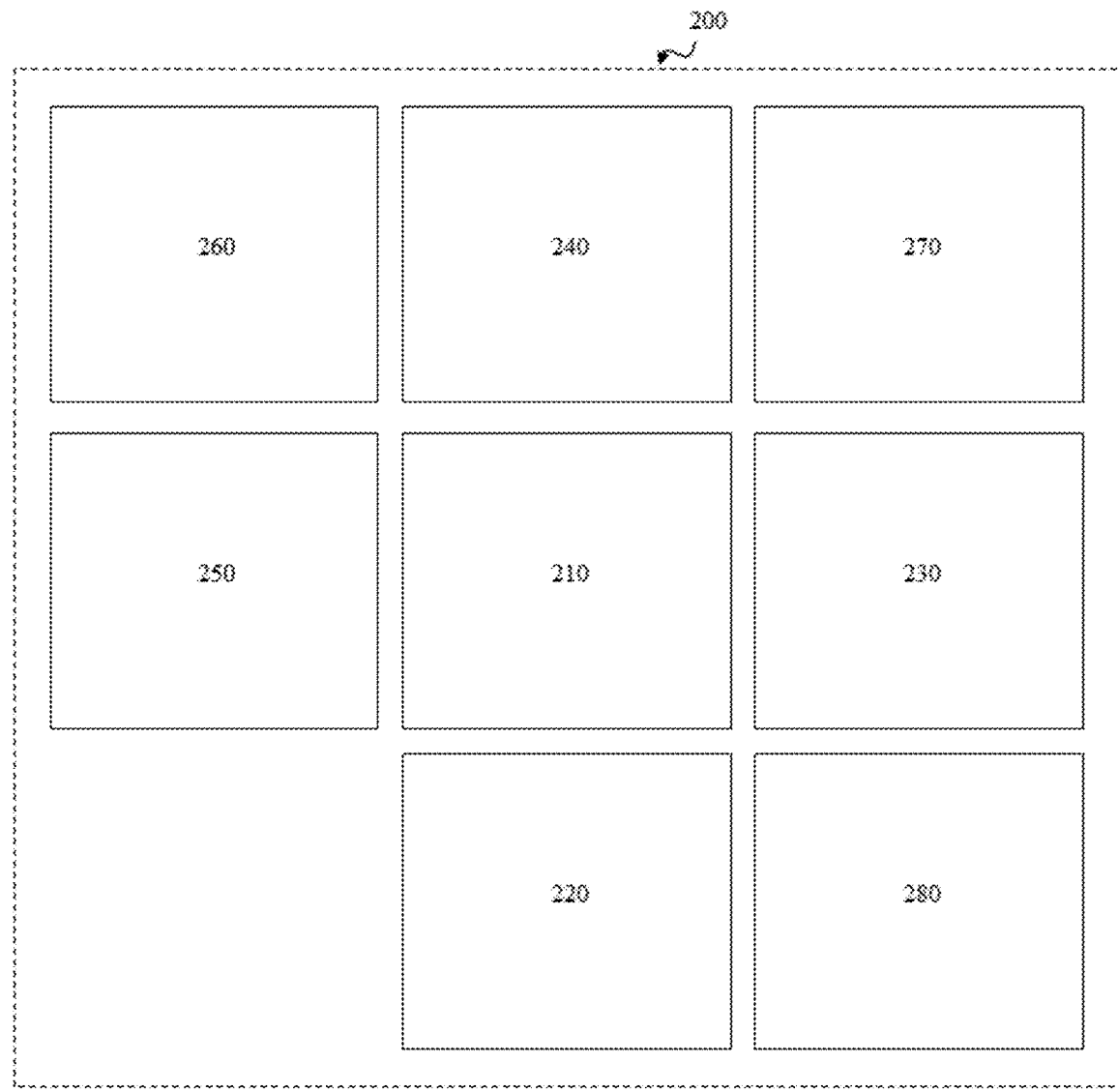
FIG. 2 shows an example of a system for performing a non-classical computation.

FIG. 2 shows an example of a system 200 for performing a non-classical computation. The non-classical computation may comprise a quantum computation. The quantum computation may comprise a gate-model quantum computation.

The system 200 may comprise one or more trapping units 210. The trapping units may comprise one or more optical trapping units. The optical trapping units may comprise any optical trapping unit described herein, such as an optical trapping unit described herein with respect to FIG. 3A. The optical trapping units may be configured to generate a plurality of optical trapping sites. The optical trapping units may be configured to generate a plurality of spatially distinct optical trapping sites. For instance, the optical trapping units may be configured to generate at least about 10, 20, 30, 40, 50, 60, 70, 80, 90, 100, 200, 300, 400, 500, 600, 700, 800, 900, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, or more optical trapping sites. The optical trapping units may be configured to generate at most about 1,000,000, 900,000, 800,000, 700,000, 600,000, 500,000, 400,000, 300,000, 200,000, 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, 1,000, 900, 800, 700, 600, 500, 400, 300, 200, 100, 90, 80, 70, 60, 50, 40, 30, 20, 10, or fewer optical trapping sites. The optical trapping units may be configured to trap a number of optical trapping sites that is within a range defined by any two of the preceding values.

The optical trapping units may be configured to trap a plurality of atoms. For instance, the optical trapping units may be configured to trap at least about 10, 20, 30, 40, 50, 60, 70, 80, 90, 100, 200, 300, 400, 500, 600, 700, 800, 900, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, or more atoms. The optical trapping units may be configured to trap at most about 1,000,000, 900,000, 800,000, 700,000, 600,000, 500,000, 400,000, 300,000, 200,000, 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, 1,000, 900, 800, 700, 600, 500, 400, 300, 200, 100, 90, 80, 70, 60, 50, 40, 30, 20, 10, or fewer atoms. The optical trapping units may be configured to trap a number of atoms that is within a range defined by any two of the preceding values.

Each optical trapping site of the optical trapping units may be configured to trap at least about 1, 2, 3, 4, 5, 6, 7, 8, 9, 10, or more atoms. Each optical trapping site may be configured to trap at most about 10, 9, 8, 7, 6, 5, 4, 3, 2, 1, or fewer atoms. Each optical trapping site may be configured to trap a number of atoms that is within a range defined by any two of the preceding values. Each optical trapping site may be configured to trap a single atom.

Figure 4:
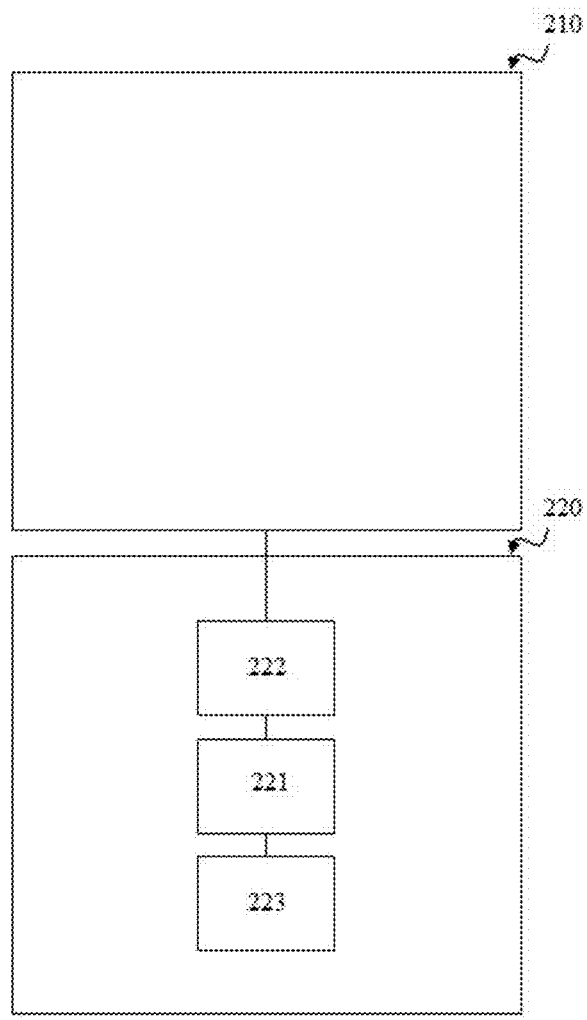
FIG. 4 shows an example of an electromagnetic delivery unit.

One or more atoms of the plurality of atoms may comprise qubits, as described herein (for instance, with respect to FIG. 4). Two or more atoms may be quantum mechanically entangled. Two or more atoms may be quantum mechanically entangled with a coherence lifetime of at least about 1 microsecond (µs), 2 µs, 3 µs, 4 µs, 5 µs, 6 µs, 7 µs, 8 µs, 9 µs, 10 µs, 20 µs, 30 µs, 40 µs, 50 µs, 60 µs, 70 µs, 80 µs, 90 µs, 100 µs, 200 µs, 300 µs, 400 µs, 500 µs, 600 µs, 700 µs, 800 µs, 900 µs, 1 millisecond (ms), 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, 1 second (s), 2 s, 3 s, 4 s, 5 s, 6 s, 7 s, 8 s, 9 s, 10 s, or more. Two or more atoms may be quantum mechanically entangled with a coherence lifetime of at most about 10 s, 9 s, 8 s, 7 s, 6 s, 5 s, 4 s, 3 s, 2 s, 1 s, 900 ms, 800 ms, 700 ms, 600 ms, 500 ms, 400 ms, 300 ms, 200 ms, 100 ms, 90 ms, 80 ms, 70 ms, 60 ms, 50 ms, 40 ms, 30 ms, 20 ms, 10 ms, 9 ms, 8 ms, 7 ms, 6 ms, 5 ms, 4 ms, 3 ms, 2 ms, 1 ms, 900 µs, 800 µs, 700 µs, 600 µs, 500 µs, 400 µs, 300 µs, 200 µs, 100 µs, 90 µs, 80 µs, 70 µs, 60 µs, 50 µs, 40 µs, 30 µs, 20 µs, 10 µs, 9 µs, 8 µs, 7 µs, 6 µs, 5 µs, 4 µs, 3 µs, 2 µs, 1 µs, or less. Two or more atoms may be quantum mechanically entangled with a coherence lifetime that is within a range defined by any two of the preceding values. One or more atoms may comprise neutral atoms. One or more atoms may comprise uncharged atoms.

One or more atoms may comprise alkali atoms. One or more atoms may comprise lithium (Li) atoms, sodium (Na) atoms, potassium (K) atoms, rubidium (Rb) atoms, or cesium (Cs) atoms. One or more atoms may comprise lithium-6 atoms, lithium-7 atoms, sodium-23 atoms, potassium-39 atoms, potassium-40 atoms, potassium-41 atoms, rubidium-85 atoms, rubidium-87 atoms, or caesium-133 atoms. One or more atoms may comprise alkaline earth atoms. One or more atoms may comprise beryllium (Be) atoms, magnesium (Mg) atoms, calcium (Ca) atoms, strontium (Sr) atoms, or barium (Ba) atoms. One or more atoms may comprise beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-134 atoms, barium-135 atoms, barium-136 atoms, barium-137 atoms, or barium-138 atoms. One or more atoms may comprise rare earth atoms. One or more atoms may comprise scandium (Sc) atoms, yttrium (Y) atoms, lanthanum (La) atoms, cerium (Ce) atoms, praseodymium (Pr) atoms, neodymium (Nd) atoms, samarium (Sm) atoms, europium (Eu) atoms, gadolinium (Gd) atoms, terbium (Tb) atoms, dysprosium (Dy) atoms, holmium (Ho) atoms, erbium (Er) atoms, thulium (Tm) atoms, ytterbium (Yb) atoms, or lutetium (Lu) atoms. One or more atoms may comprise scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms.

The plurality of atoms may comprise a single element selected from the group consisting of Li, Na, K, Rb, Cs, Be, Mg, Ca, Sr, and Ba. The plurality of atoms may comprise a mixture of elements selected from the group consisting of Li, Na, K, Rb, Cs, Be, Mg, Ca, Sr, and Ba. The plurality of atoms may comprise a natural isotopic mixture of one or more elements selected from the group consisting of Li, Na, K, Rb, Cs, Be, Mg, Ca, Sr, and Ba. The plurality of atoms may comprise an isotopically enriched mixture of one or more elements selected from the group consisting of Li, Na, K, Rb, Cs, Be, Mg, Ca, Sr, and Ba. The plurality of atoms may comprise a natural isotopic mixture of one or more elements selected from the group consisting of Sc, Y, La, Ce, Pr, Nd, Sm, Eu, Gd, Tb, Dy, Ho, Er, Tm, Yb, and Lu. The plurality of atoms may comprise an isotopically enriched mixture of one or more elements selected from the group consisting of Sc, Y, La, Ce, Pr, Nd, Sm, Eu, Gd, Tb, Dy, Ho, Er, Tm, Yb, and Lu. atoms may comprise rare earth atoms. For instance, the plurality of atoms may comprise lithium-6 atoms, lithium-7 atoms, sodium-23 atoms, potassium-39 atoms, potassium-40 atoms, potassium-41 atoms, rubidium-85 atoms, rubidium-87 atoms, caesium-133 atoms, beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-134 atoms, barium-135 atoms, barium-136 atoms, barium-137 atoms, barium-138 atoms, scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms enriched to an isotopic abundance of at least about 50%, 60%, 70%, 80%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, or more. The plurality of atoms may comprise lithium-6 atoms, lithium-7 atoms, sodium-23 atoms, potassium-39 atoms, potassium-40 atoms, potassium-41 atoms, rubidium-85 atoms, rubidium-87 atoms, caesium-133 atoms, beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-134 atoms, barium-135 atoms, barium-136 atoms, barium-137 atoms, barium-138 atoms, scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms enriched to an isotopic abundance of at most about 99.99%, 99.98%, 99.97%, 99.96%, 99.95%, 99.94%, 99.93%, 99.92%, 99.91%, 99.9%, 99.8%, 99.7%, 99.6%, 99.5%, 99.4%, 99.3%, 99.2%, 99.1%, 99%, 98%, 97%, 96%, 95%, 94%, 93%, 92%, 91%, 90%, 80%, 70%, 60%, 50%, or less. The plurality of atoms may comprise lithium-6 atoms, lithium-7 atoms, sodium-23 atoms, potassium-39 atoms, potassium-40 atoms, potassium-41 atoms, rubidium-85 atoms, rubidium-87 atoms, caesium-133 atoms, beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-134 atoms, barium-135 atoms, barium-136 atoms, barium-137 atoms, barium-138 atoms, scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms enriched to an isotopic abundance that is within a range defined by any two of the preceding values.

The system 200 may comprise one or more first electromagnetic delivery units 220. The first electromagnetic delivery units may comprise any electromagnetic delivery unit described herein, such as an electromagnetic delivery unit described herein with respect to FIG. 4. The first electromagnetic delivery units may be configured to apply first electromagnetic energy to one or more atoms of the plurality of atoms. Applying the first electromagnetic energy may induce the atoms to adopt one or more superposition states of a first atomic state and a second atomic state that is different from the first atomic state.

The first atomic state may comprise a first single-qubit state. The second atomic state may comprise a second single-qubit state. The first atomic state or second atomic state may be elevated in energy with respect to a ground atomic state of the atoms. The first atomic state or second atomic state may be equal in energy with respect to the ground atomic state of the atoms.

The first atomic state may comprise a first hyperfine electronic state and the second atomic state may comprise a second hyperfine electronic state that is different from the first hyperfine electronic state. For instance, the first and second atomic states may comprise first and second hyperfine states on a multiplet manifold, such as a triplet manifold. The first and second atomic states may comprise first and second hyperfine states, respectively, on a $^3P_1$ or $^3P_2$ manifold. The first and second atomic states may comprise first and second hyperfine states, respectively, on a $^3P_1$ or $^3P_2$ manifold of any atom described herein, such as a strontium-87 $^3P_1$ manifold or a strontium-87 $^3P_2$ manifold.

Figure 9:
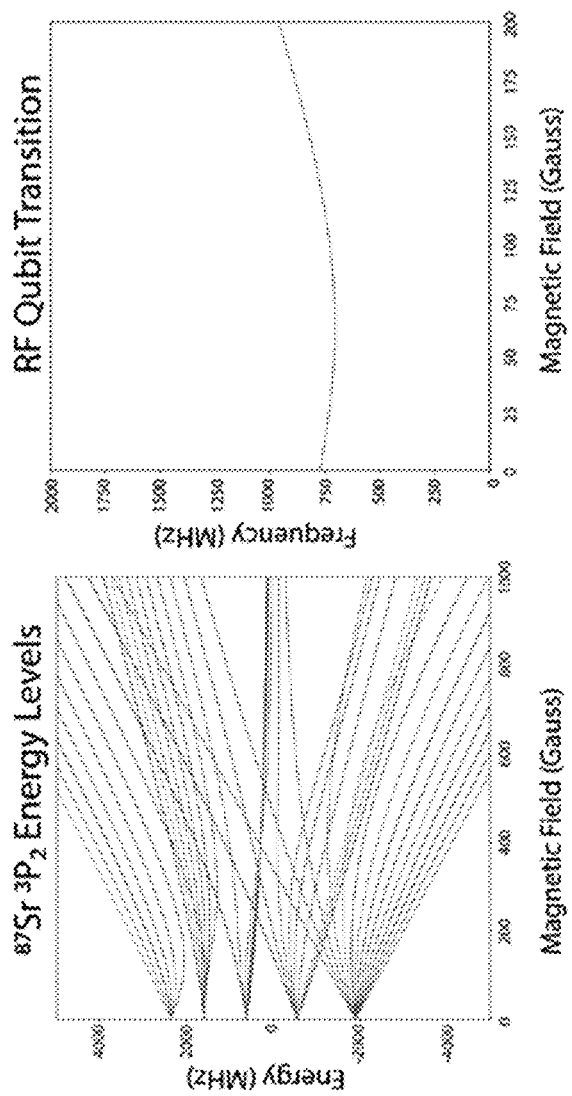
FIG. 9 shows an example of a qubit comprising a $^3P_2$ state of strontium-87.

FIG. 9 shows an example of a qubit comprising a $^3P_2$ state of strontium-87. The left panel of FIG. 9 shows the rich energy level structure of the $^3P_2$ state of strontium-87. The right panel of FIG. 9 shows a potential qubit transition within the $^3P_2$ state of strontium-87 which is insensitive (to first order) to changes in magnetic field around 70 Gauss.

In some cases, the first and second atomic states are first and second hyperfine states of a first electronic state. Optical excitation may be applied between a first electronic state and a second electronic state. The optical excitation may excite the first hyperfine state and/or the second hyperfine state to the second electronic state. A single-qubit transition may comprise a two-photon transition between two hyperfine states within the first electronic state using a second electronic state as an intermediate state. To drive a single-qubit transition, a pair of frequencies, each detuned from a single-photon transition to the intermediate state, may be applied to drive a two-photon transition. In some cases, the first and second hyperfine states are hyperfine states of the ground electronic state. The ground electronic state may not decay by spontaneous or stimulated emission to a lower electronic state. The hyperfine states may comprise nuclear spin states. In some cases, the hyperfine states comprise nuclear spin states of a strontium-87 $^1S_0$ manifold and the qubit transition drives one or both of two nuclear spin states of strontium-87 $^1S_0$ to a state detuned from or within the $^3P_2$ or $^3P_1$ manifold. In some cases, the one-qubit transition is a two photon Raman transition between nuclear spin states of strontium-87 $^1S_0$ via a state detuned from or within the $^3P_2$ or $^3P_1$ manifold. In some cases, the nuclear spin states may be Stark shifted nuclear spin states. A Stark shift may be driven optically. An optical Stark shift may be driven off resonance with any, all, or a combination of a single-qubit transition, a two-qubit transition, a shelving transition, an imaging transition, etc.

The first atomic state may comprise a first nuclear spin state and the second atomic state may comprise a second nuclear spin state that is different from the first nuclear spin state. The first and second atomic states may comprise first and second nuclear spin states, respectively, of a quadrupolar nucleus. The first and second atomic states may comprise first and second nuclear spin states, respectively, of a spin-1, spin-3/2, spin-2, spin-5/2, spin-3, spin-7/2, spin-4, or spin-9/2 nucleus. The first and second atomic states may comprise first and second nuclear spin states, respectively, of any atom described herein, such as first and second spin states of strontium-87.

For first and second nuclear spin states associated with a nucleus comprising a spin greater than ½ (such as a spin-1, spin-3/2, spin-2, spin-5/2, spin-3, spin-7/2, spin-4, or spin-9/2 nucleus), transitions between the first and second nuclear spin states may be accompanied by transitions between other spin states on the nuclear spin manifold. For instance, for a spin-9/2 nucleus in the presence of a uniform magnetic field, all of the nuclear spin levels may be separated by equal energy. Thus, a transition (such as a Raman transition) designed to transfer atoms from, for instance, an $m_N$=9/2 spin state to an $m_N$=7/2 spin state, may also drive $m_N$=7/2 to $m_N$=5/2, $m_N$=5/2 to $m_N$=3/2, $m_N$=3/2 to $m_N$=1/2, $m_N$=1/2 to $m_N$=−1/2, $m_N$=−1/2 to $m_N$=−3/2, $m_N$=−3/2 to $m_N$=−5/2, $m_N$=−5/2 to $m_N$=−7/2, and $m_N$=−7/2 to $m_N$=−9/2, where $m_N$ is the nuclear spin state. Similarly, a transition (such as a Raman transition) designed to transfer atoms from, for instance, an $m_N$=−9/2 spin state to an $m_N$=−5/2 spin state, may also drive $m_N$=−7/2 to $m_N$=−3/2, $m_N$=−5/2 to $m_N$=−1/2, $m_N$=−3/2 to $m_N$=−1/2, $m_N$=1/2 to $m_N$=−3/2, $m_N$=−1/2 to $m_N$=−5/2, $m_N$=−3/2 to $m_N$=−7/2, and $m_N$=−5/2 to $m_N$=−9/2. Such a transition may thus not be selective for inducing transitions between particular spin states on the nuclear spin manifold.

It may be desirable to instead implement selective transitions between particular first and second spins states on the nuclear spin manifold. This may be accomplished by providing light from a light source that provides an AC Stark shift and pushes neighboring nuclear spin states out of resonance with a transition between the desired transition between the first and second nuclear spin states. For instance, if a transition from first and second nuclear spin states having $m_N$=−9/2 and $m_N$=−7/2 is desired, the light may provide an AC Stark shift to the $m_N$=−5/2 spin state, thereby greatly reducing transitions between the $m_N$=−7/2 and $m_N$=−5/2 states. Similarly, if a transition from first and second nuclear spin states having $m_N$=−9/2 and $m_N$=−5/2 is desired, the light may provide an AC Stark shift to the $m_N$=−1/2 spin state, thereby greatly reducing transitions between the $m_N$=−5/2 and $m_N$=−1/2 states. This may effectively create a two-level subsystem within the nuclear spin manifold that is decoupled from the remainder of the nuclear spin manifold, greatly simplifying the dynamics of the qubit systems. It may be advantageous to use nuclear spin states near the edge of the nuclear spin manifold (e.g., $m_N$=−9/2 and $m_N$=−7/2, $m_N$=7/2 and $m_N$=9/2, $m_N$=−9/2 and $m_N$=−5/2, or $m_N$=5/2 and $m_N$=9/2 for a spin-9/2 nucleus) such that only one AC Stark shift is required. Alternatively, nuclear spin states farther from the edge of the nuclear spin manifold (e.g., $m_N$=−5/2 and $m_N$=−3/2 or $m_N$=−5/2 and $m_N$=−1/2) may be used and two AC Stark shifts may be implemented (e.g., at $m_N$=−7/2 and $m_N$=−1/2 or $m_N$=−9/2 and $m_N$=3/2).

Stark shifting of the nuclear spin manifold may shift neighboring nuclear spin states out of resonance with the desired transition between the first and second nuclear spin states and a second electronic state or a state detuned therefrom. Stark shifting may decrease leakage from the first and second nuclear spin state to other states in the nuclear spin manifold. Starks shifts may be achievable up to 100s of kHz for less than 10 mW beam powers. Upper state frequency selectivity may decrease scattering from imperfect polarization control. Separation of different angular momentum states in the $^3P_1$ manifold may be many gigahertz from the single and two-qubit gate light. Leakage to other states in the nuclear spin manifold may lead to decoherence. The Rabi frequency for two-qubit transitions (e.g. how quickly the transition can be driven) may be faster than the decoherence rate. Scattering from the intermediate state in the two-qubit transition may be a source of decoherence. Detuning from the intermediate state may improve fidelity of two-qubit transitions.

Qubits based on nuclear spin states in the electronic ground state may allow exploitation of long-lived metastable excited electronic states (such as a $^3P_0$ state in strontium-87) for qubit storage. Atoms may be selectively transferred into such a state to reduce cross-talk or to improve gate or detection fidelity. Such a storage or shelving process may be atom-selective using the SLMs or AODs described herein. A shelving transition may comprise a transition between the $^1S_0$ state in strontium-87 to the $^3P_0$ or $^3P2$ state in strontium-87.

The clock transition (also a "shelving transition" or a "storage transition" herein) may be qubit-state selective. The upper state of the clock transition may have a very long natural lifetime, e.g. greater than 1 second. The linewidth of the clock transition may be much narrower than the qubit energy spacing. This may allow direct spectral resolution. Population may be transferred from one of the qubit states into the clock state. This may allow individual qubit states to be read out separately, by first transferring population from one qubit state into the clock state, performing imaging on the qubits, then transferring the population back into the ground state from the clock state and imaging again. In some cases, a magic wavelength transition is used to drive the clock transition.

The clock light for shelving can be atom-selective or not atom-selective. In some cases, the clock transition is globally applied (e.g. not atom selective). A globally applied clock transition may include directing the light without passing through a microscope objective or structuring the light. In some cases, the clock transition is atom-selective. Clock transition which are atom-selective may potentially allow us to improve gate fidelities by minimizing cross-talk. For example, to reduce cross talk in an atom, the atom may be shelved in the clock state where it may not be affected by the light. This may reduce cross-talk between neighboring qubits undergoing transitions. To implement atom-selective clock transitions, the light may pass through one or more microscope objectives and/or may be structured on one or more of a spatial light modulator, digital micromirror device, crossed acousto-optic deflectors, etc.

The system 200 may comprise one or more readout units 230. The readout units may comprise one or more readout optical units. The readout optical units may be configured to perform one or more measurements of the one or more superposition states to obtain the non-classical computation. The readout optical units may comprise one or more optical detectors. The detectors may comprise one or more photomultiplier tubes (PMTs), photodiodes, avalanche diodes, single-photon avalanche diodes, single-photon avalanche diode arrays, phototransistors, reverse-biased light emitting diodes (LEDs), charge coupled devices (CCDs), or complementary metal oxide semiconductor (CMOS) cameras. The optical detectors may comprise one or more fluorescence detectors. The readout optical unit may comprise one or more objectives, such as one or more objective having a numerical aperture (NA) of at least about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, or more. The objective may have an NA of at most about 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or less. The objective may have an NA that is within a range defined by any two of the preceding values.

The one or more readout optical units 230 may make measurements, such as projective measurements, by applying light resonant with an imaging transition. The imaging transition may cause fluorescence. An imaging transition may comprise a transition between the $^1S_0$ state in strontium-87 to the $^1P_1$ state in strontium-87. The $^1P_1$ state in strontium-87 may fluoresce. The lower state of the qubit transition may comprise two nuclear spin states in the $^1S_0$ manifold. The one or more states may be resonant with the imaging transition. A measurement may comprise two excitations. In a first excitation, one of the two lower states may be excited to the shelving state (e.g. $^3P_0$ state in strontium-87). In a second excitation, the imaging transition may be excited. The first transition may reduce cross-talk between neighboring atoms during computation. Fluorescence generated from the imaging transition may be collected on one or more readout optical units 230.

The imaging units may be used to determine if one or more atoms were lost from the trap. The imaging units may be used to observe the arrangement of atoms in the trap.

The system 200 may comprise one or more vacuum units 240. The one or more vacuum units may comprise one or more vacuum pumps. The vacuum units may comprise one or more roughing vacuum pumps, such as one or more rotary pumps, rotary vane pumps, rotary piston pumps, diaphragm pumps, piston pumps, reciprocating piston pumps, scroll pumps, or screw pumps. The one or more roughing vacuum pumps may comprise one or more wet (for instance, oil-sealed) or dry roughing vacuum pumps. The vacuum units may comprise one or more high-vacuum pumps, such as one or more cryosorption pumps, diffusion pumps, turbomolecular pumps, molecular drag pumps, turbo-drag hybrid pumps, cryogenic pumps, ions pumps, or getter pumps.

The vacuum units may comprise any combination of vacuum pumps described herein. For instance, the vacuum units may comprise one or more roughing pumps (such as a scroll pump) configured to provide a first stage of rough vacuum pumping. The roughing vacuum pumps may be configured to pump gases out of the system 200 to achieve a low vacuum pressure condition. For instance, the roughing pumps may be configured to pump gases out of the system 200 to achieve a low vacuum pressure of at most about $10^3$ Pascals (Pa). The vacuum units may further comprise one or more high-vacuum pumps (such as one or more ion pumps, getter pumps, or both) configured to provide a second stage of high vacuum pumping or ultra-high vacuum pumping. The high-vacuum pumps may be configured to pump gases out of the system 200 to achieve a high vacuum pressure of at most about $10^{-3}$ Pa or an ultra-high vacuum pressure of at most about $10^{-6}$ Pa once the system 200 has reached the low vacuum pressure condition provided by the one or more roughing pumps.

The vacuum units may be configured to maintain the system 200 at a pressure of at most about $10^{-6}$ Pa, $9\times10^{-7}$ Pa, $8\times10^{-7}$ Pa, $7\times10^{-7}$ Pa, $6\times10^{-7}$ Pa, $5\times10^{-7}$ Pa, $4\times10^{-7}$ Pa, $3\times10^{-7}$ Pa, $2\times10^{-7}$ Pa, $10^{-7}$ Pa, $9\times10^{-8}$ Pa, $8\times10^{-8}$ Pa, $7\times10^{-8}$ Pa, $6\times10^{-8}$ Pa, $5\times10^{-8}$ Pa, $4\times10^{-8}$ Pa, $3\times10^{-8}$ Pa, $2\times10^{-8}$ Pa, $10^{-8}$ Pa, $9\times10^{-9}$ Pa, $8\times10^{-9}$ Pa, $7\times10^{-9}$ Pa, $6\times10^{-9}$ Pa, $5\times10^{-9}$ Pa, $4\times10^{-9}$ Pa, $3\times10^{-9}$ Pa, $2\times10^{-9}$ Pa, $10^{-9}$ Pa, $9\times10^{-10}$ Pa, $8\times10^{-10}$ Pa, $7\times10^{-10}$ Pa, $6\times10^{-10}$ Pa, $5\times10^{-10}$ Pa, $4\times10^{-10}$ Pa, $3\times10^{-10}$ Pa, $2\times10^{-10}$ Pa, $10^{-10}$ Pa, $9\times10^{-11}$ Pa, $8\times10^{-11}$ Pa, $7\times10^{-11}$ Pa, $6\times10^{-11}$ Pa, $5\times10^{-11}$ Pa, $4\times10^{-11}$ Pa, $3\times10^{-11}$ Pa, $2\times10^{-11}$ Pa, $10^{-11}$ Pa, $9\times10^{-12}$ Pa, $8\times10^{-12}$ Pa, $7\times10^{-12}$ Pa, $6\times10^{-12}$ Pa, $5\times10^{-12}$ Pa, $4\times10^{-12}$ Pa, $3\times10^{-12}$ Pa, $2\times10^{-12}$ Pa, $10^{-12}$ Pa, or lower. The vacuum units may be configured to maintain the system 200 at a pressure of at least about $10^{-12}$ Pa, $2\times10^{-12}$ Pa, $3\times10^{-12}$ Pa, $4\times10^{-12}$ Pa, $5\times10^{-12}$ Pa, $6\times10^{-12}$ Pa, $7\times10^{-12}$ Pa, $8\times10^{-12}$ Pa, $9\times10^{-12}$ Pa, $10^{-11}$ Pa, $2\times10^{-11}$ Pa, $3\times10^{-11}$ Pa, $4\times10^{-11}$ Pa, $5\times10^{-11}$ Pa, $6\times10^{-11}$ Pa, $7\times10^{-11}$ Pa, $8\times10^{-11}$ Pa, $9\times10^{-11}$ Pa, $10^{-10}$ Pa, $2\times10^{-10}$ Pa, $3\times10^{-10}$ Pa, $4\times10^{-10}$ Pa, $5\times10^{-10}$ Pa, $6\times10^{-10}$ Pa, $7\times10^{-10}$ Pa, $8\times10^{-10}$ Pa, $9\times10^{-10}$ Pa, $10^{-9}$ Pa, $2\times10^{-9}$ Pa, $3\times10^{-9}$ Pa, $4\times10^{-9}$ Pa, $5\times10^{-9}$ Pa, $6\times10^{-9}$ Pa, $7\times10^{-9}$ Pa, $8\times10^{-9}$ Pa, $9\times10^{-9}$ Pa, $10^{-8}$ Pa, $2\times10^{-8}$ Pa, $3\times10^{-8}$ Pa, $4\times10^{-8}$ Pa, $5\times10^{-8}$ Pa, $6\times10^{-8}$ Pa, $7\times10^{-8}$ Pa, $8\times10^{-8}$ Pa, $9\times10^{-8}$ Pa, $10^{-7}$ Pa, $2\times10^{-7}$ Pa, $3\times10^{-7}$ Pa, $4\times10^{-7}$ Pa, $5\times10^{-7}$ Pa, $6\times10^{-7}$ Pa, $7\times10^{-7}$ Pa, $8\times10^{-7}$ Pa, $9\times10^{-7}$ Pa, $10^{-6}$ Pa, or higher. The vacuum units may be configured to maintain the system 200 at a pressure that is within a range defined by any two of the preceding values.

The system 200 may comprise one or more state preparation units 250. The state preparation units may comprise any state preparation unit described herein, such as a state preparation unit described herein with respect to FIG. 5. The state preparation units may be configured to prepare a state of the plurality of atoms.

The system 200 may comprise one or more atom reservoirs 260. The atom reservoirs may be configured to supply one or more replacement atoms to replace one or more atoms at one or more optical trapping sites upon loss of the atoms from the optical trapping sites. The atom reservoirs may be spatially separated from the optical trapping units. For instance, the atom reservoirs may be located at a distance from the optical trapping units.

Alternatively or in addition, the atom reservoirs may comprise a portion of the optical trapping sites of the optical trapping units. A first subset of the optical trapping sites may be utilized for performing quantum computations and may be referred to as a set of computationally-active optical trapping sites, while a second subset of the optical trapping sites may serve as an atom reservoir. For instance, the first subset of optical trapping sites may comprise an interior array of optical trapping sites, while the second subset of optical trapping sites comprises an exterior array of optical trapping sites surrounding the interior array. The interior array may comprise a rectangular, square, rectangular prism, or cubic array of optical trapping sites.

The system 200 may comprise one or more atom movement units 270. The atom movement units may be configured to move the one or more replacement atoms from the one or more atoms reservoirs to the one or more optical trapping sites. For instance, the one or more atom movement units may comprise one or more electrically tunable lenses, acousto-optic deflectors (AODs), or spatial light modulators (SLMs).

The system 200 may comprise one or more entanglement units 280. The entanglement units may be configured to quantum mechanically entangle at least a first atom of the plurality of atoms with at least a second atom of the plurality of atoms. The first or second atom may be in a superposition state at the time of quantum mechanical entanglement. Alternatively or in addition, the first or second atom may not be in a superposition state at the time of quantum mechanical entanglement. The first atom and the second atom may be quantum mechanically entangled through one or more magnetic dipole interactions, induced magnetic dipole interactions, electric dipole interactions, or induced electric dipole interactions. The entanglement units may be configured to quantum mechanically entangle any number of atoms described herein.

The entanglement units may also be configured to quantum mechanically entangle at least a subset of the atoms with at least another atom to form one or more multi-qubit units. The multi-qubit units may comprise two-qubit units, three-qubit units, four-qubit units, or n-qubit units, where n may be 5, 6, 7, 8, 9, 10, or more. For instance, a two-qubit unit may comprise a first atom quantum mechanically entangled with a second atom, a three-qubit unit may comprise a first atom quantum mechanically entangled with a second and third atom, a four-qubit unit may comprise a first atom quantum mechanically entangled with a second, third, and fourth atom, and so forth. The first, second, third, or fourth atom may be in a superposition state at the time of quantum mechanical entanglement. Alternatively or in addition, the first, second, third, or fourth atom may not be in a superposition state at the time of quantum mechanical entanglement. The first, second, third, and fourth atom may be quantum mechanically entangled through one or more magnetic dipole interactions, induced magnetic dipole interactions, electric dipole interactions, or induced electric dipole interactions.

The entanglement units may comprise one or more Rydberg units. The Rydberg units may be configured to electronically excite the at least first atom to a Rydberg state or to a superposition of a Rydberg state and a lower-energy atomic state, thereby forming one or more Rydberg atoms or dressed Rydberg atoms. The Rydberg units may be configured to induce one or more quantum mechanical entanglements between the Rydberg atoms or dressed Rydberg atoms and the at least second atom. The second atom may be located at a distance of at least about 200 nanometers (nm), 300 nm, 400 nm, 500 nm, 600 nm, 700 nm, 800 nm, 900 nm, 1 micrometer ($\mu$m), 2 $\mu$m, 3 $\mu$m, 4 $\mu$m, 5 $\mu$m, 6 $\mu$m, 7 $\mu$m, 8 $\mu$m, 9 $\mu$m, 10 $\mu$m, or more from the Rydberg atoms or dressed Rydberg atoms. The second atom may be located at a distance of at most about 10 $\mu$m, 9 $\mu$m, 8 $\mu$m, 7 $\mu$m, 6 $\mu$m, 5 $\mu$m, 4 $\mu$m, 3 $\mu$m, 2 $\mu$m, 1 $\mu$m, 900 nm, 800 nm, 700 nm, 600 nm, 500 nm, 400 nm, 300 nm, 200 nm, or less from the Rydberg atoms or dressed Rydberg atoms. The second atom may be located at a distance from the Rydberg atoms or dressed Rydberg atoms that is within a range defined by any two of the preceding values. The Rydberg units may be configured to allow the Rydberg atoms or dressed Rydberg atoms to relax to a lower-energy atomic state, thereby forming one or more two-qubit units. The Rydberg units may be configured to induce the Rydberg atoms or dressed Rydberg atoms to relax to a lower-energy atomic state. The Rydberg units may be configured to drive the Rydberg atoms or dressed Rydberg atoms to a lower-energy atomic state. For instance, the Rydberg units may be configured to apply electromagnetic radiation (such as RF radiation or optical radiation) to drive the Rydberg atoms or dressed Rydberg atoms to a lower-energy atomic state. The Rydberg units may be configured to induce any number of quantum mechanical entanglements between any number of atoms of the plurality of atoms.

The Rydberg units may comprise one or more light sources (such as any light source described herein) configured to emit light having one or more ultraviolet (UV) wavelengths. The UV wavelengths may be selected to correspond to a wavelength that forms the Rydberg atoms or dressed Rydberg atoms. For instance, the light may comprise one or more wavelengths of at least about 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, or more. The light may comprise one or more wavelengths of at most about 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm, or less. The light may comprise one or more wavelengths that are within a range defined by any two of the preceding values. For instance, the light may comprise one or more wavelengths that are within a range from 300 nm to 400 nm.

The Rydberg units may be configured to induce a two-photon transition to generate an entanglement. The Rydberg units may be configured to induce a two-photon transition to generate an entanglement between two atoms. The Rydberg units may be configured to selectively induce a two-photon transition to selectively generate an entanglement between two atoms. For instance, the Rydberg units may be configured to direct electromagnetic energy (such as optical energy) to particular optical trapping sites to selectively induce a two-photon transition to selectively generate the entanglement between the two atoms. The two atoms may be trapped in nearby optical trapping sites. For instance, the two atoms may be trapped in adjacent optical trapping sites. The two-photon transition may be induced using first and second light from first and second light sources, respectively. The first and second light sources may each comprise any light source described herein (such as any laser described herein). The first light source may be the same or similar to a light source used to perform a single-qubit operation described herein. Alternatively, different light sources may be used to perform a single-qubit operation and to induce a two-photon transition to generate an entanglement. The first light source may emit light comprising one or more wavelengths in the visible region of the optical spectrum (e.g., within a range from 400 nm to 800 nm or from 650 nm to 700 nm). The second light source may emit light comprising one or more wavelengths in the ultraviolet region of the optical spectrum (e.g., within a range from 200 nm to 400 nm or from 300 nm to 350 nm). The first and second light sources may emit light having substantially equal and opposite spatially-dependent frequency shifts.

The Rydberg atoms or dressed Rydberg atoms may comprise a Rydberg state that may have sufficiently strong interatomic interactions with nearby atoms (such as nearby atoms trapped in nearby optical trapping sites) to enable the implementation of multi-qubit operations. The Rydberg states may comprise a principal quantum number of at least about 50, 60, 70, 80, 90, 100, or more. The Rydberg states may comprise a principal quantum number of at most about 100, 90, 80, 70, 60, 50, or less. The Rydberg states may comprise a principal quantum number that is within a range defined by any two of the preceding values. The Rydberg states may interact with nearby atoms through van der Waals interactions. The van der Waals interactions may shift atomic energy levels of the atoms.

State selective excitation of atoms to Rydberg levels may enable the implementation of multi-qubit operations. The multi-qubit operations may comprise two-qubit operations, three-qubit operations, or n-qubit operations, where n is 4, 5, 6, 7, 8, 9, 10, or more. Two-photon transitions may be used to excite atoms from a ground state (such as a $^1S_0$ ground state) to a Rydberg state (such as an n'Si state, wherein n is a principal quantum number described herein). State selectivity may be accomplished by a combination of laser polarization and spectral selectivity. The two-photon transitions may be implemented using first and second laser sources, as described herein. The first laser source may emit pi-polarized light, which may not change the projection of atomic angular momentum along a magnetic field. The second laser may emit circularly polarized light, which may change the projection of atomic angular momentum along the magnetic field by one unit. The first and second qubit levels may be excited to Rydberg level using this polarization. However, the Rydberg levels may be more sensitive to magnetic fields than the ground state so that large splittings (for instance, on the order of 100s of MHz) may be readily obtained. This spectral selectivity may allow state selective excitation to Rydberg levels.

Multi-qubit operations (such as two-qubit operations, three-qubit operations, four-qubit operations, and so forth) may rely on energy shifts of levels due to van der Waals interactions described herein. Such shifts may either prevent the excitation of one atom conditional on the state of the other or change the coherent dynamics of excitation of the two-atom system to enact a two-qubit operation. In some cases, "dressed states" may be generated under continuous driving to enact two-qubit operations without requiring full excitation to a Rydberg level (for instance, as described in www.arxiv.org/abs/1605.05207, which is incorporated herein by reference in its entirety for all purposes).

The system 200 may comprise one or more second electromagnetic delivery units (not shown in FIG. 2). The second electromagnetic delivery units may comprise any electromagnetic delivery unit described herein, such as an electromagnetic delivery unit described herein with respect to FIG. 4. The first and second electromagnetic delivery units may be the same. The first and second electromagnetic delivery units may be different. The second electromagnetic delivery units may be configured to apply second electromagnetic energy to the one or more multi-qubit units. The second electromagnetic energy may comprise one or more pulse sequences. The first electromagnetic energy may precede, be simultaneous with, or follow the second electromagnetic energy.

The pulse sequences may comprise any number of pulses. For instance, the pulse sequences may comprise at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more pulses. The pulse sequences may comprise at most about 1,000, 900, 800, 700, 600, 500, 400, 300, 200, 100, 90, 80, 70, 60, 50, 40, 30, 20, 10, 9, 8, 7, 6, 5, 4, 3, 2, or 1 pulses. The pulse sequences may comprise a number of pulses that is within a range defined by any two of the preceding values. Each pulse of the pulse sequence may comprise any pulse shape, such as any pulse shape described herein.

The pulse sequences may be configured to decrease the duration of time required to implement multi-qubit operations, as described herein (for instance, with respect to Example 3). For instance, the pulse sequences may comprise a duration of at least about 10 nanoseconds (ns), 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 microsecond (µs), 2 µs, 3 µs, 4 µs, 5 µs, 6 µs, 7 µs, 8 µs, 9 µs, 10 µs, 20 µs, 30 µs, 40 µs, 50 µs, 60 µs, 70 µs, 80 µs, 90 µs, 100 µs, or more. The pulse sequences may comprise a duration of at most about 100 µs, 90 µs, 80 µs, 70 µs, 60 µs, 50 µs, 40 µs, 30 µs, 20 µs, 10 µs, 9 µs, 8 µs, 7 µs, 6 µs, 5 µs, 4 µs, 3 µs, 2 µs, 1 µs, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, or less. The pulse sequences may comprise a duration that is within a range defined by any two of the preceding values.

The pulse sequences may be configured to increase the fidelity of multi-qubit operations, as described herein. For instance, the pulse sequences may enable multi-qubit operations with a fidelity of at least about 0.5, 0.6, 0.7, 0.8, 0.9, 0.91, 0.92, 0.93, 0.94, 0.95, 0.96, 0.97, 0.98, 0.99, 0.991, 0.992, 0.993, 0.994, 0.995, 0.996, 0.997, 0.998, 0.999, 0.9991, 0.9992, 0.9993, 0.9994, 0.9995, 0.9996, 0.9997, 0.9998, 0.9999, 0.99991, 0.99992, 0.99993, 0.99994, 0.99995, 0.99996, 0.99997, 0.99998, 0.99999, 0.999991, 0.999992, 0.999993, 0.999994, 0.999995, 0.999996, 0.999997, 0.999998, 0.999999, or more. The pulse sequences may enable multi-qubit operations with a fidelity of at most about 0.999999, 0.999998, 0.999997, 0.999996, 0.999995, 0.999994, 0.999993, 0.999992, 0.999991, 0.99999, 0.99998, 0.99997, 0.99996, 0.99995, 0.99994, 0.99993, 0.99992, 0.99991, 0.9999, 0.9998, 0.9997, 0.9996, 0.9995, 0.9994, 0.9993, 0.9992, 0.9991, 0.999, 0.998, 0.997, 0.996, 0.995, 0.994, 0.993, 0.992, 0.991, 0.99, 0.98, 0.97, 0.96, 0.95, 0.94, 0.93, 0.92, 0.91, 0.9, 0.8, 0.7, 0.6, 0.5, or less. The pulse sequences may enable multi-qubit operations with a fidelity that is within a range defined by any two of the preceding values.

The pulse sequences may enable the implementation of multi-qubit operations on non-adiabatic timescales while maintaining effectively adiabatic dynamics. For instance, the pulse sequences may comprise one or more of shortcut to adiabaticity (STA) pulse sequences, transitionless quantum driving (TQD) pulse sequences, superadiabatic pulse sequences, counterdiabatic driving pulse sequences, derivative removal by adiabatic gate (DRAG) pulse sequences, and weak anharmonicity with average Hamiltonian (Wah Wah) pulse sequences. For instance, the pulse sequences may be similar to those described in M. V. Berry, "Transitionless Quantum Driving," *Journal of Physics A: Mathematical and Theoretical* 42(36), 365303 (2009), www.doi.org/10.1088/1751-8113/42/36/365303; Y.-Y. Jau et al., "Entangling Atomic Spins with a Strong Rydberg-Dressed Interaction," *Nature Physics* 12(1), 71-74 (2016); T. Keating et al., "Robust Quantum Logic in Neutral Atoms via Adiabatic Rydberg Dressing," *Physical Review A* 91, 012337 (2015); A. Mitra et al., "Robust Mölmer-Sörenson Gate for Neutral Atoms Using Rapid Adiabatic Rydberg Dressing," www.arxiv.org/abs/1911.04045 (2019); or L. S. Theis et al., "Counteracting Systems of Diabaticities Using DRAG Controls: The Status after 10 Years," *Europhysics Letters* 123(6), 60001 (2018), each of which is incorporated herein by reference in its entirety for all purposes.

The pulse sequences may further comprise one or more optimal control pulse sequences. The optimal control pulse sequences may be derived from one or more procedures, including gradient ascent pulse engineering (GRAPE) methods, Krotov's method, chopped basis methods, chopped random basis (CRAB) methods, Nelder-Mead methods, gradient optimization using parametrization (GROUP) methods, genetic algorithm methods, and gradient optimization of analytic controls (GOAT) methods. For instance, the pulse sequences may be similar to those described in N. Khaneja et al., "Optimal Control of Coupled Spin Dynamics: Design of NMR Pulse Sequences by Gradient Ascent Algorithms," *Journal of Magnetic Resonance* 172(2), 296-305 (2005); or J. T. Merrill et al., "Progress in Compensating Pulse Sequences for Quantum Computation," *Advances in Chemical Physics* 154, 241-294 (2014), each of which is incorporated by reference in its entirety for all purposes.

Cloud Computing

The system 200 may be operatively coupled to a digital computer described herein (such as a digital computer described herein with respect to FIG. 1) over a network described herein (such as a network described herein with respect to FIG. 1). The network may comprise a cloud computing network.

Optical Trapping Units

Figure 3A:
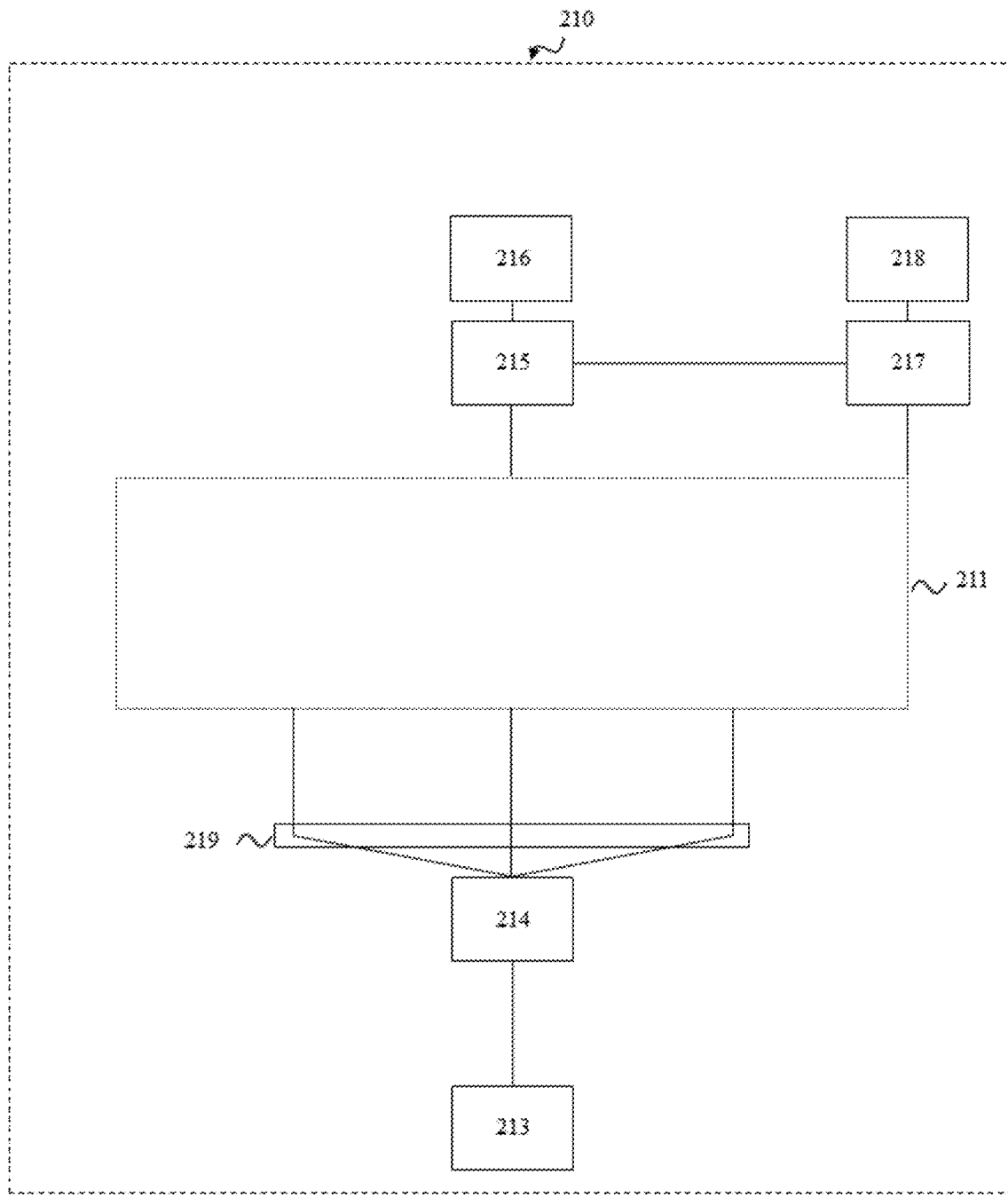
FIG. 3A shows an example of an optical trapping unit.
Figure 3B:
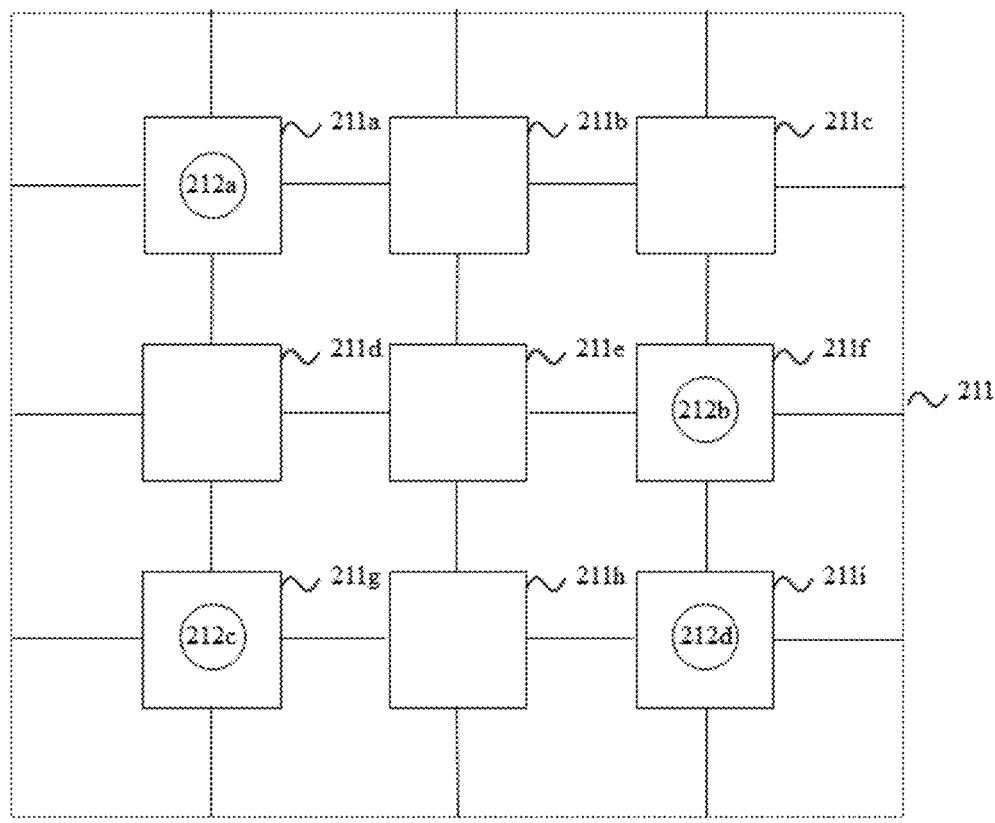
FIG. 3B shows an example of a plurality of optical trapping sites.

FIG. 3A shows an example of an optical trapping unit 210. The optical trapping unit may be configured to generate a plurality 211 of spatially distinct optical trapping sites, as described herein. For instance, as shown in FIG. 3B, the optical trapping unit may be configured to generate a first optical trapping site 211*a*, second optical trapping site 211*b*, third optical trapping site 211*c*, fourth optical trapping site 211*d*, fifth optical trapping site 211*e*, sixth optical trapping site 211*f*, seventh optical trapping site 211*g*, eighth optical trapping site 211*h*, and ninth optical trapping site 211*i*, as depicted in FIG. 3A. The plurality of spatially distinct optical trapping sites may be configured to trap a plurality of atoms, such as first atom 212*a*, second atom 212*b*, third atom 212*c*, and fourth atom 212*d*, as depicted in FIG. 3A. As depicted in FIG. 3B, each optical trapping site may be configured to trap a single atom. As depicted in FIG. 3B, some of the optical trapping sites may be empty (i.e., not trap an atom).

As shown in FIG. 3B, the plurality of optical trapping sites may comprise a two-dimensional (2D) array. The 2D array may be perpendicular to the optical axis of optical components of the optical trapping unit depicted in FIG. 3A. Alternatively, the plurality of optical trapping sites may comprise a one-dimensional (1D) array or a three-dimensional (3D) array.

Although depicted as comprising nine optical trapping sites filled by four atoms in FIG. 3B, the optical trapping unit 210 may be configured to generate any number of spatially distinct optical trapping sites described herein and may be configured to trap any number of atoms described herein.

Each optical trapping site of the plurality of optical trapping sites may be spatially separated from each other optical trapping site by a distance of at least about 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, or more. Each optical trapping site may be spatially separated from each other optical trapping site by a distance of at most about 10 μm, 9 μm, 8 μm, 7 μm, 6 μm, 5 μm, 4 μm, 3 μm, 2 μm, 1 μm, 900 nm, 800 nm, 700 nm, 600 nm, 500 nm, 400 nm, 300 nm, 200 nm, or less. Each optical trapping site maybe be spatially separated from each other optical trapping site by a distance that is within a range defined by any two of the preceding values.

The optical trapping sites may comprise one or more optical tweezers. Optical tweezers may comprise one or more focused laser beams to provide an attractive or repulsive force to hold or move the one or more atoms. The beam waist of the focused laser beams may comprise a strong electric field gradient. The atoms may be attracted or repelled along the electric field gradient to the center of the laser beam, which may contain the strongest electric field. The optical trapping sites may comprise one or more optical lattice sites of one or more optical lattices. The optical trapping sites may comprise one or more optical lattice sites of one or more one-dimensional (1D) optical lattices, two-dimensional (2D) optical lattices, or three-dimensional (3D) optical lattices. For instance, the optical trapping sites may comprise one or more optical lattice sites of a 2D optical lattice, as depicted in FIG. 3B.

The optical lattices may be generated by interfering counter-propagating light (such as counter-propagating laser light) to generate a standing wave pattern having a periodic succession of intensity minima and maxima along a particular direction. A 1D optical lattice may be generated by interfering a single pair of counter-propagating light beams. A 2D optical lattice may be generated by interfering two pairs of counter-propagating light beams. A 3D optical lattice may be generated by interfering three pairs of counter-propagating lights beams. The light beams may be generated by different light sources or by the same light source. Therefore, an optical lattice may be generated by at least about 1, 2, 3, 4, 5, 6, or more light sources or at most about 6, 5, 4, 3, 2, or 1 light sources.

Returning to the description of FIG. 3A, the optical trapping unit may comprise one or more light sources configured to emit light to generate the plurality of optical trapping sites as described herein. For instance, the optical trapping unit may comprise a single light source 213, as depicted in FIG. 3A. Though depicted as comprising a single light source in FIG. 3A, the optical trapping unit may comprise any number of light sources, such as at least about 1, 2, 3, 4, 5, 6, 7, 8, 9, 10, or more light sources or at most about 10, 9, 8, 7, 6, 5, 4, 3, 2, or 1 light sources. The light sources may comprise one or more lasers. The lasers may be configured to operate at a resolution limit of the lasers. For example, the lasers can be configured to provide diffraction limited spot sizes for optical trapping.

The lasers may comprise one or more continuous wave lasers. The lasers may comprise one or more pulsed lasers. The lasers may comprise one or more gas lasers, such as one or more helium-neon (HeNe) lasers, argon (Ar) lasers, krypton (Kr) lasers, xenon (Xe) ion lasers, nitrogen ($N_2$) lasers, carbon dioxide (CO2) lasers, carbon monoxide (CO) lasers, transversely excited atmospheric (TEA) lasers, or excimer lasers. For instance, the lasers may comprise one or more argon dimer ($Ar_2$) excimer lasers, krypton dimer ($Kr_2$) excimer lasers, fluorine dimer ($F_2$) excimer lasers, xenon dimer ($Xe_2$) excimer lasers, argon fluoride (ArF) excimer lasers, krypton chloride (KrCl) excimer lasers, krypton fluoride (KrF) excimer lasers, xenon bromide (XeBr) excimer lasers, xenon chloride (XeCl) excimer lasers, or xenon fluoride (XeF) excimer lasers. The laser may comprise one or more dye lasers.

The lasers may comprise one or more metal-vapor lasers, such as one or more helium-cadmium (HeCd) metal-vapor lasers, helium-mercury (HeHg) metal-vapor lasers, helium-selenium (HeSe) metal-vapor lasers, helium-silver (HeAg) metal-vapor lasers, strontium (Sr) metal-vapor lasers, neon-copper (NeCu) metal-vapor lasers, copper (Cu) metal-vapor lasers, gold (Au) metal-vapor lasers, manganese (Mn) metal-vapor laser, or manganese chloride ($MnCl_2$) metal-vapor lasers.

The lasers may comprise one or more solid-state lasers, such as one or more ruby lasers, metal-doped crystal lasers, or metal-doped fiber lasers. For instance, the lasers may comprise one or more neodymium-doped yttrium aluminum garnet (Nd:YAG) lasers, neodymium/chromium doped yttrium aluminum garnet (Nd/Cr:YAG) lasers, erbium-doped yttrium aluminum garnet (Er:YAG) lasers, neodymium-doped yttrium lithium fluoride (Nd:YLF) lasers, neodymium-doped yttrium orthovanadate ($ND:YVO_4$) lasers, neodymium-doped yttrium calcium oxoborate (Nd:YCOB) lasers, neodymium glass (Nd:glass) lasers, titanium sapphire (Ti:sapphire) lasers, thulium-doped ytrium aluminum garnet (Tm:YAG) lasers, ytterbium-doped ytrrium aluminum garnet (Yb:YAG) lasers, ytterbium-doped glass (Yt:glass) lasers, holmium ytrrium aluminum garnet (Ho:YAG) lasers, chromium-doped zinc selenide (Cr:ZnSe) lasers, cerium-doped lithium strontium aluminum fluoride (Ce:LiSAF) lasers, cerium-doped lithium calcium aluminum fluoride (Ce:LiCAF) lasers, erbium-doped glass (Er:glass) lasers, erbium-ytterbium-codoped glass (Er/Yt:glass) lasers, uranium-doped calcium fluoride ($U:CaF_2$) lasers, or samarium-doped calcium fluoride ($Sm:CaF_2$) lasers.

The lasers may comprise one or more semiconductor lasers or diode lasers, such as one or more gallium nitride (GaN) lasers, indium gallium nitride (InGaN) lasers, aluminum gallium indium phosphide (AlGaInP) lasers, aluminum gallium arsenide (AlGaAs) lasers, indium gallium arsenic phosphide (InGaAsP) lasers, vertical cavity surface emitting lasers (VCSELs), or quantum cascade lasers.

The lasers may emit continuous wave laser light. The lasers may emit pulsed laser light. The lasers may have a pulse length of at least about 1 femtoseconds (fs), 2 fs, 3 fs, 4 fs, 5 fs, 6 fs, 7 fs, 8 fs, 9 fs, 10 fs, 20 fs, 30 fs, 40 fs, 50 fs, 60 fs, 70 fs, 80 fs, 90 fs, 100 fs, 200 fs, 300 fs, 400 fs, 500 fs, 600 fs, 700 fs, 800 fs, 900 fs, 1 picosecond (ps), 2 ps, 3 ps, 4 ps, 5 ps, 6 ps, 7 ps, 8 ps, 9 ps, 10 ps, 20 ps, 30 ps, 40 ps, 50 ps, 60 ps, 70 ps, 80 ps, 90 ps, 100 ps, 200 ps, 300 ps, 400 ps, 500 ps, 600 ps, 700 ps, 800 ps, 900 ps, 1 nanosecond (ns), 2 ns, 3 ns, 4 ns, 5 ns, 6 ns, 7 ns, 8 ns, 9 ns, 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1,000 ns, or more. The lasers may have a pulse length of at most about 1,000 ns, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, 9 ns, 8 ns, 7 ns, 6 ns, 5 ns, 4 ns, 3 ns, 2 ns, 1 ns, 900 ps, 800 ps, 700 ps, 600 ps, 500 ps, 400 ps, 300 ps, 200 ps, 100 ps, 90 ps, 80 ps, 70 ps, 60 ps, 50 ps, 40 ps, 30 ps, 20 ps, 10 ps, 9 ps, 8 ps, 7 ps, 6 ps, 5 ps, 4 ps, 3 ps, 2 ps, 1 ps, 900 fs, 800 fs, 700 fs, 600 fs, 500 fs, 400 fs, 300 fs, 200 fs, 100 fs, 90 fs, 80 fs, 70 fs, 60 fs, 50 fs, 40 fs, 30 fs, 20 fs, 10 fs, 9 fs, 8 fs, 7 fs, 6 fs, 5 fs, 4 fs, 3 fs, 2 fs, 1 fs, or less. The lasers may have a pulse length that is within a range defined by any two of the preceding values.

The lasers may have a repetition rate of at least about 1 hertz (Hz), 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, 1 kilohertz (kHz), 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 megahertz (MHz), 2 MHz, 3 MHz, 4 MHz, 5 MHz, 6 MHz, 7 MHz, 8 MHz, 9 MHz, 10 MHz, 20 MHz, 30 MHz, 40 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 1,000 MHz, or more. The lasers may have a repetition rate of at most about 1,000 MHz, 900 MHz, 800 MHz, 700 MHz, 600 MHz, 500 MHz, 400 MHz, 300 MHz, 200 MHz, 100 MHz, 90 MHz, 80 MHz, 70 MHz, 60 MHz, 50 MHz, 40 MHz, 30 MHz, 20 MHz, 10 MHz, 9 MHz, 8 MHz, 7 MHz, 6 MHz, 5 MHz, 4 MHz, 3 MHz, 2 MHz, 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, 900 Hz, 800 Hz, 700 Hz, 600 Hz, 500 Hz, 400 Hz, 300 Hz, 200 Hz, 100 Hz, 90 Hz, 80 Hz, 70 Hz, 60 Hz, 50 Hz, 40 Hz, 30 Hz, 20 Hz, 10 Hz, 9 Hz, 8 Hz, 7 Hz, 6 Hz, 5 Hz, 4 Hz, 3 Hz, 2 Hz, 1 Hz, or less. The lasers may have a repetition rate that is within a range defined by any two of the preceding values.

The lasers may emit light having a pulse energy of at least about 1 nanojoule (nJ), 2 nJ, 3 nJ, 4 nJ, 5 nJ, 6 nJ, 7 nJ, 8 nJ, 9 nJ, 10 nJ, 20 nJ, 30 nJ, 40 nJ, 50 nJ, 60 nJ, 70 nJ, 80 nJ, 90 nJ, 100 nJ, 200 nJ, 300 nJ, 400 nJ, 500 nJ, 600 nJ, 700 nJ, 800 nJ, 900 nJ, 1 microjoule (0), 2 µJ, 3 µJ, 4 µJ, 5 µJ, 6 µJ, 7 µJ, 8 µJ, 9 µJ, 10 µJ, 20 µJ, 30 µJ, 40 µJ, 50 µJ, 60 µJ, 70 µJ, 80 µJ, 90 µJ, 100 µJ, 200 µJ, 300 µJ, 400 µJ, 500 µJ, 600 µJ, 700 µJ, 800 µJ, 900 µJ, a least 1 millijoule (mJ), 2 mJ, 3 mJ, 4 mJ, 5 mJ, 6 mJ, 7 mJ, 8 mJ, 9 mJ, 10 mJ, 20 mJ, 30 mJ, 40 mJ, 50 mJ, 60 mJ, 70 mJ, 80 mJ, 90 mJ, 100 mJ, 200 mJ, 300 mJ, 400 mJ, 500 mJ, 600 mJ, 700 mJ, 800 mJ, 900 mJ, a least 1 Joule (J), or more. The lasers may emit light having a pulse energy of at most about 1 J, 900 mJ, 800 mJ, 700 mJ, 600 mJ, 500 mJ, 400 mJ, 300 mJ, 200 mJ, 100 mJ, 90 mJ, 80 mJ, 70 mJ, 60 mJ, 50 mJ, 40 mJ, 30 mJ, 20 mJ, 10 mJ, 9 mJ, 8 mJ, 7 mJ, 6 mJ, 5 mJ, 4 mJ, 3 mJ, 2 mJ, 1 mJ, 900 µJ, 800 µJ, 700 µJ, 600 µJ, 500 µJ, 400 µJ, 300 µJ, 200 µJ, 100 µJ, 90 µJ, 80 µJ, 70 µJ, 60 µJ, 50 µJ, 40 µJ, 30 µJ, 20 µJ, 10 µJ, 9 µJ, 8 µJ, 7 µJ, 6 µJ, 5 µJ, 4 µJ, 3 µJ, 2 µJ, 1 µJ, 900 nJ, 800 nJ, 700 nJ, 600 nJ, 500 nJ, 400 nJ, 300 nJ, 200 nJ, 100 nJ, 90 nJ, 80 nJ, 70 nJ, 60 nJ, 50 nJ, 40 nJ, 30 nJ, 20 nJ, 10 nJ, 9 nJ, 8 nJ, 7 nJ, 6 nJ, 5 nJ, 4 nJ, 3 nJ, 2 nJ, 1 nJ, or less. The lasers may emit light having a pulse energy that is within a range defined by any two of the preceding values.

The lasers may emit light having an average power of at least about 1 microwatt (µW), 2 µW, 3 µW, 4 µW, 5 µW, 6 µW, 7 µW, 8 µW, 9 µW, 10 µW, 20 µW, 30 µW, 40 µW, 50 µW, 60 µW, 70 µW, 80 µW, 90 µW, 100 µW, 200 µW, 300 µW, 400 µW, 500 µW, 600 µW, 700 µW, 800 µW, 900 µW, 1 milliwatt (mW), 2 mW, 3 mW, 4 mW, 5 mW, 6 mW, 7 mW, 8 mW, 9 mW, 10 mW, 20 mW, 30 mW, 40 mW, 50 mW, 60 mW, 70 mW, 80 mW, 90 mW, 100 mW, 200 mW, 300 mW, 400 mW, 500 mW, 600 mW, 700 mW, 800 mW, 900 mW, 1 watt (W), 2 W, 3 W, 4 W, 5 W, 6 W, 7 W, 8 W, 9 W, 10 W, 20 W, 30 W, 40 W, 50 W, 60 W, 70 W, 80 W, 90 W, 100 W, 200 W, 300 W, 400 W, 500 W, 600 W, 700 W, 800 W, 900 W, 1,000 W, or more. The lasers may emit light having an average power of at most about 1,000 W, 900 W, 800 W, 700 W, 600 W, 500 W, 400 W, 300 W, 200 W, 100 W, 90 W, 80 W, 70 W, 60 W, 50 W, 40 W, 30 W, 20 W, 10 W, 9 W, 8 W, 7 W, 6 W, 5 W, 4 W, 3 W, 2 W, 1 W, 900 mW, 800 mW, 700 mW, 600 mW, 500 mW, 400 mW, 300 mW, 200 mW, 100 mW, 90 mW, 80 mW, 70 mW, 60 mW, 50 mW, 40 mW, 30 mW, 20 mW, 10 mW, 9 mW, 8 mW, 7 mW, 6 mW, 5 mW, 4 mW, 3 mW, 2 mW, 1 mW, 900 µW, 800 µW, 700 µW, 600 µW, 500 µW, 400 µW, 300 µW, 200 µW, 100 µW, 90 µW, 80 µW, 70 µW, 60 µW, 50 µW, 40 µW, 30 µW, 20 µW, 10 µW, 9 µW, 8 µW, 7 µW, 6 µW, 5 µW, 4 µW, 3 µW, 2 µW, 1 µW, or more. The lasers may emit light having a power that is within a range defined by any two of the preceding values.

The lasers may emit light comprising one or more wavelengths in the ultraviolet (UV), visible, or infrared (IR) portions of the electromagnetic spectrum. The lasers may emit light comprising one or more wavelengths of at least about 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, 1,010 nm, 1,020 nm, 1,030 nm, 1,040 nm, 1,050 nm, 1,060 nm, 1,070 nm, 1,080 nm, 1,090 nm, 1,100 nm, 1,110 nm, 1,120 nm, 1,130 nm, 1,140 nm, 1,150 nm, 1,160 nm, 1,170 nm, 1,180 nm, 1,190 nm, 1,200 nm, 1,210 nm, 1,220 nm, 1,230 nm, 1,240 nm, 1,250 nm, 1,260 nm, 1,270 nm, 1,280 nm, 1,290 nm, 1,300 nm, 1,310 nm, 1,320 nm, 1,330 nm, 1,340 nm, 1,350 nm, 1,360 nm, 1,370 nm, 1,380 nm, 1,390 nm, 1,400 nm, or more. The lasers may emit light comprising one or more wavelengths of at most about 1,400 nm, 1,390 nm, 1,380 nm, 1,370 n, 1,360 nm, 1,350 nm, 1,340 nm, 1,330 nm, 1,320 nm, 1,310 nm, 1,300 nm, 1,290 nm, 1,280 nm, 1,270 n, 1,260 nm, 1,250 nm, 1,240 nm, 1,230 nm, 1,220 nm, 1,210 nm, 1,200 nm, 1,190 nm, 1,180 nm, 1,170 n, 1,160 nm, 1,150 nm, 1,140 nm, 1,130 nm, 1,120 nm, 1,110 nm, 1,100 nm, 1,090 nm, 1,080 nm, 1,070 n, 1,060 nm, 1,050 nm, 1,040 nm, 1,030 nm, 1,020 nm, 1,010 nm, 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm. The lasers may emit light comprising one or more wavelengths that are within a range defined by any two of the preceding values.

The lasers may emit light having a bandwidth of at least about $1 \times 10^{-15}$ nm, $2 \times 10^{-15}$ nm, $3 \times 10^{-15}$ nm, $4 \times 10^{-15}$ nm, $5 \times 10^{-15}$ nm, $6 \times 10^{-15}$ nm, $7 \times 10^{-15}$ nm, $8 \times 10^{-15}$ nm, $9 \times 10^{-15}$ nm, $1 \times 10^{-14}$ nm, $2 \times 10^{-14}$ nm, $3 \times 10^{-14}$ nm, $4 \times 10^{-14}$ nm, $5 \times 10^{-14}$ nm, $6 \times 10^{-14}$ nm, $7 \times 10^{-14}$ nm, $8 \times 10^{-14}$ nm, $9 \times 10^{-14}$ nm, $1 \times 10^{-13}$ nm, $2 \times 10^{-13}$ nm, $3 \times 10^{-13}$ nm, $4 \times 10^{-13}$ nm, $5 \times 10^{-13}$ nm, $6 \times 10^{-13}$ nm, $7 \times 10^{-13}$ nm, $8 \times 10^{-13}$ nm, $9 \times 10^{-13}$ nm, $1 \times 10^{-12}$ nm, $2 \times 10^{-12}$ nm, $3 \times 10^{-12}$ nm, $4 \times 10^{-12}$ nm, $5 \times 10^{-12}$ nm, $6 \times 10^{-12}$ nm, $7 \times 10^{-12}$ nm, $8 \times 10^{-12}$ nm, $9 \times 10^{-12}$ nm, $1 \times 10^{-11}$ nm, $2 \times 10^{-11}$ nm, $3 \times 10^{-11}$ nm, $4 \times 10^{-11}$ nm, $5 \times 10^{-11}$ nm, $6 \times 10^{-11}$ nm, $7 \times 10^{-11}$ nm, $8 \times 10^{-11}$ nm, $9 \times 10^{-11}$ nm, $1 \times 10^{-10}$ nm, $2 \times 10^{-10}$ nm, $3 \times 10^{-10}$ nm, $4 \times 10^{-10}$ nm, $5 \times 10^{-10}$ nm, $6 \times 10^{-10}$ nm, $7 \times 10^{-10}$ nm, $8 \times 10^{-10}$ nm, $9 \times 10^{-10}$ nm, $1 \times 10^{-9}$ nm, $2 \times 10^{-9}$ nm, $3 \times 10^{-9}$ nm, $4 \times 10^{-9}$ nm, $5 \times 10^{-9}$ nm, $6 \times 10^{-9}$ nm, $7 \times 10^{-9}$ nm, $8 \times 10^{-9}$ nm, $9 \times 10^{-9}$ nm, $1 \times 10^{-8}$ nm, $2 \times 10^{-8}$ nm, $3 \times 10^{-8}$ nm, $4 \times 10^{-8}$ nm, $5 \times 10^{-8}$ nm, $6 \times 10^{-8}$ nm, $7 \times 10^{-8}$ nm, $8 \times 10^{-8}$ nm, $9 \times 10^{-8}$ nm, $1 \times 10^{-7}$ nm, $2 \times 10^{-7}$ nm, $3 \times 10^{-7}$ nm, $4 \times 10^{-7}$ nm, $5 \times 10^{-7}$ nm, $6 \times 10^{-7}$ nm, $7 \times 10^{-7}$ nm, $8 \times 10^{-7}$ nm, $9 \times 10^{-7}$ nm, $1 \times 10^{-6}$ nm, $2 \times 10^{-6}$ nm, $3 \times 10^{-6}$ nm, $4 \times 10^{-6}$ nm, $5 \times 10^{-6}$ nm, $6 \times 10^{-6}$ nm, $7 \times 10^{-6}$ nm, $8 \times 10^{-6}$ nm, $9 \times 10^{-6}$ nm, $1 \times 10^{-5}$ nm, $2 \times 10^{-5}$ nm, $3 \times 10^{-5}$ nm, $4 \times 10^{-5}$ nm, $5 \times 10^{-5}$ nm, $6 \times 10^{-5}$ nm, $7 \times 10^{-5}$ nm, $8 \times 10^{-5}$ nm, $9 \times 10^{-5}$ nm, $1 \times 10^{4}$ nm, $2 \times 10^{4}$ nm, $3 \times 10^{4}$ nm, $4 \times 10^{4}$ nm, $5 \times 10^{4}$ nm, $6 \times 10^{4}$ nm, $7 \times 10^{4}$ nm, $8 \times 10^{4}$ nm, $9 \times 10^{4}$ nm, $1 \times 10^{-3}$ nm, or more. The lasers may emit light having a bandwidth of at most about $1 \times 10^{-3}$ nm, $9 \times 10^{4}$ nm, $8 \times 10^{4}$ nm, $7 \times 10^{4}$ nm, $6 \times 10^{4}$ nm, $5 \times 10^{4}$ nm, $4 \times 10^{4}$ nm, $3 \times 10^{4}$ nm, $2 \times 10^{4}$ nm, $1 \times 10^{4}$ nm, $9 \times 10^{-5}$ nm, $8 \times 10^{-5}$ nm, $7 \times 10^{-5}$ nm, $6 \times 10^{-5}$ nm, $5 \times 10^{-5}$ nm, $4 \times 10^{-5}$ nm, $3 \times 10^{-5}$ nm, $2 \times 10^{-5}$ nm, $1 \times 10^{-5}$ nm, $9 \times 10^{-6}$ nm, $8 \times 10^{-6}$ nm, $7 \times 10^{-6}$ nm, $6 \times 10^{-6}$ nm, $5 \times 10^{-6}$ nm, $4 \times 10^{-6}$ nm, $3 \times 10^{-6}$ nm, $2 \times 10^{-6}$ nm, $1 \times 10^{-6}$ nm, $9 \times 10^{-7}$ nm, $8 \times 10^{-7}$ nm, $7 \times 10^{-7}$ nm, $6 \times 10^{-7}$ nm, $5 \times 10^{-7}$ nm, $4 \times 10^{-7}$ nm, $3 \times 10^{-7}$ nm, $2 \times 10^{-7}$ nm, $1 \times 10^{-7}$ nm, $9 \times 10^{-8}$ nm, $8 \times 10^{-8}$ nm, $7 \times 10^{-8}$ nm, $6 \times 10^{-8}$ nm, $5 \times 10^{-8}$ nm, $4 \times 10^{-8}$ nm, $3 \times 10^{-8}$ nm, $2 \times 10^{-8}$ nm, $1 \times 10^{-8}$ nm, $9 \times 10^{-9}$ nm, $8 \times 10^{-9}$ nm, $7 \times 10^{-9}$ nm, $6 \times 10^{-9}$ nm, $5 \times 10^{-9}$ nm, $4 \times 10^{-9}$ nm, $3 \times 10^{-9}$ nm, $2 \times 10^{-9}$ nm, $1 \times 10^{-9}$ nm, $9 \times 10^{-10}$ nm, $8 \times 10^{-10}$ nm, $7 \times 10^{-10}$ nm, $6 \times 10^{-10}$ nm, $5 \times 10^{-10}$ nm, $4 \times 10^{-10}$ $3 \times 10^{-10}$ nm, $2 \times 10^{-10}$ nm, $1 \times 10^{-10}$ nm, $9 \times 10^{-11}$ nm, nm, $8 \times 10^{-11}$ nm, $7 \times 10^{-11}$ nm, $6 \times 10^{-11}$ nm $5 \times 10^{-11}$ nm, $4 \times 10^{-1}$ nm $3 \times 10^{-11}$ nm, $2 \times 10^{-11}$ nm, $1 \times 10^{-11}$ nm, $9 \times 10^{-12}$ nm, $8 \times 10^{-12}$ nm, $7 \times 10^{-12}$ nm, $6 \times 10^{-1}$ nm, $5 \times 10^{-12}$ nm, $4 \times 10^{-12}$ nm, $3 \times 10^{-12}$ nm, $2 \times 10^{-12}$ nm, $1 \times 10^{-12}$ nm, $9 \times 10^{-13}$ nm, $8 \times 10^{-13}$ nm, $7 \times 10^{-13}$ nm, $6 \times 10^{-13}$ nm, $5 \times 10^{-13}$ nm, $4 \times 10^{-13}$ nm, $3 \times 10^{-13}$ nm, $2 \times 10^{-13}$ nm, $1 \times 10^{-13}$ nm, $9 \times 10^{-14}$ nm, $8 \times 10^{-14}$ nm, $7 \times 10^{-14}$ nm, $6 \times 10^{-14}$ nm, $5 \times 10^{-14}$ nm, $4 \times 10^{-14}$ nm, $3 \times 10^{-14}$ nm, $2 \times 10^{-14}$ nm, $1 \times 10^{-14}$ nm, $9 \times 10^{-15}$ nm, $8 \times 10^{-15}$ nm, $7 \times 10^{-15}$ nm, $6 \times 10^{-15}$ nm, $5 \times 10^{-15}$ nm, $4 \times 10^{-15}$ nm, $3 \times 10^{-15}$ nm, $2 \times 10^{-15}$ nm, $1 \times 10^{-15}$ nm, or less. The lasers may emit light having a bandwidth that is within a range defined by any two of the preceding values.

The light sources may be configured to emit light tuned to one or more magic wavelengths corresponding to the plurality of atoms. A magic wavelength corresponding to an atom may comprise any wavelength of light that gives rise to equal or nearly equal polarizabilities of the first and second atomic states. The magic wavelengths for a transition between the first and second atomic states may be determined by calculating the wavelength-dependent polarizabilities of the first and second atomic states and finding crossing points. Light tuned to such a magic wavelength may give rise to equal or nearly equal differential light shifts in the first and second atomic states, regardless of the intensity of the light emitted by the light sources. This may effectively decouple the first and second atomic states from motion of the atoms. The magic wavelengths may utilize one or more scalar or tensor light shifts. The scalar or tensor light shifts may depend on magnetic sublevels within the first and second atomic states.

For instance, group III atoms and metastable states of alkaline earth or alkaline earth-like atoms may possess relatively large tensor shifts whose angle relative to an applied magnetic field may be tuned to cause a situation in which scalar and tensor shifts balance and give a zero or near zero differential light shift between the first and second atomic states. The angle θ may be tuned by selecting the polarization of the emitted light. For instance, when the emitted light is linearly polarized, the total polarizability α may be written as a sum of the scalar component $\alpha_{scalar}$ and the tensor component $\alpha_{tensor}$:

$$\alpha = \alpha_{scalar} + (3\theta - 1)\alpha_{tensor}$$

By choosing θ appropriately, the polarizability of the first and second atomic states may be chosen to be equal or nearly equal, corresponding to a zero or near zero differential light shift and the motion of the atoms may be decoupled.

The light sources may be configured to direct light to one or more optical modulators (OMs) configured to generate the plurality of optical trapping sites. For instance, the optical trapping unit may comprise an OM 214 configured to generate the plurality of optical trapping sites. Although depicted as comprising one OM in FIG. 3A, the optical trapping unit may comprise any number of OMs, such as at least about 1, 2, 3, 4, 5, 6, 7, 8, 9, 10, or more OMs or at most about 10, 9, 8, 7, 6, 5, 4, 3, 2, or 1 OMs. The OMs may comprise one or more digital micromirror devices (DMDs). The OMs may comprise one or more liquid crystal devices, such as one or more liquid crystal on silicon (LCoS) devices. The OMs may comprise one or more spatial light modulators (SLMs). The OMs may comprise one or more acousto-optic deflectors (AODs) or acousto-optic modulators (AOMs). The OMs may comprise one or more electro-optic deflectors (EODs) or electro-optic modulators (EOMs).

The OM may be optically coupled to one or more optical element to generate a regular array of optical trapping sites. For instance, the OM may be optically coupled to optical element 219, as shown in FIG. 3A. The optical elements may comprise lenses or microscope objectives configured to re-direct light from the OMs to form a regular rectangular grid of optical trapping sites.

For instance, as shown in FIG. 3A, the OM may comprise an SLM, DMD, or LCoS device. The SLM, DMD, or LCoS device may be imaged onto the back focal plane of the microscope objectives. This may allow for the generation of an arbitrary configuration of optical trapping sites in two or three dimensions.

Alternatively or in addition, the OMs may comprise first and second AODs. The active regions of the first and second AODs may be imaged onto the back focal plane of the microscope objectives. The output of the first AOD may be optically coupled to the input of the second AOD. In this manner, the second AOD may make a copy of the optical output of the first AOD. This may allow for the generation of optical trapping sites in two or three dimensions.

Alternatively or in addition, the OMs may comprise static optical elements, such as one or more microlens arrays or holographic optical elements. The static optical elements may be imaged onto the back focal plane of the microscope objectives. This may allow for the generation of an arbitrary configuration of optical trapping sites in two or three dimensions.

The optical trapping unit may comprise one or more imaging units configured to obtain one or more images of a spatial configuration of the plurality of atoms trapped within the optical trapping sites. For instance, the optical trapping unit may comprise imaging unit 215. Although depicted as comprising a single imaging unit in FIG. 3A, the optical trapping unit may comprise any number of imaging units, such as at least about 1, 2, 3, 4, 5, 6, 7, 8, 9, 10, or more imaging units or at most about 10, 9, 8, 7, 6, 5, 4, 3, 2, or 1 imaging units. The imaging units may comprise one or more lens or objectives. The imaging units may comprise one or more PMTs, photodiodes, avalanche photodiodes, phototransistors, reverse-biased LEDs, CCDs, or CMOS cameras. The imaging unit may comprise one or more fluorescence detectors. The images may comprise one or more fluorescence images, single-atom fluorescence images, absorption images, single-atom absorption images, phase contrast images, or single-atom phase contrast images.

The optical trapping unit may comprise one or more spatial configuration artificial intelligence (AI) units configured to perform one or more AI operations to determine the spatial configuration of the plurality of atoms trapped within the optical trapping sites based on the images obtained by the imaging unit. For instance, the optical trapping unit may comprise spatial configuration AI unit 216. Although depicted as comprising a single spatial configuration AI unit in FIG. 3A, the optical trapping unit may comprise any number of spatial configuration AI units, such as at least about 1, 2, 3, 4, 5, 6, 7, 8, 9, 10, or more spatial configuration AI units or at most about 10, 9, 8, 7, 6, 5, 4, 3, 2, or 1 spatial configuration AI units. The AI operations may comprise any machine learning (ML) or reinforcement learning (RL) operations described herein.

The optical trapping unit may comprise one or more atom rearrangement units configured to impart an altered spatial arrangement of the plurality of atoms trapped with the optical trapping sites based on the one or more images obtained by the imaging unit. For instance, the optical trapping unit may comprise atom rearrangement unit 217. Although depicted as comprising a single atom rearrangement unit in FIG. 3A, the optical trapping unit may comprise any number of atom rearrangement units, such as at least about 1, 2, 3, 4, 5, 6, 7, 8, 9, 10, or more atom rearrangement units or at most about 10, 9, 8, 7, 6, 5, 4, 3, 2, or 1 atom rearrangement units.

The optical trapping unit may comprise one or more spatial arrangement artificial intelligence (AI) units configured to perform one or more AI operations to determine the altered spatial arrangement of the plurality of atoms trapped within the optical trapping sites based on the images obtained by the imaging unit. For instance, the optical trapping unit may comprise spatial arrangement AI unit 218. Although depicted as comprising a single spatial arrangement AI unit in FIG. 3A, the optical trapping unit may comprise any number of spatial arrangement AI units, such as at least about 1, 2, 3, 4, 5, 6, 7, 8, 9, 10, or more spatial arrangement AI units or at most about 10, 9, 8, 7, 6, 5, 4, 3, 2, or 1 spatial arrangement AI units. The AI operations may comprise any machine learning (ML) or reinforcement learning (RL) operations described herein.

In some cases, the spatial configuration AI units and the spatial arrangement AI units may be integrated into an integrated AI unit. The optical trapping unit may comprise any number of integrated AI units, such as at least about 1, 2, 3, 4, 5, 6, 7, 8, 9, 10, or more integrated AI units, or at most about 10, 9, 8, 7, 6, 5, 4, 3, 2, or 1 integrated AI units.

The atom rearrangement unit may be configured to alter the spatial arrangement in order to obtain an increase in a filling factor of the plurality of optical trapping sites. A filling factor may be defined as a ratio of the number of computationally active optical trapping sites occupied by one or more atoms to the total number of computationally active optical trapping sites available in the optical trapping unit or in a portion of the optical trapping unit. For instance, initial loading of atoms within the computationally active optical trapping sites may give rise to a filling factor of less than 100%, 90%, 80%, 70%, 60%, 50%, or less, such that atoms occupy fewer than 100%, 90%, 70%, 60%, 50%, or less of the available computationally active optical trapping sites, respectively. It may be desirable to rearrange the atoms to achieve a filling factor of at least about 50%, 60%, 70%, 80%, 90%, or 100%. By analyzing the imaging information obtained by the imaging unit, the atom rearrangement unit may attain a filling factor of at least about 50%, 60%, 70%, 80%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, or more. The atom rearrangement unit may attain a filling factor of at most about 99.99%, 99.98%, 99.97%, 99.96%, 99.95%, 99.94%, 99.93%, 99.92%, 99.91%, 99.9%, 99.8%, 99.7%, 99.6%, 99.5%, 99.4%, 99.3%, 99.2%, 99.1%, 99%, 98%, 97%, 96%, 95%, 94%, 93%, 92%, 91%, 90%, 80%, 70%, 60%, 50%, or less. The atom rearrangement unit may attain a filling factor that is within a range defined by any two of the preceding values.

Figure 3C:
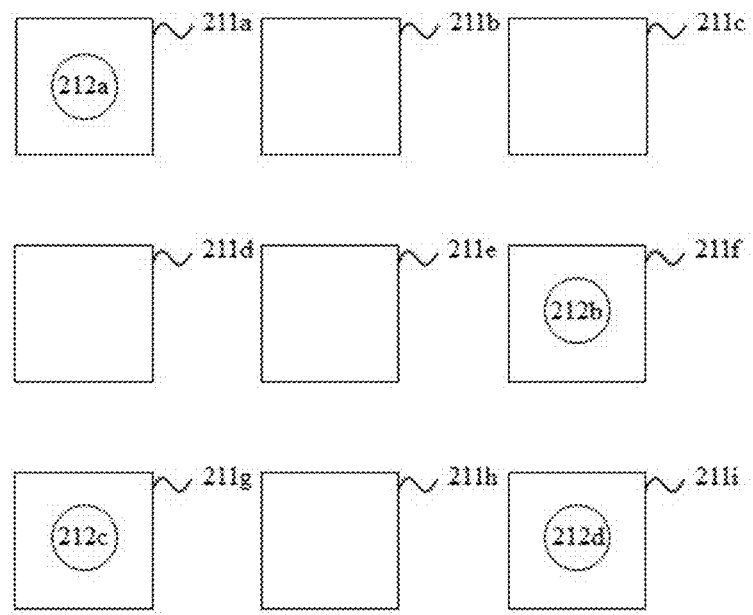
FIG. 3C shows an example of an optical trapping unit that is partially filled with atoms.

By way of example, FIG. 3C shows an example of an optical trapping unit that is partially filled with atoms. As depicted in FIG. 3C, initial loading of atoms within the optical trapping sites may give rise to a filling factor of 44.4% (4 atoms filling 9 available optical trapping sites). By moving atoms from different regions of the optical trapping unit (not shown in FIG. 3C) to unoccupied optical trapping sites or by moving atoms from an atom reservoir described herein, a much higher filling factor may be obtained, as shown in FIG. 3D.

Figure 3D:
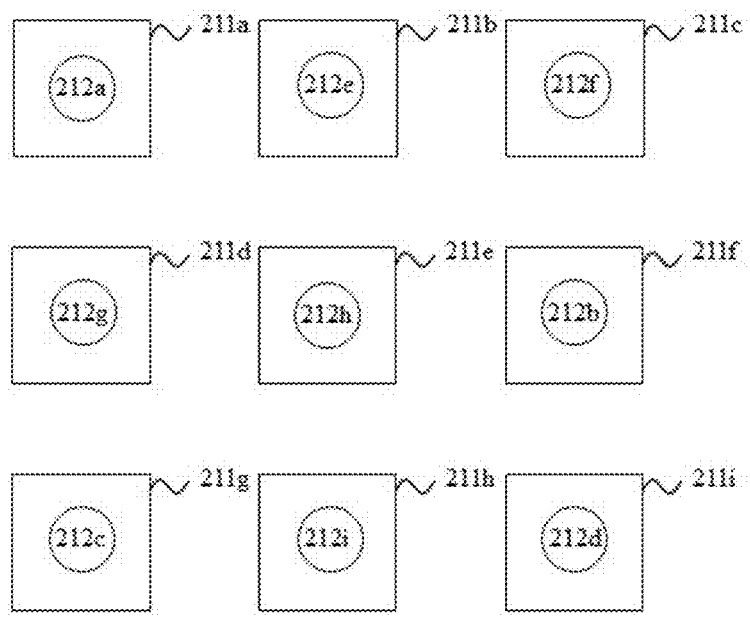
FIG. 3D shows an example of an optical trapping unit that is completely filled with atoms.

FIG. 3D shows an example of an optical trapping unit that is completely filled with atoms. As depicted in FIG. 3D, fifth atom 212$e$, sixth atom 212$f$, seventh atom 212$g$, eighth atom 212$h$, and ninth atom 212$i$ may be moved to fill unoccupied optical trapping sites. The fifth, sixth, seventh, eighth, and ninth atoms may be moved from different regions of the optical trapping unit (not shown in FIG. 3C) or by moving atoms from an atom reservoir described herein. Thus, the filling factor may be substantially improved following rearrangement of atoms within the optical trapping sites. For instance, a filling factor of up to 100% (such 9 atoms filling 9 available optical trapping sites, as shown in FIG. 3D) may be attained.

Atom rearrangement may be performed by (i) acquiring an image of the optical trapping unit, identifying filled and unfilled optical trapping sites, (ii) determining a set of moves to bring atoms from filled optical trapping sites to unfilled optical trapping sites, and (iii) moving the atoms from filled optical trapping sites to unfilled optical trapping sites. Operations (i), (ii), and (iii) may be performed iteratively until a large filling factor is achieved. Operation (iii) may comprise translating the moves identified in operation (ii) to waveforms that may be sent to an arbitrary waveform generator (AWG) and using the AWG to drive AODs to move the atoms. The set of moves may be determined using the Hungarian algorithm described in W. Lee et al, "Defect-Free Atomic Array Formation Using Hungarian Rearrangement Algorithm," Physical Review A 95, 053424 (2017), which is incorporated herein by reference in its entirety for all purposes.

Electromagnetic Delivery Units

FIG. 4 shows an example of an electromagnetic delivery unit 220. The electromagnetic delivery unit may be configured to apply electromagnetic energy to one or more atoms of the plurality of atoms, as described herein. The electromagnetic delivery unit may comprise one or more light sources, such as any light source described herein. The electromagnetic energy may comprise optical energy. The optical energy may comprise any repetition rate, pulse energy, average power, wavelength, or bandwidth described herein.

The electromagnetic delivery unit may comprise one or more microwave or radio-frequency (RF) energy sources, such as one or more magnetrons, klystrons, traveling-wave tubes, gyrotrons, field-effect transistors (FETs), tunnel diodes, Gunn diodes, impact ionization avalanche transit-time (IMPATT) diodes, or masers. The electromagnetic energy may comprise microwave energy or RF energy. The RF energy may comprise one or more wavelengths of at least about 1 millimeter (mm), 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, 1 meter (m), 2 m, 3 m, 4 m, 5 m, 6 m, 7 m, 8 m, 9 m, 10 m, 20 m, 30 m, 40 m, 50 m, 60 m, 70 m, 80 m, 90 m, 100 m, 200 m, 300 m, 400 m, 500 m, 600 m, 700 m, 800 m, 900 m, 1 kilometer (km), 2 km, 3 km, 4 km, 5 km, 6 km, 7 km, 8 km, 9 km, 10 km, or more. The RF energy may comprise one or more wavelengths of at most about 10 km, 9 km, 8 km, 7 km, 6 km, 5 km, 4 km, 3 km, 2 km, 1 km, 900 m, 800 m, 700 m, 600 m, 500 m, 400 m, 300 m, 200 m, 100 m, 90 m, 80 m, 70 m, 60 m, 50 m, 40 m, 30 m, 20 m, 10 m, 9 m, 8 m, 7 m, 6 m, 5 m, 4 m, 3 m, 2 m, 1 m, 900 mm, 800 mm, 700 mm, 600 mm, 500 mm, 400 mm, 300 mm, 200 mm, 100 mm, 90 mm, 80 mm, 70 mm, 60 mm, 50 mm, 40 mm, 30 mm, 20 mm, 10 mm, 9 mm, 8 mm, 7 mm, 6 mm, 5 mm, 4 mm, 3 mm, 2 mm, 1 mm, or less. The RF energy may comprise one or more wavelengths that are within a range defined by any two of the preceding values.

The RF energy may comprise an average power of at least about 1 microwatt (μW), 2 μW, 3 μW, 4 μW, 5 μW, 6 μW, 7 μW, 8 μW, 9 μW, 10 μW, 20 μW, 30 μW, 40 μW, 50 μW, 60 μW, 70 μW, 80 μW, 90 μW, 100 μW, 200 μW, 300 μW, 400 μW, 500 μW, 600 μW, 700 μW, 800 μW, 900 μW, 1 milliwatt (mW), 2 mW, 3 mW, 4 mW, 5 mW, 6 mW, 7 mW, 8 mW, 9 mW, 10 mW, 20 mW, 30 mW, 40 mW, 50 mW, 60 mW, 70 mW, 80 mW, 90 mW, 100 mW, 200 mW, 300 mW, 400 mW, 500 mW, 600 mW, 700 mW, 800 mW, 900 mW, 1 Watt (W), 2 W, 3 W, 4 W, 5 W, 6 W, 7 W, 8 W, 9 W, 10 W, 20 W, 30 W, 40 W, 50 W, 60 W, 70 W, 80 W, 90 W, 100 W, 200 W, 300 W, 400 W, 500 W, 600 W, 700 W, 800 W, 900 W, 1,000 W, or more. The RF energy may comprise an average power of at most about 1,000 W, 900 W, 800 W, 700 W, 600 W, 500 W, 400 W, 300 W, 200 W, 100 W, 90 W, 80 W, 70 W, 60 W, 50 W, 40 W, 30 W, 20 W, 10 W, 9 W, 8 W, 7 W, 6 W, 5 W, 4 W, 3 W, 2 W, 1 W, 900 mW, 800 mW, 700 mW, 600 mW, 500 mW, 400 mW, 300 mW, 200 mW, 100 mW, 90 mW, 80 mW, 70 mW, 60 mW, 50 mW, 40 mW, 30 mW, 20 mW, 10 mW, 9 mW, 8 mW, 7 mW, 6 mW, 5 mW, 4 mW, 3 mW, 2 mW, 1 mW, 900 µW, 800 µW, 700 µW, 600 µW, 500 µW, 400 µW, 300 µW, 200 µW, 100 µW, 90 µW, 80 µW, 70 µW, 60 µW, 50 µW, 40 µW, 30 µW, 20 µW, 10 µW, 9 µW, 8 µW, 7 µW, 6 µW, 5 µW, 4 µW, 3 µW, 2 µW, 1 µW, or less. The RF energy may comprise an average power that is within a range defined by any two of the preceding values.

The electromagnetic delivery unit may comprise one or more light sources, such as any light source described herein. For instance, the electromagnetic delivery unit may comprise light source 221. Although depicted as comprising a single light source in FIG. 4, the electromagnetic delivery unit may comprise any number of light sources, such as at least about 1, 2, 3, 4, 5, 6, 7, 8, 9, 10, or more light sources or at most about 10, 9, 8, 7, 6, 5, 4, 3, 2, or 1 light sources.

The light sources may be configured to direct light to one or more OMs configured to selectively apply the electromagnetic energy to one or more atoms of the plurality of atoms. For instance, the electromagnetic delivery unit may comprise OM 222. Although depicted as comprising a single OM in FIG. 4, the electromagnetic delivery unit may comprise any number of OMs, such as at least about 1, 2, 3, 4, 5, 6, 7, 8, 9, 10, or more OMs or at most about 10, 9, 8, 7, 6, 5, 4, 3, 2, or 1 OMs. The OMs may comprise one or more SLMs, AODs, or AOMs. The OMs may comprise one or more DMDs. The OMs may comprise one or more liquid crystal devices, such as one or more LCoS devices.

The electromagnetic delivery unit may comprise one or more electromagnetic energy artificial intelligence (AI) units configured to perform one or more AI operations to selectively apply the electromagnetic energy to the atoms. For instance, the electromagnetic delivery unit may comprise AI unit 223. Although depicted as comprising a single AI unit in FIG. 4, the electromagnetic delivery unit may comprise any number of AI units, such as at least about 1, 2, 3, 4, 5, 6, 7, 8, 9, 10, or more AI units or at most about 10, 9, 8, 7, 6, 5, 4, 3, 2, or 1 AI units. The AI operations may comprise any machine learning (ML) or reinforcement learning (RL) operations described herein.

The electromagnetic delivery unit may be configured to apply one or more single-qubit operations (such as one or more single-qubit gate operations) on the qubits described herein. The electromagnetic delivery unit may be configured to apply one or more two-qubit operations (such as one or more two-qubit gate operations) on the two-qubit units described herein. Each single-qubit or two-qubit operation may comprise a duration of at least about 10 nanoseconds (ns), 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 microsecond (µs), 2 µs, 3 µs, 4 µs, 5 µs, 6 µs, 7 µs, 8 µs, 9 µs, 10 µs, 20 µs, 30 µs, 40 µs, 50 µs, 60 µs, 70 µs, 80 µs, 90 µs, 100 µs, or more. Each single-qubit or two-qubit operation may comprise a duration of at most about 100 µs, 90 µs, 80 µs, 70 µs, 60 µs, 50 µs, 40 µs, 30 µs, 20 µs, 10 µs, 9 µs, 8 µs, 7 µs, 6 µs, 5 µs, 4 µs, 3 µs, 2 µs, 1 µs, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, or less. Each single-qubit or two-qubit operation may comprise a duration that is within a range defined by any two of the preceding values. The single-qubit or two-qubit operations may be applied with a repetition frequency of at least 1 kilohertz (kHz), 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1,000 kHz, or more. The single-qubit or two-qubit operations may be applied with a repetition frequency of at most 1,000 kHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, or less. The single-qubit or two-qubit operations may be applied with a repetition frequency that is within a range defined by any two of the preceding values.

The electromagnetic delivery unit may be configured to apply one or more single-qubit operations by inducing one or more Raman transitions between a first qubit state and a second qubit state described herein. The Raman transitions may be detuned from a $^3P_0$ or $^3P_1$ line described herein. For instance, the Raman transitions may be detuned by at least about 1 kHz, 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 MHz, 2 MHz, 3 MHz, 4 MHz, 5 MHz, 6 MHz, 7 MHz, 8 MHz, 9 MHz, 10 MHz, 20 MHz, 30 MHz, 40 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 1 GHz, or more. The Raman transitions may be detuned by at most about 1 GHz, 900 MHz, 800 MHz, 700 MHz, 600 MHz, 500 MHz, 400 MHz, 300 MHz, 200 MHz, 100 MHz, 90 MHz, 80 MHz, 70 MHz, 60 MHz, 50 MHz, 40 MHz, 30 MHz, 20 MHz, 10 MHz, 9 MHz, 8 MHz, 7 MHz, 6 MHz, 5 MHz, 4 MHz, 3 MHz, 2 MHz, 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, or less. The Raman transitions may be detuned by a value that is within a range defined by any two of the preceding values.

Raman transitions may be induced on individually selected atoms using one or more spatial light modulators (SLMs) or acousto-optic deflectors (AODs) to impart a deflection angle and/or a frequency shift to a light beam based on an applied radio-frequency (RF) signal. The SLM or AOD may be combined with an optical conditioning system that images the SLM or AOD active region onto the back focal plane of a microscope objective. The microscope objective may perform a spatial Fourier transform on the optical field at the position of the SLM or AOD. As such, angle (which may be proportional to RF frequency) may be converted into position. For example, applying a comb of radio frequencies to an AOD may generate a linear array of spots at a focal plane of the objective, with each spot having a finite extent determined by the characteristics of the optical conditioning system (such as the point spread function of the optical conditioning system).

To perform a Raman transition on a single atom with a single SLM or AOD, a pair of frequencies may be applied to the SLM or AOD simultaneously. The two frequencies of the pair may have a frequency difference that matches or nearly matches the splitting energy between the first and second qubit states. For instance, the frequency difference may differ from the splitting energy by at most about 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, 900 Hz, 800 Hz, 700 Hz, 600 Hz, 500 Hz, 400 Hz, 300 Hz, 200 Hz, 100 Hz, 90 Hz, 80 Hz, 70 Hz, 60 Hz, 50 Hz, 40 Hz, 30 Hz, 20 Hz, 10 Hz, 9 Hz, 8 Hz, 7 Hz, 6 Hz, 5 Hz, 4 Hz, 3 Hz, 2 Hz, 1 Hz, or less. The frequency difference may differ from the splitting energy by at least about 1 Hz, 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, 1 kHz, 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 MHz, or more. The frequency difference may differ from the splitting energy by about 0 Hz. The frequency difference may differ from the splitting energy by a value that is within a range defined by any two of the preceding values. The optical system may be configured such that the position spacing corresponding to the frequency difference is not resolved and such that light at both of the two frequencies interacts with a single atom.

The electromagnetic delivery units may be configured to provide a beam with a characteristic dimension of at least about 10 nm, 50 nm, 75 nm, 100 nm, 125 nm, 150 nm, 175 nm, 200 nm, 225 nm, 250 nm, 275 nm, 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, 1 micrometer (μm), 1.5 μm, 2 μm, 2.5 μm 3 μm, 3.5 μm, 4 μm, 4.5 μm, 5 μm, 5.5 μm, 6 μm, 6.5 μm, 7 μm, 7.5 μm, 8 μm, 8.5 μm, 9 μm, 9.5 μm, 10 μm, or more. The electromagnetic delivery units may be configured to provide a beam with a characteristic dimension of at most about 10 μm, 9.5 μm, 9 μm, 8.5 μm, 8 μm, 7.5 μm, 7 μm, 6.5 μm, 6 μm, 5.5 μm, 5 μm, 4.5 μm, 4 μm, 3.5 μm, 3 μm, 2.5 μm, 2 μm, 1.5 μm, 1 μm, 975 nm, 950 nm, 925 nm, 900 nm, 875 nm, 850 nm, 825 nm, 800 nm, 775 nm, 750 nm, 725 nm, 700 nm, 675 nm, 650 nm, 625 nm, 600 nm, 575 nm, 550 nm, 525 nm, 500 nm, 475 nm, 450 nm, 425 nm, 400 nm, 375 nm, 350 nm, 325 nm, 300 nm, 275 nm, 250 nm, 225 nm, 200 nm, 175 nm, 150 nm, 125 nm, 100 nm, 75 nm, 25 nm, 10 nm, or less. The electromagnetic delivery units may be configured to provide a beam with a characteristic dimension as defined by any two of the proceeding values. For example, the beam can have a characteristic dimension of about 1.5 micrometers to about 2.5 micrometers. Examples of characteristic dimensions include, but are not limited to, a Gaussian beam waist, the full width at half maximum (FWHM) of the beam size, the beam diameter, the $1/e^2$ width, the D4σ width, the D86 width, and the like. For example, the beam may have a Gaussian beam waist of at least about 1.5 micrometers.

The characteristic dimension of the beam may be bounded at the low end by the size of the atomic wavepacket of an optical trapping site. For example, the beam can be formed such that the intensity variation of the beam over the trapping site is sufficiently small as to be substantially homogeneous over the trapping site. In this example, the beam homogeneity can improve the fidelity of a qubit in the trapping site. The characteristic dimension of the beam may be bounded at the high end by the spacing between trapping sites. For example, a beam can be formed such that it is small enough that the effect of the beam on a neighboring trapping site/atom is negligible. In this example, the effect may be negligible if the effect can be minimized by techniques such as, for example, composite pulse engineering. The characteristic dimension may be different from a maximum achievable resolution of the system. For example, a system can have a maximum resolution of 700 nm, but the system may be operated at 1.5 micrometers. In this example, the value of the characteristic dimension may be selected to optimize the performance of the system in view of the considerations described elsewhere herein. The characteristic dimension may be invariant for different maximally achievable resolutions. For example, a system with a maximum resolution of 500 nm and a system with a maximum resolution of 2 micrometers may both be configured to operate at a characteristic dimension of 2 micrometers. In this example, 2 micrometers may be the optimal resolution based on the size of the trapping sites.

Integrated Optical Trapping Units and Electromagnetic Delivery Units

The optical trapping units and electromagnetic delivery units described herein may be integrated into a single optical system. A microscope objective may be used to deliver electromagnetic radiation generated by an electromagnetic delivery unit described herein and to deliver light for trapping atoms generated by an optical trapping unit described herein. Alternatively or in addition, different objectives may be used to deliver electromagnetic radiation generated by an electromagnetic delivery unit and to deliver light from trapping atoms generated by an optical trapping unit.

A single SLM or AOD may allow the implementation of qubit operations (such as any single-qubit or two-qubit operations described herein) on a linear array of atoms. Alternatively or in addition, two separate SLMs or AODs may be configured to each handle light with orthogonal polarizations. The light with orthogonal polarizations may be overlapped before the microscope objective. In such a scheme, each photon used in a two-photon transition described herein may be passed to the objective by a separate SLM or AOD, which may allow for increased polarization control. Qubit operations may be performed on a two-dimensional arrangement of atoms by bringing light from a first SLM or AOD into a second SLM or AOD that is oriented substantially orthogonally to the first SLM or AOD via an optical relay. Alternatively or in addition, qubit operations may be performed on a two-dimensional arrangement of atoms by using a one-dimensional array of SLMs or AODs.

The stability of qubit gate fidelity may be improved by maintaining overlap of light from the various light sources described herein (such as light sources associated with the optical trapping units or electromagnetic delivery units described herein). Such overlap may be maintained by an optical subsystem that measures the direction of light emitted by the various light sources, allowing closed-loop control of the direction of light emission. The optical subsystem may comprise a pickoff mirror located before the microscope objective. The pickoff mirror may be configured to direct a small amount of light to a lens, which may focus a collimated beam and convert angular deviation into position deviation. A position-sensitive optical detector, such as a lateral-effect position sensor or quadrant photodiode, may convert the position deviation into an electronic signal and information about the deviation may be fed into a compensation optic, such as an active mirror.

The stability of qubit gate manipulation may be improved by controlling the intensity of light from the various light sources described herein (such as light sources associated with the optical trapping units or electromagnetic delivery units described herein). Such intensity control may be maintained by an optical subsystem that measures the intensity of light emitted by the various light sources, allowing closed-loop control of the intensity. Each light source may be coupled to an intensity actuator, such as an intensity servo control. The actuator may comprise an acousto-optic modulator (AOM) or electro-optic modulator (EOM). The intensity may be measured using an optical detector, such as a photodiode or any other optical detector described herein.

Information about the intensity may be integrated into a feedback loop to stabilize the intensity.

State Preparation Units

Figure 5:
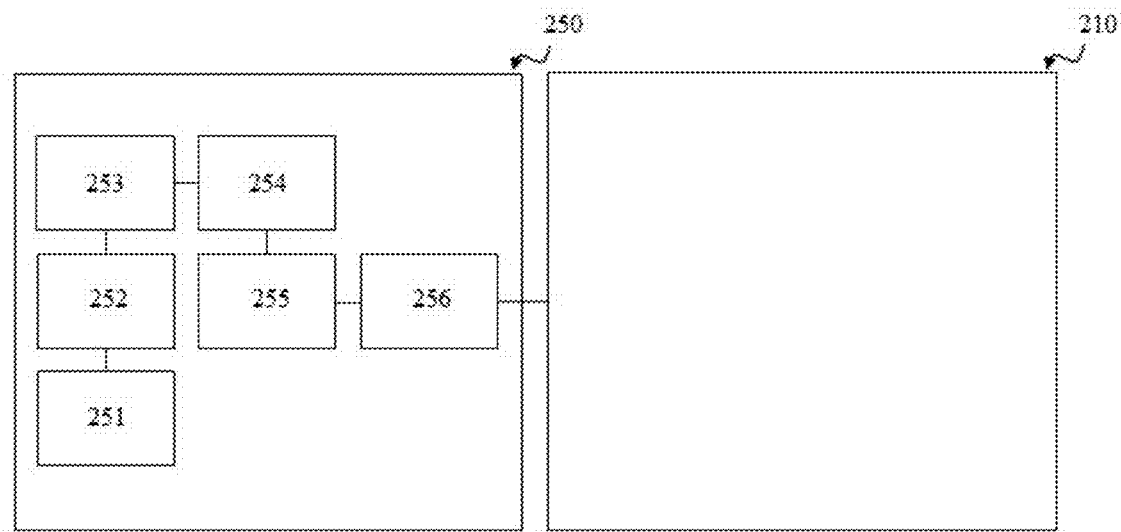
FIG. 5 shows an example of a state preparation unit.

FIG. 5 shows an example of a state preparation unit 250. The state preparation unit may be configured to prepare a state of the plurality of atoms, as described herein. The state preparation unit may be coupled to the optical trapping unit and may direct atoms that have been prepared by the state preparation unit to the optical trapping unit. The state preparation unit may be configured to cool the plurality of atoms. The state preparation unit may be configured to cool the plurality of atoms prior to trapping the plurality of atoms at the plurality of optical trapping sites.

The state preparation unit may comprise one or more Zeeman slowers. For instance, the state preparation unit may comprise a Zeeman slower 251. Although depicted as comprising a single Zeeman slower in FIG. 5, the state preparation may comprise any number of Zeeman slowers, such as at least about 1, 2, 3, 4, 5, 6, 7, 8, 9, 10, or more Zeeman slowers or at most about 10, 9, 8, 7, 6, 5, 4, 3, 2, or 1 Zeeman slowers. The Zeeman slowers may be configured to cool one or more atoms of the plurality of atoms from a first velocity or distribution of velocities (such an emission velocity from an of an atom source, room temperature, liquid nitrogen temperature, or any other temperature) to a second velocity that is lower than the first velocity or distribution of velocities.

The first velocity or distribution of velocities may be associated with a temperature of at least about 50 Kelvin (K), 60 K, 70 K, 80 K, 90 K, 100 K, 200 K, 300 K, 400 K, 500 K, 600 K, 700 K, 800 K, 900 K, 1,000 K, or more. The first velocity or distribution of velocities may be associated with a temperature of at most about 1,000 K, 900 K, 800 K, 700 K, 600 K, 500 K, 400 K, 300 K, 200 K, 100 K, 90 K, 80 K, 70 K, 60 K, 50 K, or less. The first velocity or distribution of velocities may be associated with a temperature that is within a range defined by any two of the preceding values. The second velocity may be at least about 1 meter per second (m/s), 2 m/s, 3 m/s, 4 m/s, 5 m/s, 6 m/s, 7 m/s, 8 m/s, 9 m/s, 10 m/s, or more. The second velocity may be at most about 10 m/s, 9 m/s, 8 m/s, 7 m/s, 6 m/s, 5 m/s, 4 m/s, 3 m/s, 2 m/s, 1 m/s, or less. The second velocity may be within a range defined by any two of the preceding values. The Zeeman slowers may comprise 1D Zeeman slowers.

The state preparation unit may comprise a first magneto-optical trap (MOT) 252. The first MOT may be configured to cool the atoms to a first temperature. The first temperature may be at most about 10 millikelvin (mK), 9 mK, 8 mK, 7 mK, 6 mK, 5 mK, 4 mK, 3 mK, 2 mK, 1 mK, 0.9 mK, 0.8 mK, 0.7 mK, 0.6 mK, 0.5 mK, 0.4 mK, 0.3 mK, 0.2 mK, 0.1 mK, or less. The first temperature may be at least about 0.1 mK, 0.2 mK, 0.3 mK, 0.4 mK, 0.5 mK, 0.6 mK, 0.7 mK, 0.8 mK, 0.9 mK, 1 mK, 2 mK, 3 mK, 4 mK, 5 mK, 6 mK, 7 mK, 8 mK, 9 mK, 10 mK, or more. The first temperature may be within a range defined by any two of the preceding values. The first MOT may comprise a 1D, 2D, or 3D MOT.

The first MOT may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The state preparation unit may comprise a second MOT 253. The second MOT may be configured to cool the atoms from the first temperature to a second temperature that is lower than the first temperature. The second temperature may be at most about 100 microkelvin (μK), 90 μK, 80 μK, 70 μK, 60 μK, 50 μK, 40 μK, 30 μK, 20 μK, 10 μK, 9 μK, 8 μK, 7 μK, 6 μK, 5 μK, 4 μK, 3 μK, 2 μK, 1 μK, 900 nanokelvin (nK), 800 nK, 700 nK, 600 nK, 500 nK, 400 nK, 300 nK, 200 nK, 100 nK, or less. The second temperature may be at least about 100 nK, 200 nK, 300 nK, 400 nK, 500 nK, 600 nK, 700 nK, 800 nK, 900 nK, 1 μK, 2 μK, 3 μK, 4 μK, 5 μK, 6 μK, 7 μK, 8 μK, 9 μK, 10 μK, 20 μK, 30 μK, 40 μK, 50 μK, 60 μK, 70 μK, 80 μK, 90 μK, 100 μK, or more. The second temperature may be within a range defined by any two of the preceding values. The second MOT may comprise a 1D, 2D, or 3D MOT.

The second MOT may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

Although depicted as comprising two MOTs in FIG. 5, the state preparation unit may comprise any number of MOTs, such as at least about 1, 2, 3, 4, 5, 6, 7, 8, 9, 10, or more MOTs or at most about 10, 9, 8, 7, 6, 5, 4, 3, 2, or 1 MOTs.

The state preparation unit may comprise one or more sideband cooling units or Sisyphus cooling units (such as a sideband cooling unit described in www.arxiv.org/abs/1810.06626 or a Sisyphus cooling unit described in www.arxiv.org/abs/1811.06014, each of which is incorporated herein by reference in its entirety for all purposes). For instance, the state preparation unit may comprise sideband cooling unit or Sisyphus cooling unit 254. Although depicted as comprising a single sideband cooling unit or Sisyphus cooling unit in FIG. 5, the state preparation may comprise any number of sideband cooling units or Sisyphus cooling units, such as at least about 1, 2, 3, 4, 5, 6, 7, 8, 9, 10, or more sideband cooling units or Sisyphus cooling units, or at most about 10, 9, 8, 7, 6, 5, 4, 3, 2, or 1 sideband cooling units or Sisyphus cooling units. The sideband cooling units or Sisyphus cooling units may be configured to use sideband cooling to cool the atoms from the second temperature to a third temperature that is lower than the second temperature. The third temperature may be at most about 10 µK, 9 µK, 8 µK, 7 µK, 6 µK, 5 µK, 4 µK, 3 µK, 2 µK, 1 µK, 900 nK, 800 nK, 700 nK, 600 nK, 500 nK, 400 nK, 300 nK, 200 nK, 100 nK, 90 nK, 80 nK, 70 nK, 60 nK, 50 nK, 40 nK, 30 nK, 20 nK, 10 nK, or less. The third temperature may be at most about 10 nK, 20 nK, 30 nK, 40 nK, 50 nK, 60 nK, 70 nK, 80 nK, 90 nK, 100 nK, 200 nK, 300 nK, 400 nK, 500 nK, 600 nK, 700 nK, 800 nK, 900 nK, 1 µK, 2 µK, 3 µK, 4 µK, 5 µK, 6 µK, 7 µK, 8 µK, 9 µK, 10 µK, or more. The third temperature may be within a range defined by any two of the preceding values.

The sideband cooling units or Sisyphus cooling units may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The state preparation unit may comprise one or more optical pumping units. For instance, the state preparation unit may comprise optical pumping unit 255. Although depicted as comprising a single optical pumping unit in FIG. 5, the state preparation may comprise any number of optical pumping units, such as at least about 1, 2, 3, 4, 5, 6, 7, 8, 9, 10, or more optical pumping units, or at most about 10, 9, 8, 7, 6, 5, 4, 3, 2, or 1 optical pumping units. The optical pumping units may be configured to emit light to optically pump the atoms from an equilibrium distribution of atomic states to a non-equilibrium atomic state. For instance, the optical pumping units may be configured to emit light to optically pump the atoms from an equilibrium distribution of atomic states to a single pure atomic state. The optical pumping units may be configured to emit light to optically pump the atoms to a ground atomic state or to any other atomic state. The optical pumping units may be configured to optically pump the atoms between any two atomic states. The optical pumping units may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The state preparation unit may comprise one or more coherent driving units. For instance, the state preparation unit may comprise coherent driving unit 256. Although depicted as comprising a coherent driving unit in FIG. 5, the state preparation may comprise any number of coherent driving units, such as at least about 1, 2, 3, 4, 5, 6, 7, 8, 9, 10, or more coherent driving units or at most about 10, 9, 8, 7, 6, 5, 4, 3, 2, or 1 coherent driving units. The coherent driving units may be configured to coherently drive the atoms from the non-equilibrium state to the first or second atomic states described herein. Thus, the atoms may be optically pumped to an atomic state that is convenient to access (for instance, based on availability of light sources that emit particular wavelengths or based on other factors) and then coherently driven to atomic states described herein that are useful for performing quantum computations. The coherent driving units may be configured to induce a single photon transition between the non-equilibrium state and the first or second atomic state. The coherent driving units may be configured to induce a two-photon transition between the non-equilibrium state and the first or second atomic state.

The two-photon transition may be induced using light from two light sources described herein (such as two lasers described herein).

The coherent driving units may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The coherent driving units may be configured to induce an RF transition between the non-equilibrium state and the first or second atomic state. The coherent driving units may comprise one or more electromagnetic radiation sources configured to emit electromagnetic radiation configured to induce the RF transition. For instance, the coherent driving units may comprise one or more RF sources (such as any RF source described herein) configured to emit RF radiation. The RF radiation may comprise one or more wavelengths of at least about 10 centimeters (cm), 20 cm, 30 cm, 40 cm, 50 cm, 60 cm, 70 cm, 80 cm, 90 cm, 1 meter (m), 2 m, 3 m, 4 m, 5 m, 6 m, 7 m, 8 m, 9 m, 10 m, or more. The RF radiation may comprise one or more wavelengths of at most about 10 m, 9 m, 8 m, 7 m, 6 m, 5 m, 4 m, 3 m, 2 m, 1 m, 90 cm, 80 cm, 70 cm, 60 cm, 50 cm, 40 cm, 30 cm, 20 cm, 10 cm, or less. The RF radiation may comprise one or more wavelengths that are within a range defined by any two of the preceding values. Alternatively or in addition, the coherent driving units may comprise one or more light sources (such as any light sources described herein) configured to induce a two-photon transition corresponding to the RF transition.

Controllers

The optical trapping units, electromagnetic delivery units, entanglement units, readout optical units, vacuum units, imaging units, spatial configuration AI units, spatial arrangement AI units, atom rearrangement units, state preparation units, sideband cooling units, optical pumping units, coherent driving units, electromagnetic energy AI units, atom reservoirs, atom movement units, or Rydberg excitation units may include one or more circuits or controllers (such as one or more electronic circuits or controllers) that is connected (for instance, by one or more electronic connections) to the optical trapping units, electromagnetic delivery units, entanglement units, readout optical units, vacuum units, imaging units, spatial configuration AI units, spatial arrangement AI units, atom rearrangement units, state preparation units, sideband cooling units, optical pumping units, coherent driving units, electromagnetic energy AI units, atom reservoirs, atom movement units, or Rydberg excitation units. The circuits or controllers may be configured to control the optical trapping units, electromagnetic delivery units, entanglement units, readout optical units, vacuum units, imaging units, spatial configuration AI units, spatial arrangement AI units, atom rearrangement units, state preparation units, sideband cooling units, optical pumping units, coherent driving units, electromagnetic energy AI units, atom reservoirs, atom movement units, or Rydberg excitation units.

Non-Classical Computers

In an aspect, the present disclosure provides a non-classical computer comprising: a plurality of qubits comprising greater than 60 atoms, each atom trapped within an optical trapping site of a plurality of spatially distinct optical trapping sites, wherein the plurality of qubits comprise at least a first qubit state and a second qubit state, wherein the first qubit state comprises a first atomic state and the second qubit state comprises a second atomic state; one or more electromagnetic delivery units configured to apply electromagnetic energy to one or more qubits of the plurality of qubits, thereby imparting a non-classical operation to the one or more qubits, which non-classical operation includes a superposition between at least the first qubit state and the second qubit state; one or more entanglement units configured to quantum mechanically entangle at least a subset of the plurality of qubits in the superposition with at least another qubit of the plurality of qubits; and one or more readout optical units configured to perform one or more measurements of the one or more qubits, thereby obtaining a non-classical computation.

In an aspect, the present disclosure provides a non-classical computer comprising a plurality of qubits comprising greater than 60 atoms each trapped within an optical trapping site of a plurality of spatially distinct optical trapping sites.

Methods for Performing a Non-Classical Computation

In an aspect, the present disclosure provides a method for performing a non-classical computation, comprising: (a) generating a plurality of spatially distinct optical trapping sites, the plurality of optical trapping sites configured to trap a plurality of atoms, the plurality of atoms comprising greater than 60 atoms; (b) applying electromagnetic energy to one or more atoms of the plurality of atoms, thereby inducing the one or more atoms to adopt one or more superposition states of a first atomic state and at least a second atomic state that is different from the first atomic state; (c) quantum mechanically entangling at least a subset of the one or more atoms in the one or more superposition states with at least another atom of the plurality of atoms; and (d) performing one or more optical measurements of the one or more superposition state to obtain the non-classical computation.

Figure 6:
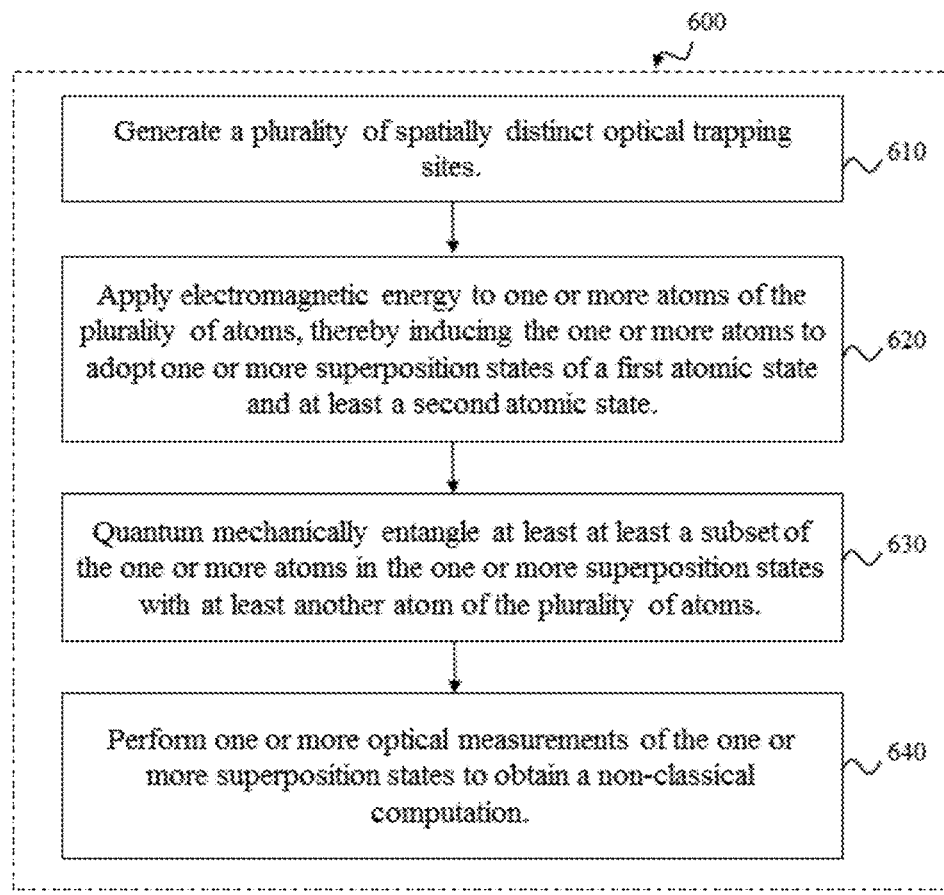
FIG. 6 shows a flowchart for an example of a first method for performing a non-classical computation.

FIG. 6 shows a flowchart for an example of a first method 600 for performing a non-classical computation.

In a first operation 610, the method 600 may comprise generating a plurality of spatially distinct optical trapping sites. The plurality of optical trapping sites may be configured to trap a plurality of atoms. The plurality of atoms may comprise greater than 60 atoms. The optical trapping sites may comprise any optical trapping sites described herein. The atoms may comprise any atoms described herein.

In a second operation 620, the method 600 may comprise applying electromagnetic energy to one or more atoms of the plurality of atoms, thereby inducing the one or more atoms to adopt one or more superposition states of a first atomic state and at least a second atomic state that is different from the first atomic state. The electromagnetic energy may comprise any electromagnetic energy described herein. The first atomic state may comprise any first atomic state described herein. The second atomic state may comprise any second atomic state described herein.

In a third operation 630, the method 600 may comprise quantum mechanically entangling at least a subset of the one or more atoms in the one or more superposition states with at least another atom of the plurality of atoms. The atoms may be quantum mechanically entangled in any manner described herein (for instance, as described herein with respect to FIG. 2).

In a fourth operation 640, the method 600 may comprise performing one or more optical measurements of the one or more superposition state to obtain the non-classical computation. The optical measurements may comprise any optical measurements described herein.

In an aspect, the present disclosure provides a method for performing a non-classical computation, comprising: (a) providing a plurality of qubits comprising greater than 60 atoms, each atom trapped within an optical trapping site of a plurality of spatially distinct optical trapping sites, wherein the plurality of qubits comprise at least a first qubit state and a second qubit state, wherein the first qubit state comprises a first atomic state and the second qubit state comprises a second atomic state; (b) applying electromagnetic energy to one or more qubits of the plurality of qubits, thereby imparting a non-classical operation to the one or more qubits, which non-classical operation includes a superposition between at least the first qubit state and the second qubit state; (c) quantum mechanically entangling at least a subset of the plurality of qubits in the superposition with at least another qubit of the plurality of qubits; and (d) performing one or more optical measurements of the one or more qubits, thereby obtaining said the-classical computation.

Figure 7:
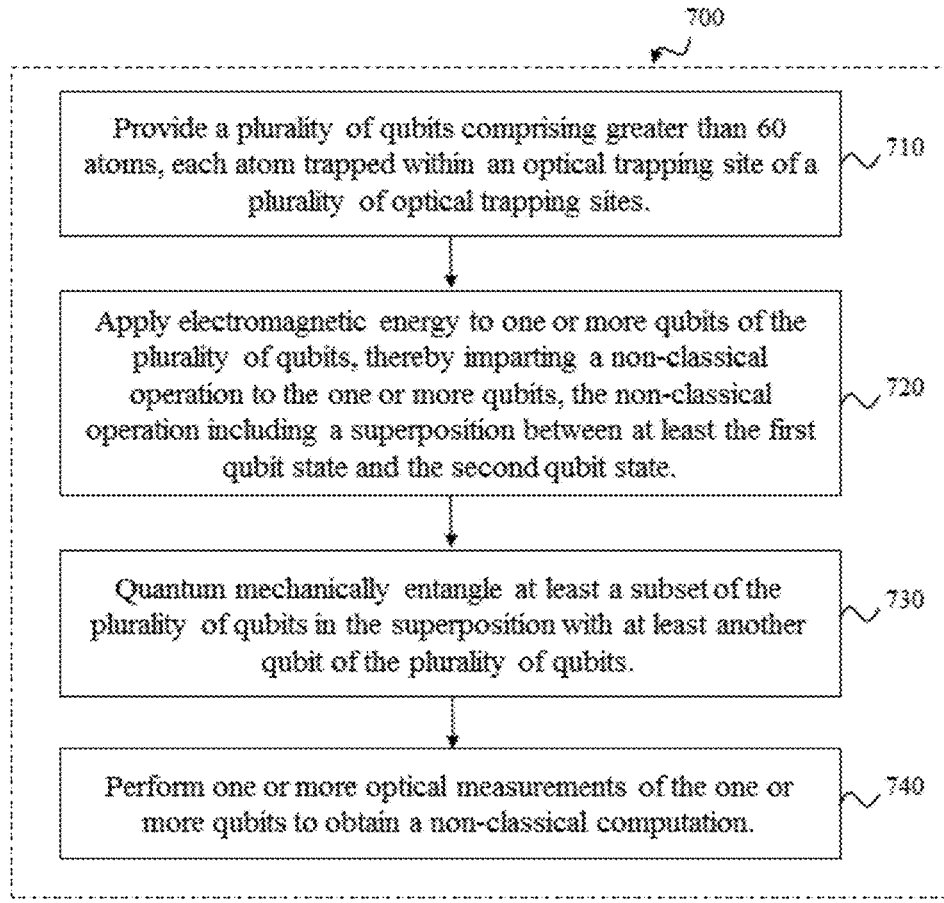
FIG. 7 shows a flowchart for an example of a second method for performing a non-classical computation.

FIG. 7 shows a flowchart for an example of a second method 700 for performing a non-classical computation.

In a first operation 710, the method 700 may comprise providing a plurality of qubits comprising greater than 60 atoms, each atom trapped within an optical trapping site of a plurality of spatially distinct optical trapping sites, wherein the plurality of qubits comprise at least a first qubit state and a second qubit state, wherein the first qubit state comprises a first atomic state and the second qubit state comprises a second atomic state. The optical trapping sites may comprise any optical trapping sites described herein. The qubits may comprise any qubits described herein. The atoms may comprise any atoms described herein. The first qubit state may comprise any first qubit state described herein. The second qubit state may comprise any second qubit state described herein. The first atomic state may comprise any first atomic state described herein. The second atomic state may comprise any second atomic state described herein.

In a second operation 720, the method 700 may comprise applying electromagnetic energy to one or more qubits of the plurality of qubits, thereby imparting a non-classical operation to the one or more qubits, which non-classical operation includes a superposition between at least the first qubit state and the second qubit state. The electromagnetic energy may comprise any electromagnetic energy described herein.

In a third operation 730, the method 700 may comprise quantum mechanically entangling at least a subset of the plurality of qubits in the superposition with at least another qubit of the plurality of qubits. The qubits may be quantum mechanically entangled in any manner described herein (for instance, as described herein with respect to FIG. 2).

In a fourth operation 740, the method 700 may comprise performing one or more optical measurements of the one or more qubits, thereby obtaining the non-classical computation. The optical measurements may comprise any optical measurements described herein.

In an aspect, the present disclosure provides a method for performing a non-classical computation, comprising: (a) providing a plurality of qubits comprising greater than 60 atoms each trapped within an optical trapping site of a plurality of spatially distinct optical trapping sites, and (b) using at least a subset of the plurality of qubits to perform the non-classical computation.

Figure 8:
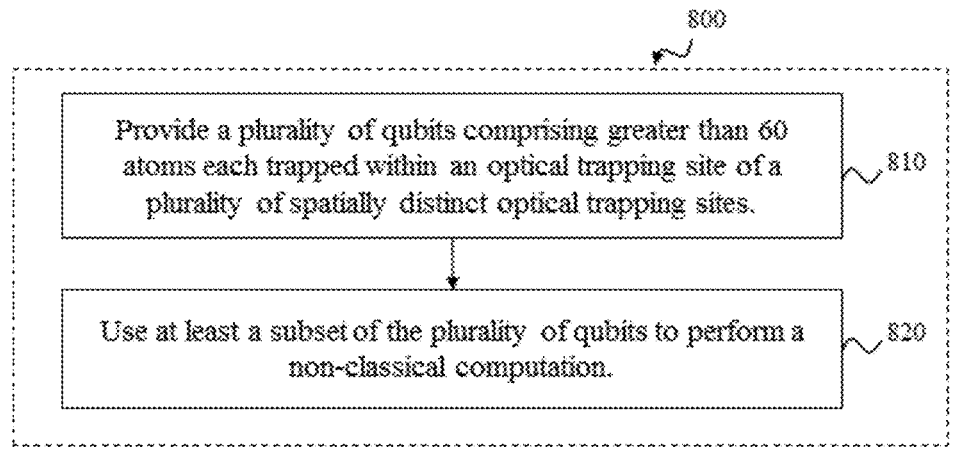
FIG. 8 shows a flowchart for an example of a third method for performing a non-classical computation.

FIG. 8 shows a flowchart for an example of a third method 800 for performing a non-classical computation.

In a first operation 810, the method 800 may comprise providing a plurality of qubits comprising greater than 60 atoms each trapped within an optical trapping site of a plurality of spatially distinct optical trapping sites. The qubits may comprise any qubits described herein. The atoms may comprise any atoms described herein. The optical trapping sites may comprise any optical trapping sites described herein.

In a second operation 820, the method 800 may comprise using at least a subset of the plurality of qubits to perform a non-classical computation.

Computer Systems

FIG. 1 shows a computer system 101 that is programmed or otherwise configured to operate any method or system described herein (such as system or method for performing a non-classical computation described herein). The computer system 101 can regulate various aspects of the present disclosure. The computer system 101 can be an electronic device of a user or a computer system that is remotely located with respect to the electronic device. The electronic device can be a mobile electronic device.

The computer system 101 includes a central processing unit (CPU, also "processor" and "computer processor" herein) 105, which can be a single core or multi core processor, or a plurality of processors for parallel processing. The computer system 101 also includes memory or memory location 110 (e.g., random-access memory, read-only memory, flash memory), electronic storage unit 115 (e.g., hard disk), communication interface 120 (e.g., network adapter) for communicating with one or more other systems, and peripheral devices 125, such as cache, other memory, data storage and/or electronic display adapters. The memory 110, storage unit 115, interface 120 and peripheral devices 125 are in communication with the CPU 105 through a communication bus (solid lines), such as a motherboard. The storage unit 115 can be a data storage unit (or data repository) for storing data. The computer system 101 can be operatively coupled to a computer network ("network") 130 with the aid of the communication interface 120. The network 130 can be the Internet, an internet and/or extranet, or an intranet and/or extranet that is in communication with the Internet. The network 130 in some cases is a telecommunication and/or data network. The network 130 can include one or more computer servers, which can enable distributed computing, such as cloud computing. The network 130, in some cases with the aid of the computer system 101, can implement a peer-to-peer network, which may enable devices coupled to the computer system 101 to behave as a client or a server.

The CPU 105 can execute a sequence of machine-readable instructions, which can be embodied in a program or software. The instructions may be stored in a memory location, such as the memory 110. The instructions can be directed to the CPU 105, which can subsequently program or otherwise configure the CPU 105 to implement methods of the present disclosure. Examples of operations performed by the CPU 105 can include fetch, decode, execute, and writeback.

The CPU 105 can be part of a circuit, such as an integrated circuit. One or more other components of the system 101 can be included in the circuit. In some cases, the circuit is an application specific integrated circuit (ASIC).

The storage unit 115 can store files, such as drivers, libraries and saved programs. The storage unit 115 can store user data, e.g., user preferences and user programs. The computer system 101 in some cases can include one or more additional data storage units that are external to the computer system 101, such as located on a remote server that is in communication with the computer system 101 through an intranet or the Internet.

The computer system 101 can communicate with one or more remote computer systems through the network 130. For instance, the computer system 101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 101 via the network 130.

Methods as described herein can be implemented by way of machine (e.g., computer processor) executable code stored on an electronic storage location of the computer system 101, such as, for example, on the memory 110 or electronic storage unit 115. The machine executable or machine-readable code can be provided in the form of software. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 101 can include or be in communication with an electronic display 135 that comprises a user interface (UI) 140. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 105. The algorithm can, for example, implement methods for performing a non-classical computation described herein.

EXAMPLES

Example 1: Modeling of Strontium-87 Nuclear Spin Levels

In the following example, the ten nuclear spin levels of strontium-87 (I=9/2) were modeled to demonstrate a 2-level system (i.e. a qubit). In order to achieve spectral isolation of the qubit transition, a Stark-shift scheme was employed that shifts undesired transitions away from the qubit frequency. Isolation schemes may improve the effective isolation with respect to achievable Rabi frequencies, may reduce effects on the actual qubit states via shifts or residual scattering, may not require perfect polarization control, may be accessible with reasonable amounts of optical power, etc. The properties of the $^1S_0$ to $^3P_1$ resonance were characterized.

Figure 10A:
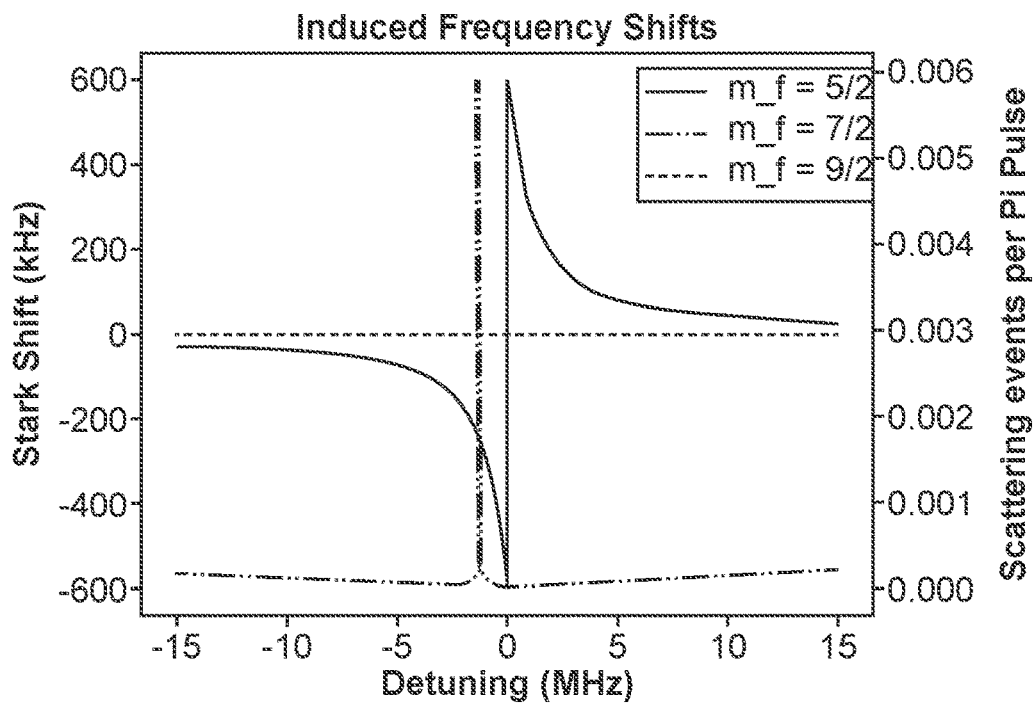
FIG. 10A and FIG. 10B show Stark shift simulations of $^1S_0$ hyperfine states of strontium-87.

In FIG. 10A, a toy model was utilized to demonstrate the shifts of the three relevant nuclear spin states: the $m_F=9/2$ and 7/2 levels which make the qubit subspace and the leakage level 5/2. Here, the behavior of a single, circularly-polarized global ac Stark beam addressing an array of atoms in a 700 Gauss magnetic field has been simulated. In addition, 100:1 polarization purity was assumed with the intended circular polarization. At each detuning of the AC Stark beam from the $^1S_0$ to $^3P_1$ resonance, the shifts experienced for each nuclear spin level. To further clarify, both the qubit frequency (difference between $m_F=9/2$ and $m_F=7/2$ dressed energy) and the leakage transition frequency (difference between the $m_F=7/2$ and the $m_F=5/2$ dressed state) were plotted.

Figure 10B:
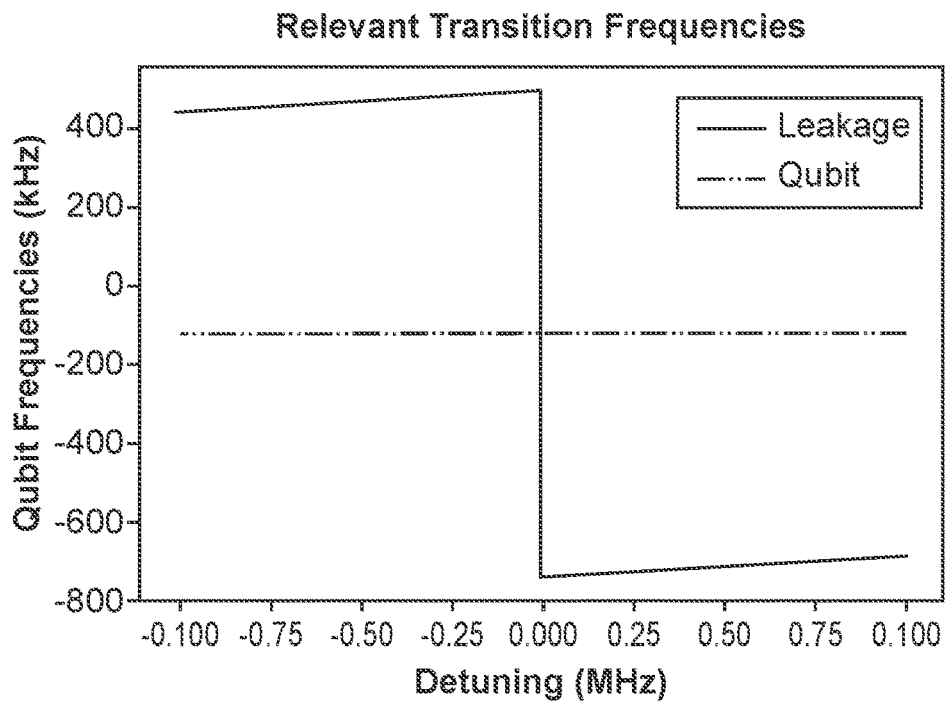

FIG. 10B shows that the Stark shifting moved the leakage transition considerably while minimally affecting the qubit frequency. This may be enabled by the narrow linewidth of the $^3P_1$ resonance relative to level splittings at high magnetic fields. Although the frequencies were plotted as signed quantities, subtleties associated with the quantization axis and light delivery make the absolute value of this frequency relevant and as such features emerge where Stark shifts push the leakage state into close proximity with the qubit frequency. At each detuning one can define a maximum useable Rabi frequency achievable given the frequency crowding. With this two-photon Rabi frequency a pi-pulse time can be inferred, and one can look at the number of scattering events that occur due to the off-resonant interaction of the AC Stark beam (FIG. 10A).

Figure 11A:
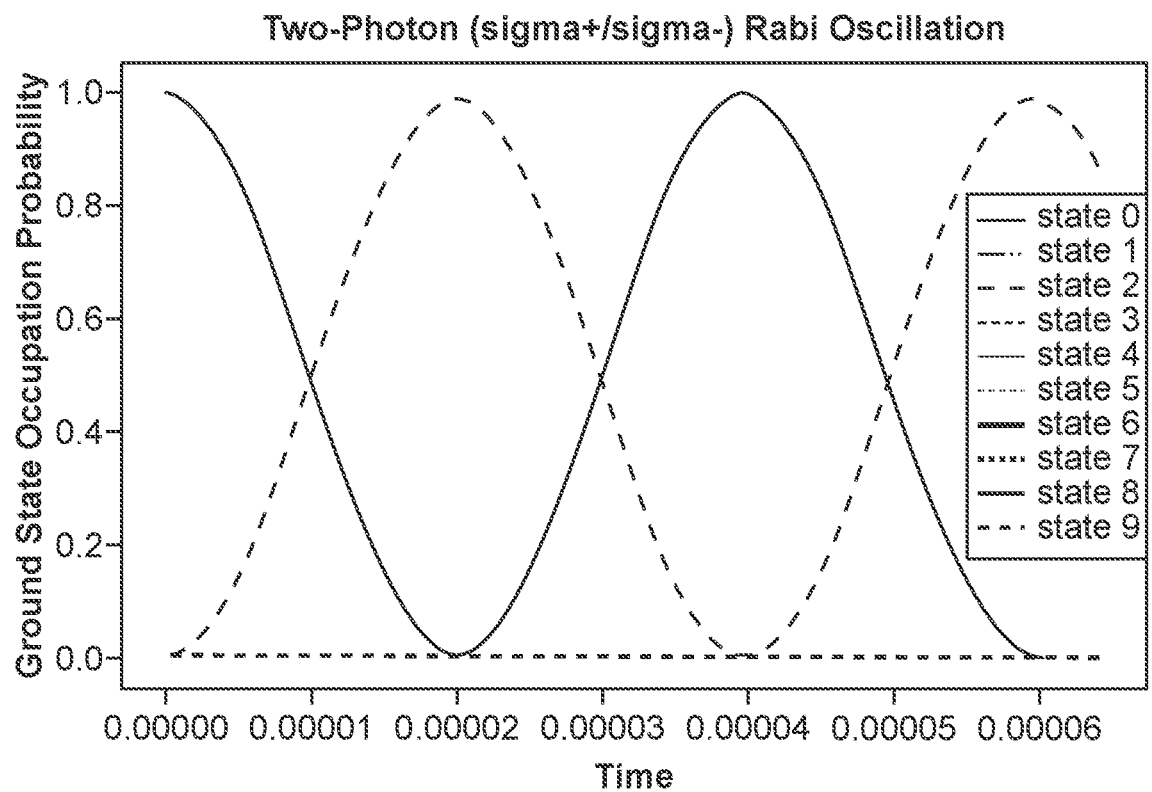
FIG. 11A and FIG. 11B show simulations of single qubit control with Stark shifting.
Figure 11B:
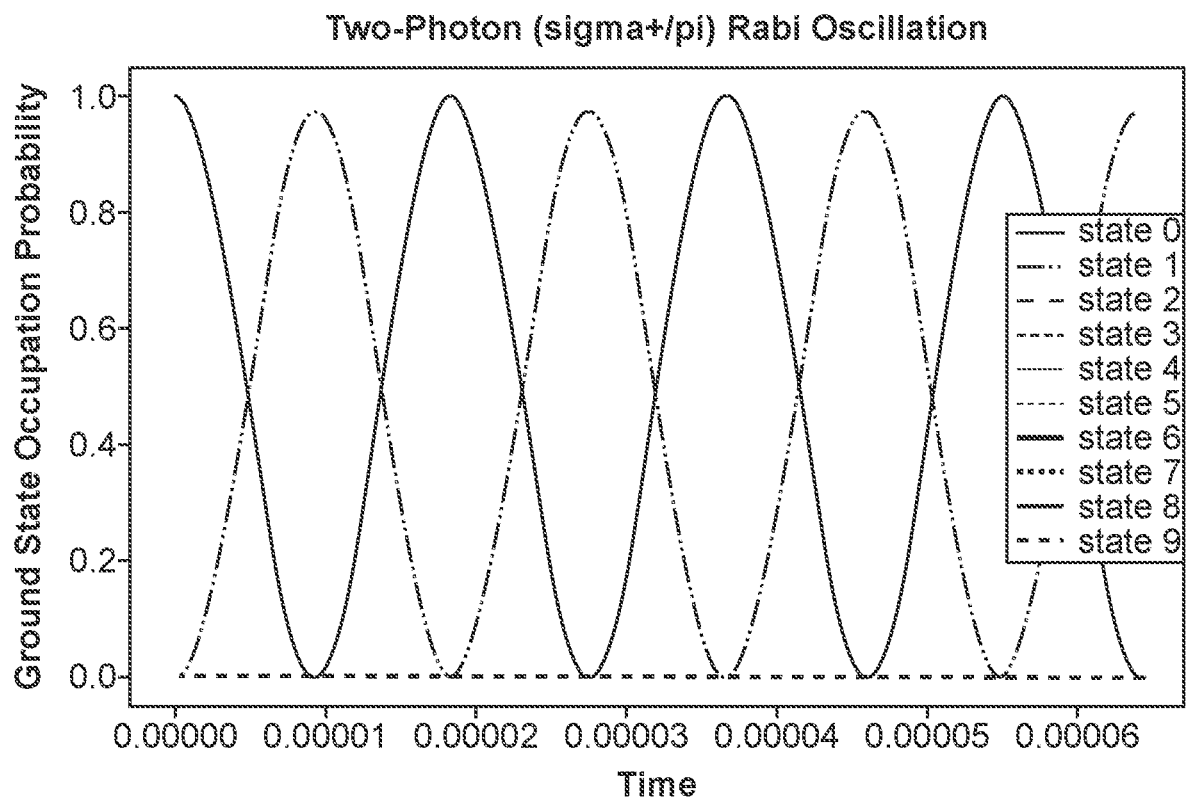

No distinction was made here between Raman and Rayleigh scattering and, as such, is assumed to be a worst-case scenario for AC Stark induced scattering errors per gate. To perform single qubit gates, light was coherently controlled to actuate a two-photon transition using two beams detuned from the $^3P$, resonance. Residual scattering from any of the $^3P$, manifold states may be inherently low due to the 7 kHz linewidth of the transition. Including the effects of the AC Stark shifting beam, the spread of $^3P_1$ hyperfine magnetic sublevels can be utilized to separate the energy scale between the AC Stark beams detuned from the F=11/2 manifold and the multi-photon 1Q light detuned from the F=7/2 manifold. Simple toy models involving two ground states and a few excited states were sufficient to gain insight into the scaling of powers, spot sizes, and achievable Rabi rates. However, because of the myriad number of levels involved (1S0 (F=9/2), 3P1 (F=7/2, 9/2, 11/2)) including all their magnetic sublevels, it may be necessary to perform full-scale simulations including all relevant levels. To verify full operation, a numerical model was built utilizing all 40 levels with multiple optical fields to represent both desired and undesired polarizations. Utilizing simple square pulses, one can see that transitions to other nuclear spin states can be suppressed with the AC Stark beam (FIG. 11A and FIG. 11B).

Example 2: Optical Trapping Arrays

Figure 12A:
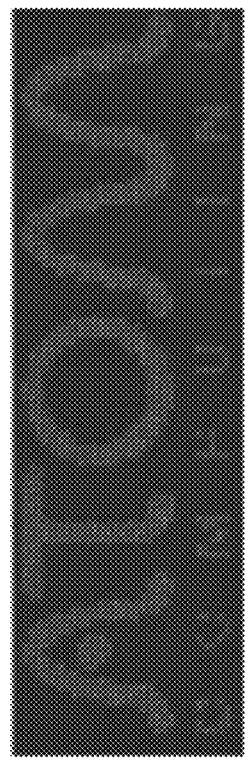
FIG. 12A and FIG. 12B show example arrays of trapping light generated by an SLM.
Figure 12B:
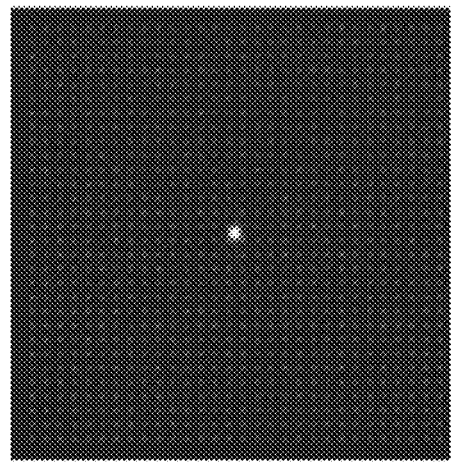

FIG. 12A and FIG. 12B show arrays of trapping light generated by an SLM in a square array and an arbitrary array, etc. Holograms were generated by reflecting 813 nm light (a magic wavelength for the $^1S_0 \rightarrow ^3P_0$ transition) from a spatial light modulator (SLM). The active area of the SLM was a 1920×1152 array of square pixels, approximately 9 microns on a side. Each pixel contains a volume of liquid crystal that imparts a phase shift to incident light. This phase shift is controllable with the voltage applied to the pixel, and in this way an arbitrary, pixelated, phase mask can be generated and applied to whatever unstructured light is incident on the surface of the SLM. The SLM is positioned in such a way that a large collimated beam is incident and phase-shifted; the light reflected from the SLM is then directed through the microscope objective. This configuration connected the plane of the SLM to a plane below the lens (where the atomic cloud was formed) by Fourier conjugacy. The complex-valued, in-plane electric field at the SLM is the Fourier transform of the analogous field in a plane below the microscope objective, in the volume of the glass cell. The atoms experienced a trapping potential proportional to the intensity of the electric field and thus experienced transverse confinement. Longitudinal confinement comes from the structured light passing through a focus, whose location is also in part determined by (and thus controllable by) the SLM.

Light was generated by a titanium-sapphire laser producing approximately 4 W of optical power at 813 nm. 2000 traps each at a depth of 500 microkelvin were generated, well over 1000 times greater than the recoil energy imparted from scattering a photon, for imaging or otherwise. This implies that the device should be well within a regime where, even without additional cooling, the atoms can be measured hundreds of times without being lost due to heating. Cooled to their motional ground state, the atoms' positions are known to within 20 nm, which allows for a significant separation of scales between the atoms' locations and the size of the laser beams used to drive single and two-qubit gates or the Rydberg interaction length scale. The laser beams driving gate operations will have a spatial extent on the order of a micron, and thus the intensity will vary at the level $10^{-5}$; therefore, it is expected that a fidelity of 0.9999 is easily achievable. In this way, the gate fidelity is less sensitive to the atoms' location.

Example 3: Ultra-High Vacuum

A quartz cuvette cell composed of Spectrosil® 2000 quartz glass was utilized as a vacuum cell. Unlike borosilicate glasses, this glass does not fluoresce under UV illumination. The cell featured a glass-to-metal transition from quartz to stainless steel which connected the cell to vacuum pumps and to the atom source. The dimensions of the cell were chosen to avoid clipping of laser cooling beams and to reduce the numerical aperture of the microscope objective. The cell was assembled by Starna Scientific Ltd. using optical contact bonding. The four largest exterior surfaces of the cell were coated with a broadband multilayer antireflection coating to minimize reflections from 300 nm to 850 nm for both S- and P-polarized light at normal angle of incidence. A magnesium fluoride coating was applied to the small square window of the cell. The vacuum system maintained a pressure of $8\times10^{-12}$ Torr ($1.07\times10^{-9}$ Pa) for several months.

Example 4: Microscope Objective

A microscope objective, placed directly above the vacuum cell, enables individual trapping, imaging, and addressing of atomic qubits. Because of its high numerical aperture (NA), the objective efficiently collects fluorescence from the atoms during imaging and also transforms a collimated input beam into a tightly focused spot for atom trapping in the focal plane. An objective was manufactured by Special Optics Inc. to have high NA (0.65) and a 300 µm diffraction-limited field of view (FOV) with 90% transmission at 461 nm and 813 nm. The end of the objective facing the vacuum cell was tapered to avoid clipping two of the six laser cooling beams. Additionally, the diameter of the objective barrel was restricted to fit between the large magnetic coils used for laser cooling, as power dissipation in these coils scales strongly with their size and spacing. The mechanical housing for the objective was made of Ultem because it is nonmagnetic and nonconductive.

The performance of the objective was characterized by placing the objective and one glass cell window in one arm of a Michelson interferometer. In this arm, the focused beam was retro-reflected using a precision ball bearing centered at the beam focus. The other arm of the Michelson held a reference reflector. A Zernike surface was reconstructed by fitting the resulting spatial interference pattern. The objective was mounted directly to the glass cell to eliminate drifts in tilt between the cell window and objective. Such tilts, on the order of 1 milliradian (mrad), would otherwise cause variations in wavefront quality. The objective was epoxy bonded to a machined macor mount that contacts the top window of the cell via five brass ball bearings. During this assembly process, the objective was interferometrically aligned so that its optical axis remained normal to the cell.

Figure 13:
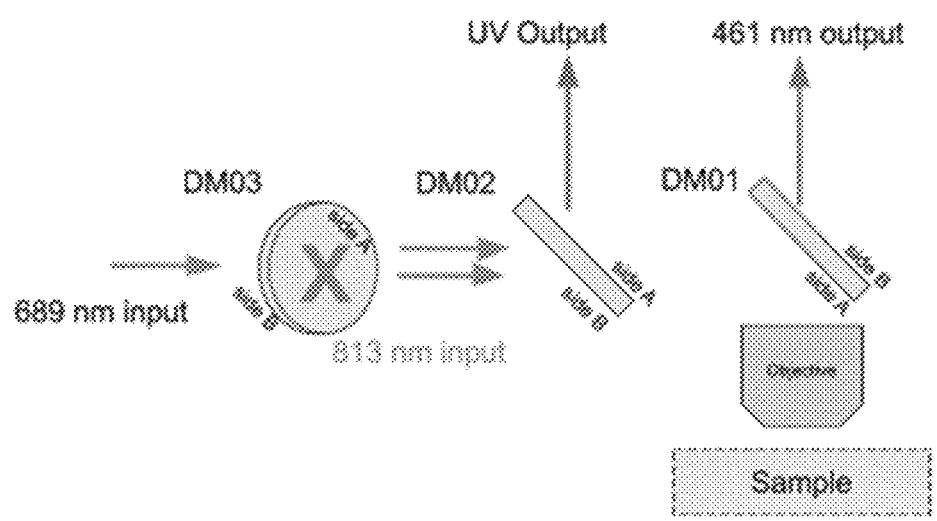
FIG. 13 shows an optical system for delivering four different wavelengths.

Three custom dichroic mirrors, made by Perkins, were used to handle the four vastly different wavelengths (813 nm, 689 nm, 461 nm, and 319 nm) in the objective. FIG. 13 shows an optical system for delivering four different wavelengths. The three dichroic mirrors are indicated as DM01, DM02, and DM03. Note that 319 nm light enters from the bottom of the cell. The custom coatings of the three dichroic mirrors work in tandem to preserve the arbitrary polarization states of 813 nm and 689 nm light to perform single-qubit or multi-qubit gates and magic wavelength and/or magnetic angle trapping.

Example 5: Atom Trapping and Cooling

Figure 14:
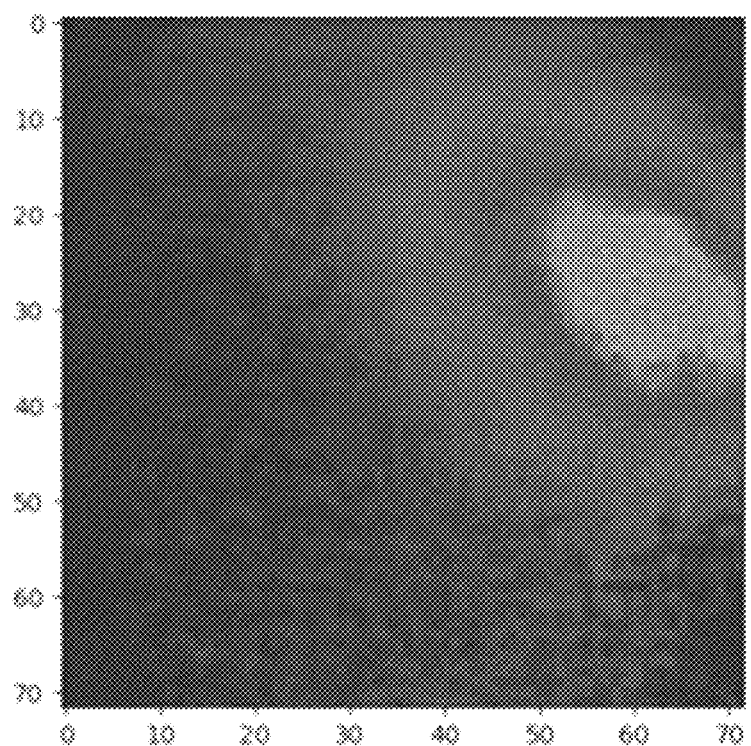
FIG. 14 shows trapping and cooling of strontium-87 and strontium-88 atoms using a red magneto-optical trap (MOT).

FIG. 14 shows trapping and cooling of strontium-87 and strontium-88 atoms using a red MOT.

Example 6: Imaging

To perform projective measurements, light resonant with the strontium-87 $^1S_0 \rightarrow {}^1P_1$ transition is applied to the entire atom array, while collecting and imaging the resulting atomic fluorescence. For a qubit comprising two nuclear spin states in the $^1S_0$ ground state manifold (both of which are resonant with the imaging light), one of the two states may be moved to the metastable $^3P_0$ manifold before measurement. This procedure, which is identical to optical lattice clock operation, is state selective and has been described in Covey et al, "2000 Times Repeated Imaging of Strontium Atoms in Clock-Magic Tweezer Arrays," *Physical Review Letters* 122(17): 173201 (2019), which is incorporated herein by reference in its entirety for all purposes. This provides the added benefit of decreasing readout crosstalk from nearby atoms. Fluorescence from each $^1S_0$ atom is collected through our microscope objective. This light is then imaged onto a scientific CMOS camera, producing an image of the qubit array that is processed to determine the state of each atom. Such images also help to determine if an atom was lost from the array. Since the microscope objective is diffraction-limited over the entire atom array, atoms separated by multiple microns are well-resolved.

Example 7: Single-Qubit Gate Light Delivery

The single-qubit scheme was designed specifically to enable single-site addressability. In particular, the two laser beams used to drive single-qubit operations are delivered through the same high-numerical aperture objective that is used to project the optical tweezer trapping potentials. As described herein, three dichroic mirrors combine all of the relevant beams in the back focal-plane of the objective. These beams are generated, steered, and modulated to enact site-selective single-qubit operations. The two beams used to drive single-qubit operations have orthogonal linear polarizations (one aligned to the atomic quantization axis and therefore pi-polarized, with the other beam is sigma-polarized). To achieve full control over the single-qubit operations, amplitude, frequency, and phase control of each beam at each individual trapping site is required. This control is gained by the combination of an electro-optic modulator (EOM), acousto-optic deflectors (AODs), and RF control electronics.

The light used to drive single-qubit gates is provided by a common amplified laser source that is phase locked to an optical frequency comb. Though there is no control over the global phase of this light in each experiment, the laser is a stable local oscillator source, which can be modulated with well-controlled RF sources to generate the control fields. This global phase sets the global phase of the qubit array, which cannot be measured without being compared to an independent qubit array. For maximum flexibility, an electro-optic modulator (EOM) is used to globally phase-modulate the 689 nm light used for red MOT light, optical pumping, sideband cooling, and single-qubit operations since these four operations will generally not be performed simultaneously. The phase modulation results in the generation of symmetric sidebands around the central laser frequency. The detuning of the laser from the $^3P_1$ manifold of states is chosen such that only the +1 order sideband is close enough to the narrow $^3P_1$ transition to drive transitions. By changing the frequency of this modulation between 5 GHz and 13 GHz, all transitions in the $^3P_1$ manifold can be resonantly addressed using this light, even when a large bias field is used to split the excited-state manifolds.

A primary advantage of this method for generating 689 nm light is that the same beam path is used to generate light for all four beam paths described above. Furthermore, the global frequency, amplitude, and phase of these resonant beams is controlled using advanced microwave RF sources. The RF to drive the EOM is generated by an arbitrary waveform generator and an IQ mixer, which provides control over the complex pulse shape of the laser. For qubit manipulations, this global control is used to generate arbitrary shaped pulses that have favorable spectral properties.

Example 8: Parallel Addressing of Single Qubits

Acousto-optic deflectors (AODs) are used to generate beams that can be steered to different sites in the qubit array by driving the AOD at different frequencies. This introduces a position-dependent frequency and phase matching condition. For single-qubit manipulations this complication is overcome by using identical AOD paths for the two beams such that, while the intermediate-state detuning changes, the driven two-photon process remains resonant. Put another way, the four AOD frequencies are fully constrained by selecting a specific site to address. Two frequencies select the position of the first beam and the frequency matching conditions enforce that the two frequencies for the second beam are the same, up to an offset of the qubit frequency (the splitting between the two nuclear spin states, which is around 150 kHz). Using AODs to generate the beams for single-qubit operations allows arbitrary addressing of atoms in a single row (or column) at any given time. This is required in order to maintain full control over the amplitude and phase of each. This leads to the partial serialization of the operations. However, the speed at which patterns can be changed with an AOD is significantly increased compared to an SLM, and has a much higher efficiency than with a DMD. Using AODs also allows full phase control over each beam. This allows tracking of not only the phase of each qubit (allowing application of all rotations in the local qubit frame), and can also be used to perform more complex pulse sequences on each qubit. By controlling the amplitude of the RF for each qubit, the pulse area of each qubit operation can be locally scaled. Combining both phase and amplitude of the RF allows full control of the operation performed on each qubit during a single pulse from the EOM.

For single-photon operations, a single driving beam is generated with a single 2D AOD system. Undesired deflections can be filtered out using additional optics. Alternatively or in addition, the transition may be sufficiently off-resonant to be ignored. The use of a single 2D AOD system generates an array of spots whose spacing can be tuned by adjusting the frequency difference of the RF tones driving the acousto-optic crystal, and whose phase can be tuned by adjusting the RF drive phases. By configuring the AODs in a "crossed" configuration (e.g., the first AOD deflects into the +1 order and the second AOD deflects into the −1 order), lines of deflections are created that have the same absolute frequency (such as along the diagonal created with respect to the axes of deflection of the two AODs).

As an illustrative example, consider the case where the light into the 2D AOD is resonant with a transition of interest. Then, for any RF frequency into the first AOD, if the second AOD deflects with the same frequency, the optical frequency will be brought back into resonance. The final optical phase of the light driving the transition can be controlled by tuning the relative RF phase of the tones into the two AODs. To parallelize addressing, multiple frequencies can be added to both AODs and the diagonal where the corresponding frequencies are deflected will all be resonant. The remaining spots that are deflected will be off-resonant and can be filtered out, but in many cases (e.g., for driving ultranarrow "clock" transitions), the extra spots will be so far off-resonant that this is unnecessary.

There are two primary modes of operation for addressing atoms in a square array. Firstly, the AODs may be aligned with the trap array. In such case, all spots will be aligned to a spot in the array, but only those along the resonant diagonal will be driven. If the detuning is insufficient, a DMD in an image plane of the optical system can be used to dynamically filter out the other undesired spots. Secondly, the AODs may be aligned at 45 degrees with respect to the atom array, such that the diagonal row of resonant spots aligns to a single row or column of the qubit array. In this case, many of the other spots will miss qubits. However, the remaining spots can be filtered out if desired.

Example 9: Parallel Addressing of Multi-Qubit Units

Figure 15A:
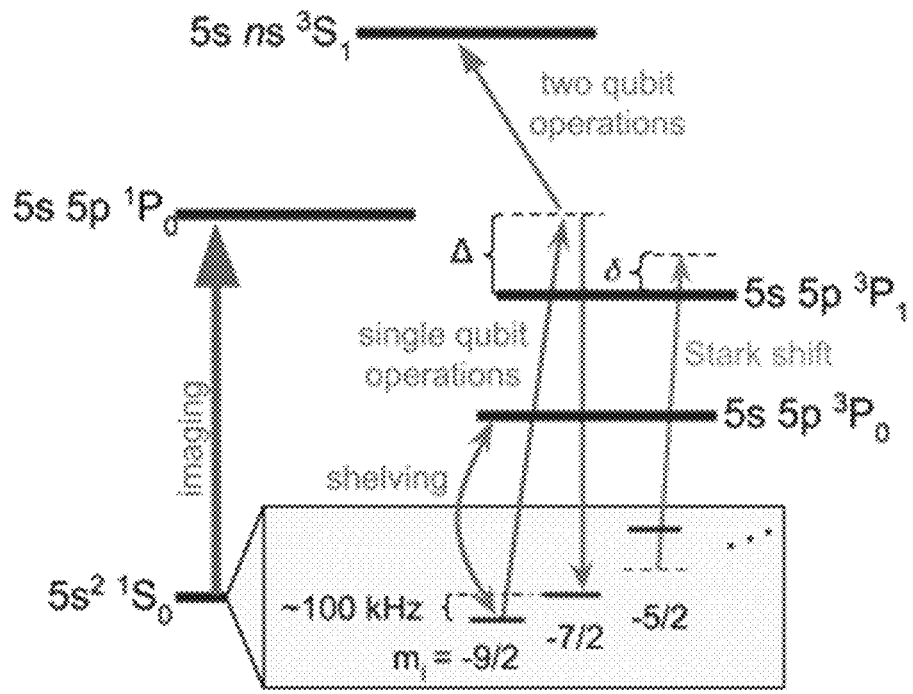
FIG. 15A shows an energy level structure for single-qubit and multi-qubit operations in strontium-87.

Direct excitation of strontium-87 from the ground state to Rydberg levels would require a laser with a wavelength of approximately 218 nm. Alternatively, the Rydberg excitation operation can be performed using two-photon excitation combining 689 nm and 319 nm light, each detuned from the intermediate $^3P_1$ state. The approximately 7 kHz width of the $^3P_1$ state provides an effective balance between the two-photon effective Rabi rate and scattering via spontaneous decay from the $^3P_1$. FIG. 15A shows an energy level structure for single-qubit and multi-qubit operations in strontium-87.

The optical system for single-qubit operations is also designed to work well for multi-qubit gates. One of the single-qubit beams is used as one leg of the two-photon excitation scheme that drives transitions to the Rydberg electronic manifold. To satisfy the spatially-dependent frequency and phase matching condition, AODs are also used for the UV light. Importantly, the optical systems are matched so that the frequency shift of the UV light from one site to another is identical to that of the 689 nm light. The consequence of this constraint is that the performance of state-of-the-art UV AODs dictate the accessible field of view (FOV) for multi-qubit operations. Further, because one of the single-qubit beams is being used for multi-qubit operations (and the two single-qubit beams are matched), the FOV for single-qubit operations will be the same. A figure of merit for UV AODs is the product of the active aperture and the RF bandwidth of the device. For a fixed beam size in the back focal plane of the objective, increasing either of these quantities results in a larger scan angle of the beams, and thus a larger FOV in the plane of the qubit array. An FOV of approximately 100 μm×100 μm was achieved, which is sufficient to address an array of approximately 1,000 atoms with a trapping site spacing of 3 μm.

Figure 15B:
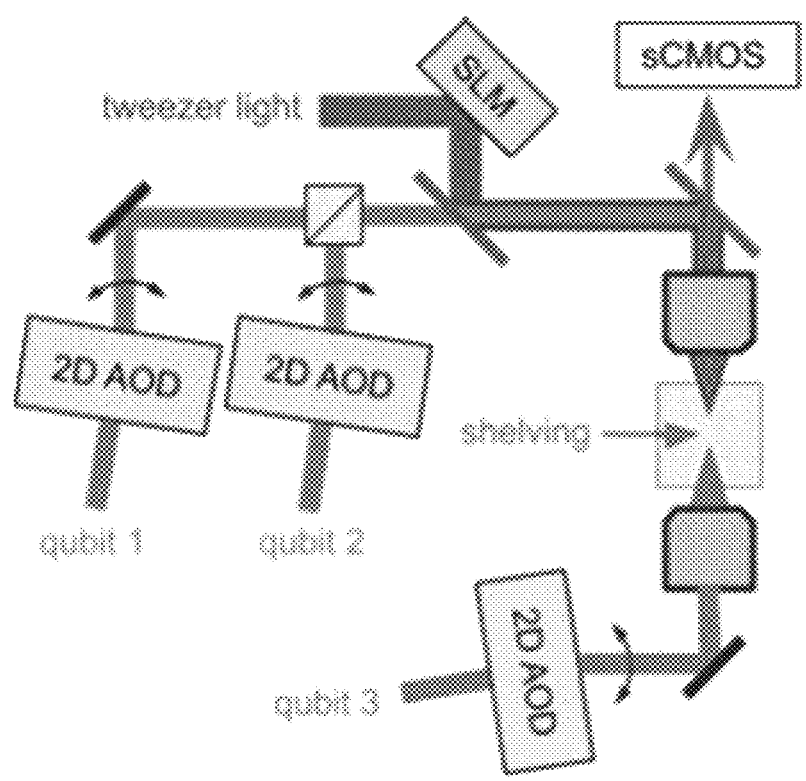
FIG. 15B shows an optical system for delivering light to perform single-qubit and multi-qubit operations in parallel on a plurality of trapped atoms.

FIG. 15B shows an optical system for delivering light to perform single-qubit and multi-qubit operations in parallel on a plurality of trapped atoms. First light for performing single-qubit operations on a first qubit (qubit 1) is directed to a first 2-dimensional AOD (2D AOD), allowing parallel addressing of a first subset of the trapped atoms. Second light for performing single-qubit operations on a second qubit (qubit 2) is directed to a second 2D AOD, allowing parallel addressing of a second subset of the trapped atoms. Third light for inducing a Rydberg interaction in either the first subset or the second subset is delivered through a third 2D AOD, producing a plurality of entanglements between atoms of the first subset and neighboring atoms of the second subset.

The third light is produced by an ultraviolet (UV) laser emitting 319 nm light. The UV laser is phase-locked to a frequency comb, providing a narrow-linewidth UV laser beam. Amplitude control is provided through an acousto-optical modulator (AOM). Global phase control is accomplished through optical phase stabilization techniques. The stabilized global phase of the 319 nm light is combined with active phase modulation of the 689 nm light to provide phase control. The free-space beam is sent into the third 2D AOD, but from the opposite direction as the first and second 2D AODs. The light is then directed to the trapped atoms through a customized microscope objective. The counter-propagating beam path is used to monitor the position of the spots as well as the effect of the light on the atoms (for instance, through excitation loss spectroscopy) to optimize the alignment. These quantitative effects may also be used to implement an automated alignment scheme to allow for improved autonomous operation of the system.

Figure 15C:
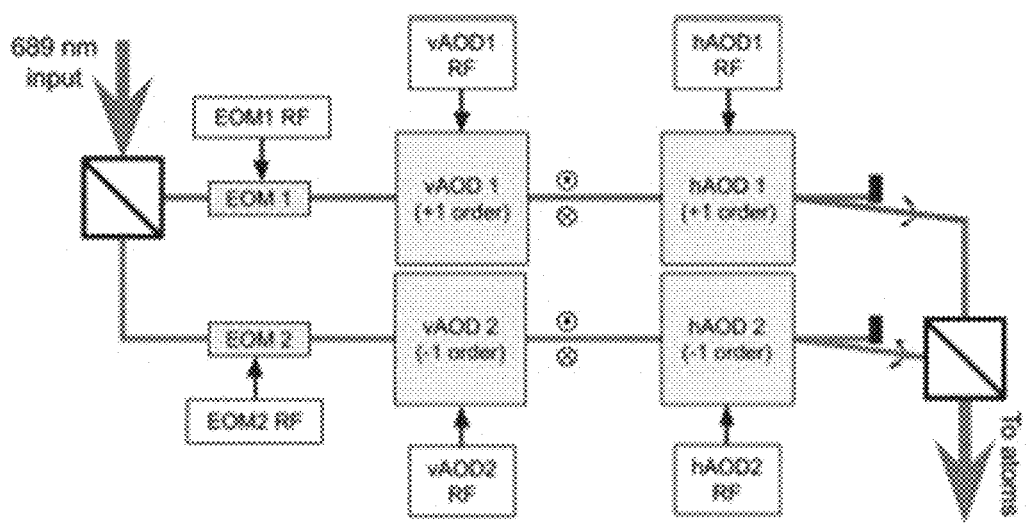
FIG. 15C shows an optical system configured to dynamically generate and control beams using a single electro-optic modulator (EOM) and two acousto-optic deflectors (AODs) per beam, which are each driven by RF signals from arbitrary waveform generators.

FIG. 15C shows an optical system configured to dynamically generate and control beams using a single electro-optic modulator (EOM) and two acousto-optic deflectors (AODs) per beam, which are each driven by RF signals from arbitrary waveform generators. The AODs are oriented such that the frequency difference between the beams remains constant whenever they are overlapped in the qubit array. The frequency difference prevents driving undesired operations, but is easily overcome by the RF drives of the two EOMs. The combination of AODs and agile RF synthesizers also provides full, site-by-site control over operations that can be performed in parallel (one row at a time), a key advantage for executing sequences of quantum operations on an array of atomic qubits.

In contrast to single-photon operations, two-photon processes are driven by two beams that are prepared with independent 2D AOD systems. The optical beams may pass through a microscope objective (such as a confocal microscope system) to be focused onto a single site in the array of atoms, thus minimizing crosstalk to neighboring qubits. For two-photon transitions, the beams can be either copropagating or counter-propagating (in which case a confocal microscope may be used).

Parallel 2D AOD systems are used to drive qubit transitions of atoms within an array of atomic qubits. The two beams defined by these parallel 2D AOD systems define two arms of a two-photon Raman transition between two internal states of the atom (such as electronic or nuclear spin eigenstates). The polarizations of the two beams are typically orthogonal so that the beams can be efficiently combined on a polarizing beamsplitter to drive two legs of a Raman transition. However, the same techniques could be used to combine two beams with the same polarization. The polarization through the 2D AODs is typically horizontal linear and vertical linear but can easily be transformed into right circular or left circular.

Figure 18A:
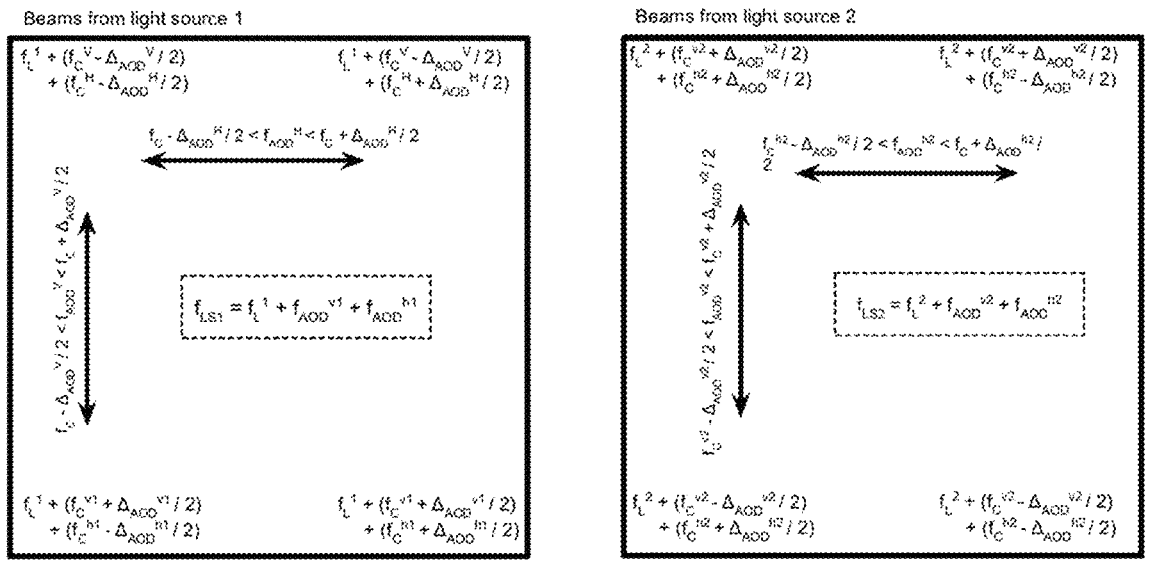
FIG. 18A shows the spatial frequencies of two optical beams steered by separate two-dimensional (2D) AODs in an uninverted configuration.
Figure 18B:
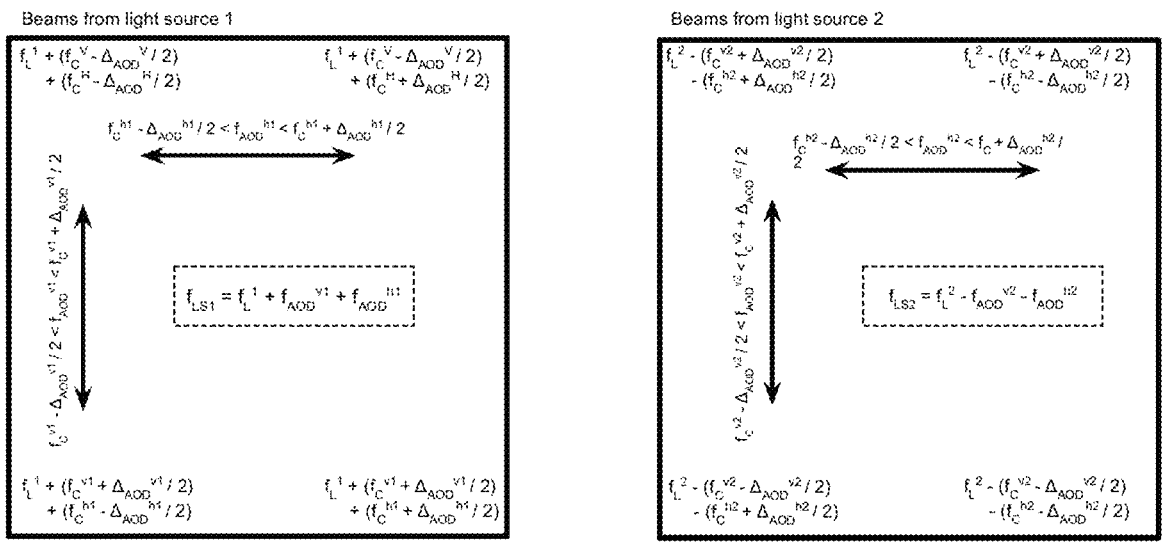
FIG. 18B shows the spatial frequencies of two optical beams steered by separate two-dimensional (2D) AODs in an inverted configuration.
Figure 18C:
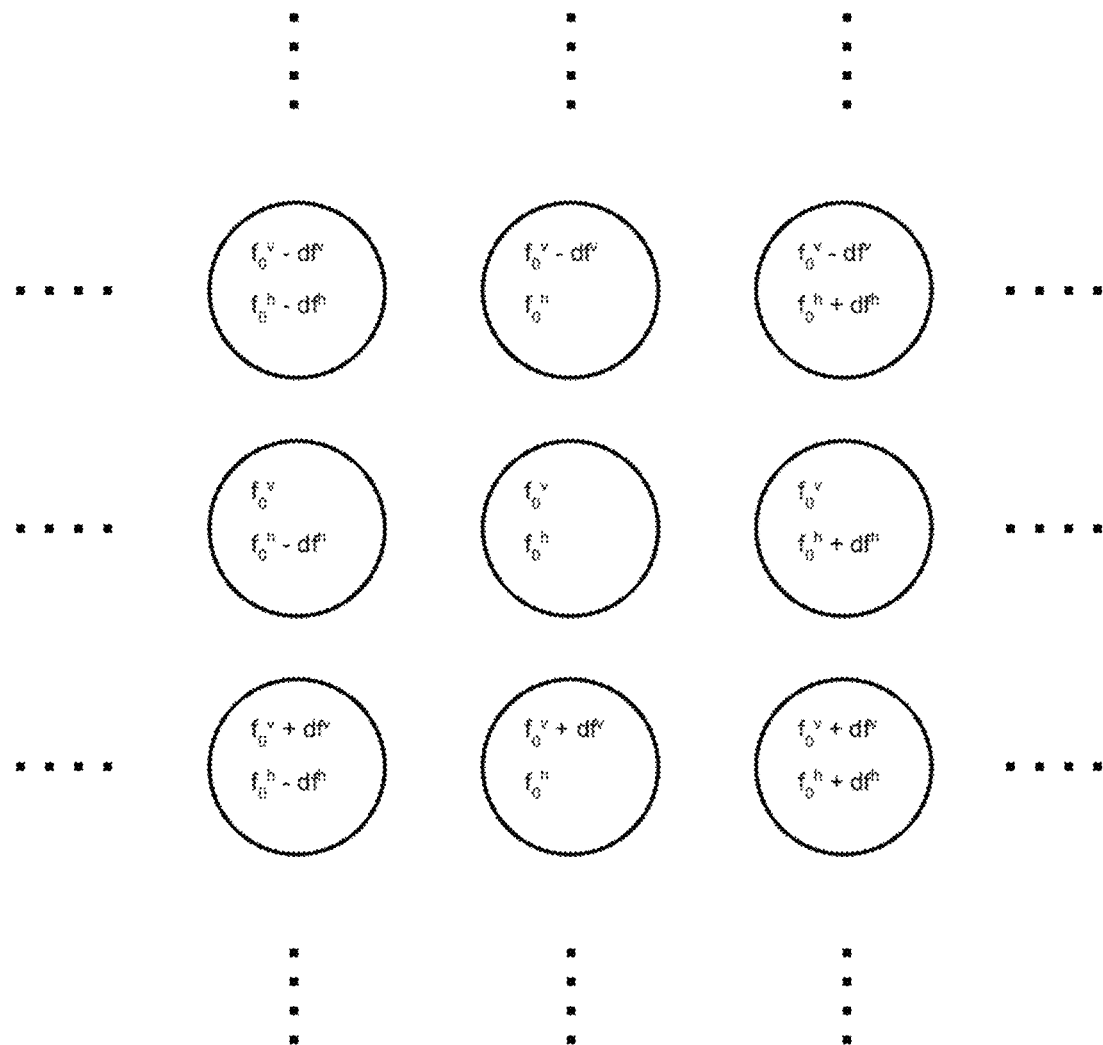
FIG. 18C shows an example of how to address atoms held in a two-dimensional rectangular array, according to an embodiment of the present disclosure.

FIG. 18C shows an example of how to address atoms held in a two-dimensional rectangular array, according some embodiments of the present disclosure. The atoms may be held using a two-dimensional AOD configuration to generate beams from two light sources. A location in the array of atoms can be located by a pair of frequencies $f_0^v$ and $f_0^h$ for the beams from a single light source. By configuring the beams for both the first and second light sources used to drive a qubit operation follow the dame pattern of frequency differences (e.g., $df^v$ and $df^h$ between the rows and the columns of the atoms, respectively), constant detuning across the array of trapping sites may be maintained. Simultaneous qubit operations may then be driven at each site of the trapping array. For a given pattern of frequency differences, the remaining frequency matching conditions for driving qubit operations can be realized through a combination of additional modulators in one or more (e.g., both) light sources and adjusting the overall alignment offset of the beams generated from each light source.

In an uninverted AOD configuration, the deflecting beams from the two 2D AODs are in the same direction and all use the +1 order deflection. In this configuration, the frequency differences are matched at every site in the array, as indicated in FIG. 18A. In this configuration, the two regions can be overlapped (e.g., partially overlapped, completely overlapped, etc.) in the atom plane. The laser frequency before the modulators may be $f_L$, the center frequency of each AOD may be given by $f_C$, the bandwidth of the AOD can be $\Delta_{AOD}$, and the frequency driving the AOD can be $f_{AOD}$. Each pair of driving frequencies $f_{AOD}^v$ and $f_{AOD}^h$ can generate a beam that focuses to a particular location in the atom plane. The final frequency and position of each beam from the first light source can be determined by $f_{AOD}^{v1}$ and $f_{AOD}^{h1}$, and for the second light source by $f_{AOD}^{v2}$ and $f_{AOD}^{h2}$ from $f_1 = f_L^1 + f_{AOD}^{v1} + f_{AOD}^{h1}$ and $f_2 = f_L^2 + f_{AOD}^{v2} + f_{AOD}^{h2}$. If the position vs frequency is the same in the atom plane for beams of the two light sources, the final frequency differences can be a constant offset from the difference between $f_L^1$ and $f_L^2$. The constant offset may be equal to the difference between the frequencies of each light source's modulators for any given position in the atom plane (e.g., $(f_C^{h1} - f_C^{h2}) + (f_C^{v1} - f_C^{v2})$). When overlapped, the difference can be 0. To drive qubit transitions, the frequency difference can be equal to the qubit frequency. Additional modulators can be added to the optical path to enable the frequency matching condition. The operational detuning remains small and constant (or resonant, if the frequency is correctly calibrated) at every position in the atom array. In this configuration, the overall detuning from the excited (intermediate) state of the two-photon transition changes across the array. This plays a role in the two-photon Rabi rate of the operation, but changes of the intermediate state detuning by $\sim 2\Delta$ is small in comparison to the total intermediate state detuning (100s of MHz vs. several GHz). In this configuration, adding a relative shift of the frequencies between the two input beams (either by using detuned laser sources or other optics that generate a tunable frequency difference) enables the use of pure phase modulators to generate shaped pulses that are resonant with only one sideband.

In an inverted AOD configuration, the two beams are deflected in opposite directions by the AODs using opposing order deflections in the AODs (e.g., beam 1 deflects into the +1 orders of its two AODs, while beam 2 deflects into the −1 orders of its AODs). When the deflected beams are then combined such that the center of each deflection bandwidth is aligned, the frequency difference of two overlapped spots is constant across the entire array, as indicated in FIG. 18B. In this configuration, the two regions can be overlapped (e.g., partially overlapped, completely overlapped, etc.) in the atom plane. The laser frequency before the modulators may be $f_L$, the center frequency of each AOD may be given by $f_C$, the bandwidth of the AOD can be $\Delta_{AOD}$, and the frequency driving the AOD can be $f_{AOD}$. Each pair of driving frequencies $f_{AOD}^v$ and $f_{AOD}^h$ can generate a beam that focuses to a particular location in the atom plane. The final frequency and position of each beam from the first light source can be determined by $f_{AOD}^{v1}$ and $f_{AOD}^{h1}$, and for the second light source by $f_{AOD}^{v2}$ and $f_{AOD}^{h2}$ from $f_1 = f_L^1 + f_{AOD}^{v1} + f_{AOD}^{h1}$ and $f_2 = f_L^2 + f_{AOD}^{v2} + f_{AOD}^{h2}$. If the position vs frequency is the same in the atom plane for beams of the two light sources, the final frequency differences can be a constant offset between $f_L^1$ and $f_L^2$ (e.g., the additional difference can be a sum of the center frequency of each modulator e.g., $f_C^{h1} + f_C^{v1} + f_C^{h2} + f_C^{v2}$). To drive qubit transitions, this frequency difference can be equal to the qubit frequency. Additional modulators can be added to the optical path to enable the frequency matching condition. The orientation of the AODs in this configuration causes the operational detuning to remain constant across the entire array, but instead of resonant driving, the beams are separated by $\sim 4f_c$ (e.g., the frequencies from the first beam are shifted up by $\sim 2f_c$ while the frequencies from the second beam are shifted down by $\sim 2f_c$). With a fixed constant detuning, which is much larger than the two-photon Rabi rate ($\Omega$), the difference to drive the operation on resonance must be made up. This may be accomplished in a number of manners.

Firstly, an electro-optic modulator (EOM) may be used in one or both of the beam paths to modulate the phase of the beam, generating sidebands at the drive frequency. With sufficiently large drive frequencies, the off-resonant sidebands can often be ignored and the relevant frequency is simply the single sideband that is desired. Secondly, $f_L$ may be chosen to be different for the two beams (i.e., the frequency of the beams before the 2D AOD systems are different). This may be achieved by using completely separate lasers for the two beams or passing one of the beams through a separate acousto-optic modulator or other frequency-shifting device before entering the 2D AOD system.

The benefit of the inverted orientation is that the operation remains off-resonant until a separate subsystem is used to bring the beams into resonance with the desired transition.

The use of independent 2D AOD systems enables full control over the two-photon operations. The Rabi rate can be adjusted with several amplitude control knobs, including the intensity of the laser light in each beam, the power of the RF drive to the AODs, and the power of the RF drive to any EOMs implemented in the system. The relative (local) phase of the operation can be adjusted by manipulating the relative phases of the RF applied to the 2D AOD systems. A global operational phase can be manipulated by adjusting the phase of the two beams before the 2D AOD systems. For instance, different phases may be applied using different EOMs on each on of the two beams.

The use of separate 2D AOD systems also enables compensation for the wavelength dependence of AODs, which will deflect different wavelengths with different efficiencies, beam angles, etc. Through careful design of the optical system to combine beams on their target, these differences can be overcome to generate a system that drives resonant two-photon transitions with different wavelength lasers.

The uninverted and inverted schemes may be extended to three-dimensional (3D) arrays of atoms through the addition of SLMs or focus tunable lenses that shift the location of the foci along the axes of beam propagation.

In some cases, where a combination of modulators used to generate coherent driving of the two light sources results in different angle vs. frequency values for the light sources entering an optical element (e.g., a microscope objective) (e.g., the two light sources would generate different spots from each modulator having a different spacing for the same frequency difference), an additional optical element can be provided. The additional optical element can be configured to correct for the angle vs. frequency mismatch. The additional optical element may comprise a telescope (e.g., a plurality of lenses configured to collimate and/or focus light). The telescope may have a magnification factor of $$M = \frac{\frac{d_{\theta 1}}{d_{f1}}}{\frac{d_{\theta 2}}{d_{f2}}}, \text{ where } \frac{d_\theta}{d_f}$$

may be an observable angle at an objective lens in the case of the 1 subscripts and at a second lens in the case of the 2 subscript. The telescope may be configured to reduce or eliminate the difference in angle vs. frequency. The addition of the telescope may result in balancing power efficiency vs. final spot size in the focal plane of the objective. For example, one of the two light paths may have its aperture reduced to achieve similar spot sizes with similar beam waists.

Example 10: Counterdiabatic Driving

In the absence of the pulse sequences described herein, multi-qubit operations may be performed by transferring an atom in a ground state to a dressed state and back to the ground state by adiabatically varying the Hamiltonian such that diabatic transitions to Rydberg states are minimized. The adiabatic condition imposes a limitation, forcing multi-qubit operations to be relatively slow. However, faster gates are desired for overall speed and minimization of decoherence effects. The pulse sequences described herein may achieve faster gates while maintaining effectively adiabatic dynamics.

For instance, counterdiabatic driving may decrease gate times while minimizing errors arising from transitions to Rydberg states. Counterdiabatic driving is the addition of one or more drive fields to counteract terms in the Hamiltonian that give rise to undesired diabatic transitions. Counterdiabatic driving achieves effectively adiabatic dynamics in a shorter timescale than would be allowed by the adiabatic condition. One example is "transitionless quantum driving" (TQD), as described herein. TQD is accomplished by transforming the total Hamiltonian for a system into a reference frame defined by the instantaneous eigenstates of the Hamiltonian. The Hamiltonian is partitioned into a diagonal portion (which does not cause diabatic transitions between instantaneous eigenstates) and an off-diagonal portion (which does cause diabatic transitions). TQD is achieved by adding an additional control field that cancels out the off-diagonal, diabatic Hamiltonian. With this technique, effective adiabatic dynamics may be achieved without satisfying the usual slow adiabatic condition. Below is a derivation of the TQD condition for a general two-level system with single-axis driving using TQD to counteract diabatic transitions for Rydberg dressing gate.

The general problem is to transform a two-level system in a ground state |1⟩ to a dressed state which is an admixture of |1⟩ and an excited state |R⟩ and back to the ground state as quickly as possible and without leaving any population in the excited state. In the rotating frame, the total Hamiltonian (in units of frequency) for a two-level system under driving is:

$$H_0 = \Omega(t)\sigma_x + \Delta(t)\sigma_z \tag{1}$$

Here, $\Omega$ is the Rabi rate, $\Delta$ is the detuning from resonance, and $\sigma_x$ and $\sigma_z$ are Pauli operators on the two-level system. It is useful to write the Hamiltonian in a "tilted reference frame:

$$H_0' = \Omega_{\text{eff}}(t)\sigma_{z'}$$

$$\Omega_{\text{eff}}(t) = \Omega^2(t) + \Delta^2(t)$$

$$\sigma_{z'} = \sin(\theta)\sigma_x + \cos(\theta)\sigma_z$$

$$\theta(t) = \arctan\left(\frac{\Omega(t)}{\Delta(t)}\right) \tag{5}$$

In the original basis, the instantaneous eigenstates of $H_0$ are:

$$|\phi_1\rangle = \cos(\theta)|1\rangle + \sin(\theta)|R\rangle \tag{6}$$

$$|\phi_2\rangle = -\sin(\theta)|1\rangle + \cos(\theta)|R\rangle \tag{7}$$

Now we transform into an "adiabatic frame" written in terms of these instantaneous eigenstates. The unitary operator corresponding to that transformation is:

$$U = \sum_k |\phi_{ad,k}\rangle\langle\phi_k(t)| \tag{8}$$

Here, $|\phi_{ad,k}\rangle$ are the instantaneous eigenstates in the adiabatic frame. The transformed Hamiltonian is:

$$H_{ad}(t) = H_0(t) + W(t) = H_0(t) + i\frac{dU(t)}{dt}U^\dagger(t) \quad (9)$$

The second term (W(t)) contains off-diagonal elements that cause transitions when the adiabatic condition is not met. The adiabatic condition is fulfilled when the change in U(t) is slow enough to make W(t) sufficiently small. In order to achieve effective adiabatic dynamics when this term is not small, we add an additional control field, $H_c(t)$, to the original Hamiltonian in order to cancel out the effects of the W(t). This can be accomplished by setting:

$$H_c(t) = -U^\dagger(t)W(t)U(t) \quad (10)$$

Solving in terms of U(t):

$$-U^\dagger(t)W(t)U(t) = -U^\dagger(t)i\frac{dU(t)}{dt}U^\dagger(t)U(t) = -iU^\dagger(t)\frac{dU(t)}{dt} \quad (11)$$

Using the definition of U(t) from earlier, we can write it in matrix form:

$$U(t) = \begin{pmatrix} \cos(\theta) & \sin(\theta) \\ -\sin(\theta) & \cos(\theta) \end{pmatrix} \quad (12)$$

Again simplifying the expression:

$$H_c(t) = i\frac{d\theta}{dt}\begin{pmatrix} \cos(\theta) & \sin(\theta) \\ -\sin(\theta) & \cos(\theta) \end{pmatrix}\begin{pmatrix} \sin(\theta) & -\cos(\theta) \\ \cos(\theta) & \sin(\theta) \end{pmatrix} = i\frac{d\theta}{dt}\begin{pmatrix} 0 & -1 \\ 1 & 0 \end{pmatrix} \quad (13)$$

$$H_c(t) = \frac{d\theta}{dt}\sigma_y \quad (14)$$

This result shows that a counterdiabatic Hamiltian may be achieved by driving with field that is 90 degrees out of phase with the original drive field. The form of H(t) can generally be found for a desired $H_0(t)$.

Figure 16A:
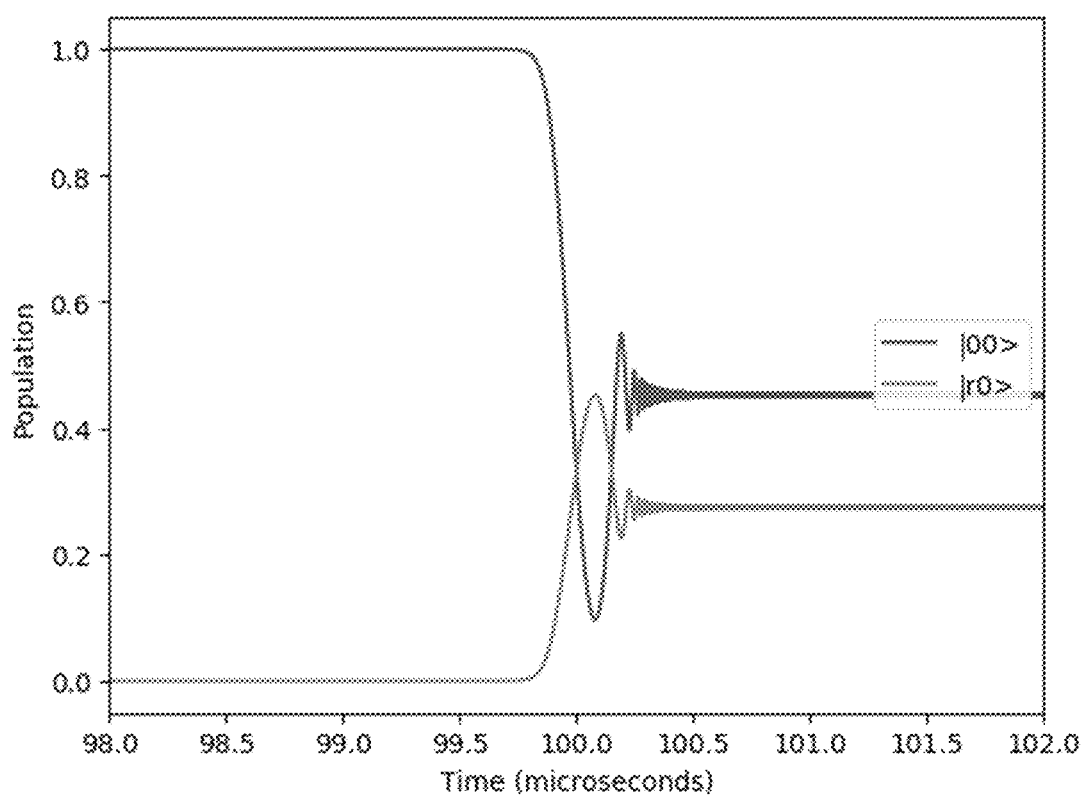
FIG. 16A shows a simulation of two atoms in an initial two-atom state.

In order to demonstrate the effectiveness of transitionless quantum driving for a Rydberg dressing gate, a 2-atom system was simulated. Each atom comprised two ground (qubit) states and a Rydberg state. FIG. 16A shows a simulation of two atoms in the initial two-atom state |00⟩. By driving the |0⟩ to |r⟩ transition on each atom, and sweeping the detuning to resonance, and then away from resonance, the instantaneous eigenstates of the Hamiltonian transform from the bare states, to the dressed states, and back to the bare states. As shown in FIG. 16A, significant population remains in Rydberg states |r0⟩ if the ramp is performed too quickly, violating the adiabatic condition.

Figure 16B:
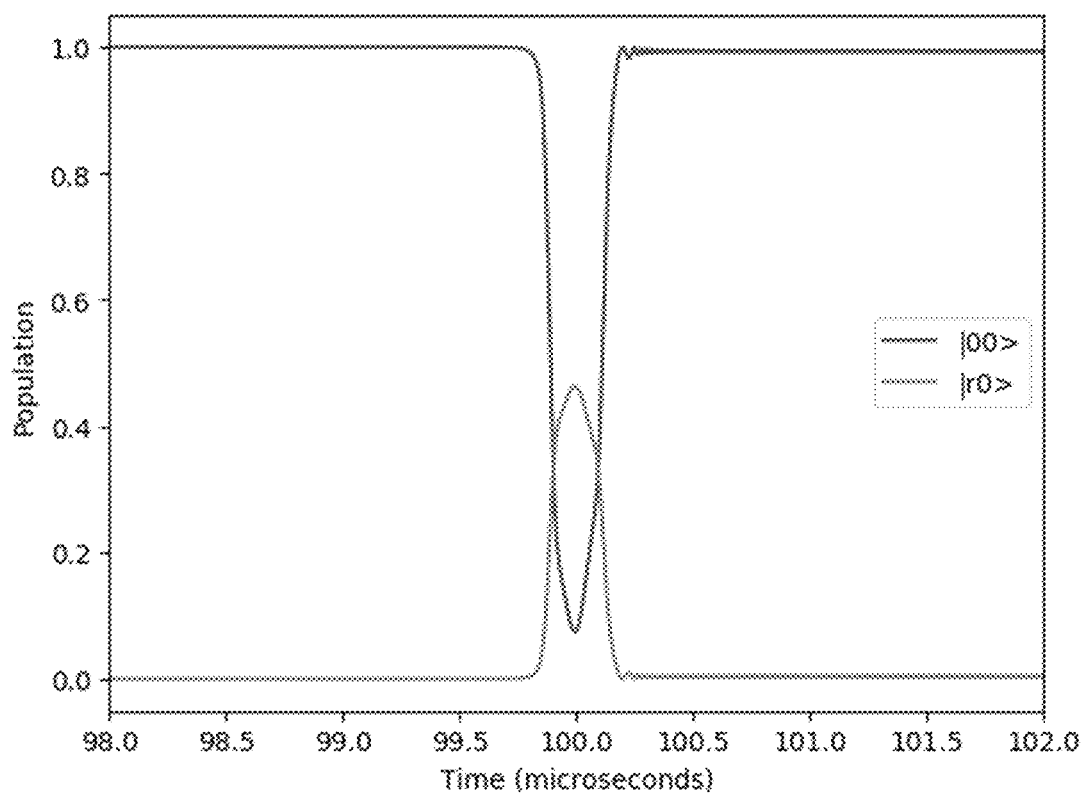
FIG. 16B shows a simulation of two atoms in an initial two-atom state with the addition of a counterdiabatic driving field applied to enact a transitionless quantum driving gate.

FIG. 16B shows a simulation of two atoms in the initial two-atom state |00⟩ with the addition of a counterdiabatic driving field applied to enact a transitionless quantum driving gate. The population remaining in Rydberg states is substantially reduced.

Counterdiabatic driving can also be used to suppress undesired, transitions at a frequency other than the drive frequency. This can be useful for driving a transition on-resonance while avoiding driving of nearby, undesired transitions. Alternatively, an off-resonant driving may be used to create a dressed state while avoiding excitation to an excited state (i.e., a diabatic transition). An example of counterdiabatic driving to suppress unwanted transitions is "derivative removal by adiabatic gate" (DRAG), as described herein.

Figure 16C:
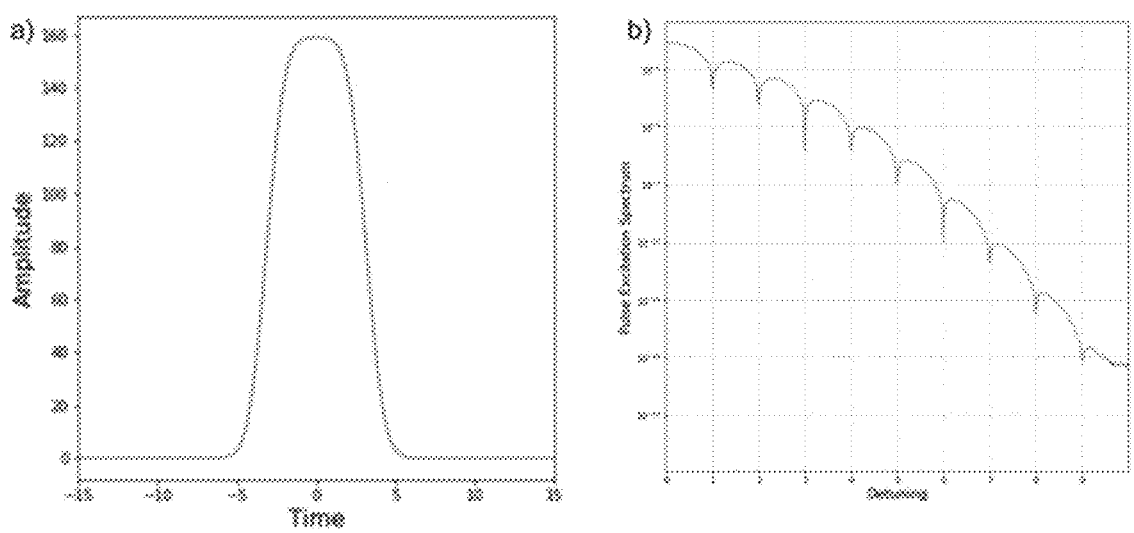
FIG. 16C shows an example of a derivative removal by adiabatic gate (DRAG) pulse.

FIG. 16C shows an example of a DRAG pulse in the time domain (a) and the frequency domain (b).

Example 11: Atom Rearrangement

Simulations were performed to determine the time requirements for performing atom rearrangement on a 7×7 array of optical trapping sites. The simulations assumed an imaging system comprising a Hamamatsu Orca-Fusion CMOS digital camera in Normal mode with an external trigger. This camera has a 2304 (fixed, horizontal)×256 (vertical) pixel region of interest. A 20 ms exposure, 4.6 ms of readout (256 vertical 'lines at 18.65 μs per line), and a 1.75 ms to 5 ms data transfer latency were assumed.

Figure 17A:
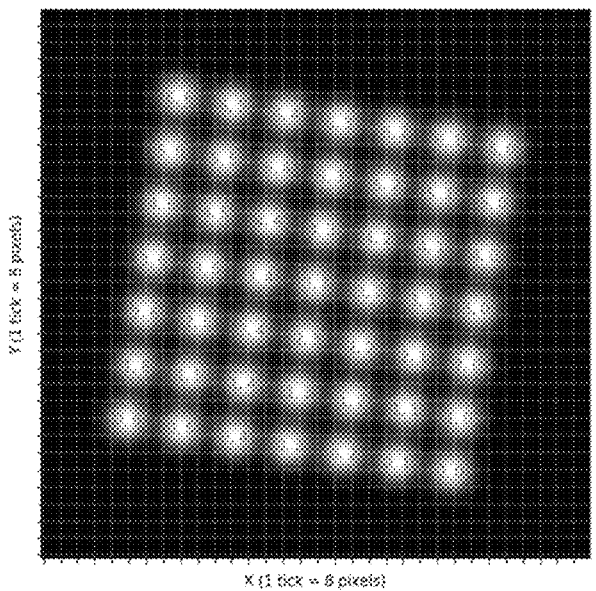
FIG. 17A shows a calibration image of a completely filled 7×7 array of optical trapping sites.

The data transferred from the camera can be sliced into a 256×256 array of 16-bit integers. To determine trap sites, we must first use of a calibration image of a fully trapped lattice (via averaging of many trap realizations). FIG. 17A shows a calibration image of a completely filled 7×7 array of optical trapping sites. The optical trapping sites are indexed by coordinates (i, j). This data was used to map from trap site to pixel position as shown in Table 1.

TABLE 1

Calibration image indexed coordinates mapped to pixel position:

(0, 0) → (191, 40)
(0, 1) → (166, 44)
.
.
(1, 3) → (120, 77)
.
.
(2, 1) → (174, 94)
(3, 5) → (77, 135)
.
.
(4, 5) → (81, 161)
.
.
(6, 2) → (165, 199)
.
.
(6, 6) → (64, 215)

Figure 17B:
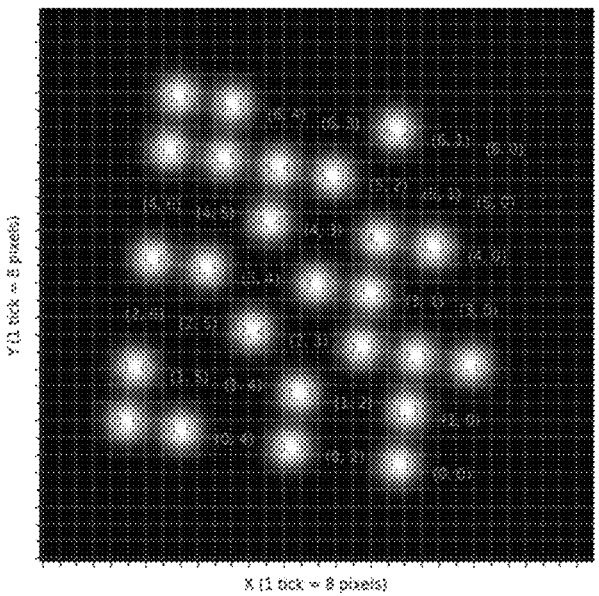
FIG. 17B shows labeling of filled and unfilled optical trapping sites in the 7×7 array.
Figure 17C:
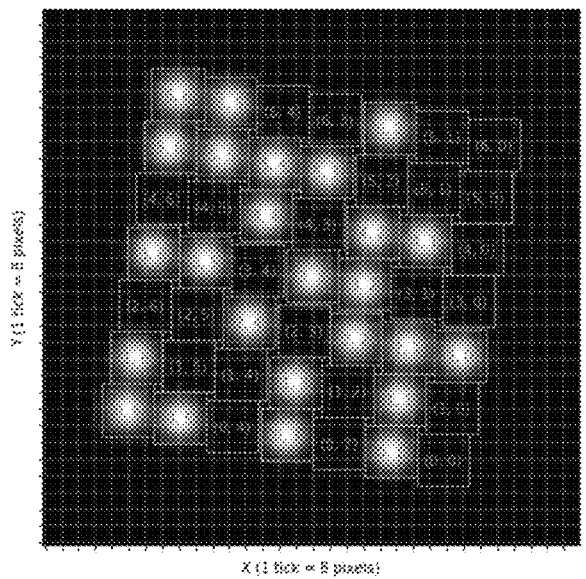
FIG. 17C shows 25×25 pixel binning around each optical trapping site in the 7×7 array.
Figure 17D:
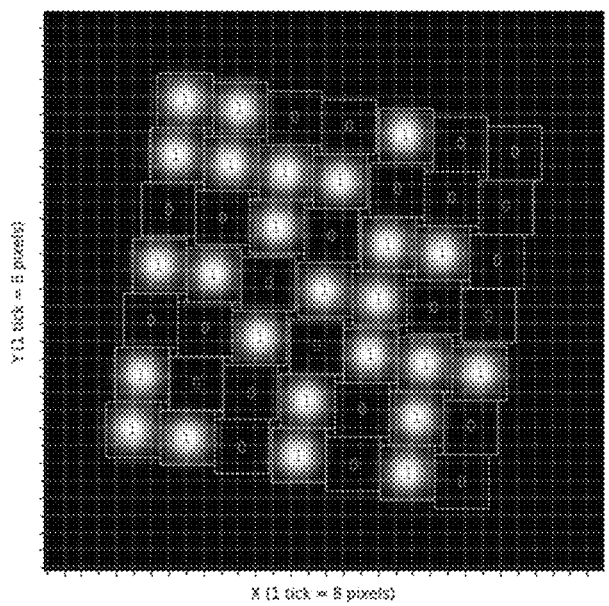
FIG. 17D shows identification of each trapping site in the 7×7 array as filled or unfilled.

FIG. 17B shows labeling of filled and unfilled optical trapping sites in the 7×7 array. Binning of pixels around each trapping site was performed. FIG. 17C shows 25×25 pixel binning around each optical trapping site in the 7×7 array. The pixels in each bin were averaged. The averaged values were compared to threshold values extracted from the calibration procedure to determine whether each optical trapping site was filled or unfilled. Filled sites were identified with a "1" while unfilled sites were identified with a "0." FIG. 17D shows identification of each trapping site in the 7×7 array as filled or unfilled. Thus, the procedure produced a 7×7 array of binary values indicated whether each site was filled or unfilled. The total processing time to assign the array of binary values was performed in less than 0.5 ms.

Once the filled and unfilled sites were located, the next step was to determine the moves to fill untrapped sites. This is a combinatorial optimization problem classified as bipartite matching. It can be solved by setting up an adjacency matrix from which the optimal matching can be efficiently found with algorithms such as the Hungarian matching algorithm described herein. An adjacency matrix $d_{i,j}$ was constructed, where the rows i are indexed by the target sites in an N×N active area and the columns are indexed by the available sites in the full M×M lattice. For instance, in the case of a 7×7 array (M=7), atoms may be moved to a 5×5 computationally active area with (N=5). Table 2 shows the entries in the adjacency matrix

TABLE 2

Adjacency matrix for a 7 × 7 array with 5 × 5 computationally active area

| (row, col) | (1, 0) | (3, 0) | (5, 0) | (6, 0) | (1, 1) | ... |
|---|---|---|---|---|---|---|
| (1, 1) | Distance from (1, 0) to (1, 1) | ... | ... | ... | ... | ... |
| (1, 2) | ... | ... | ... | ... | ... | ... |
| (1, 3) | ... | ... | Distance from (5, 0) to (1, 3) | ... | ... | ... |
| (2, 1) | ... | Distance from (3, 0) to (2, 1) | ... | ... | ... | ... |
| (2, 2) | ... | ... | ... | ... | Distance from (1, 1) to (2, 2) | ... |
| . | . | . | . | . | . | . |
| . | . | . | . | . | . | . |
| . | . | . | . | . | . | . |

Figure 17E:
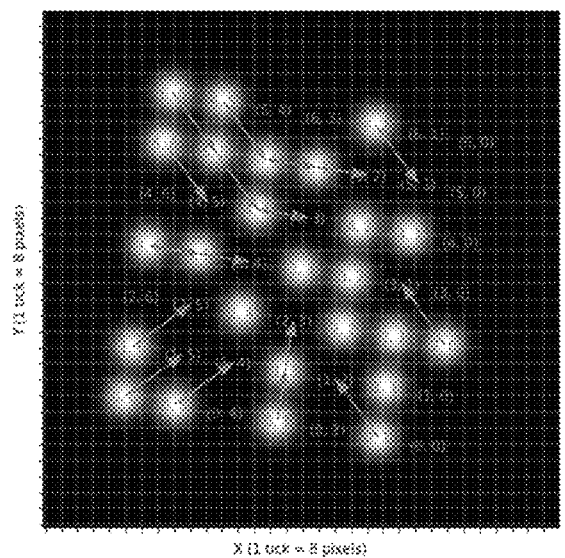
FIG. 17E shows moves from filled to unfilled optical trapping sites that avoid collisions between atoms.

When the distance metric is the square distance between target ($i_{target}$, $j_{target}$) and filled site ($i_{filled}$, $j_{filled}$), the resulting matching produces collision-free moves of atoms from filled optical trapping sites to unfilled optical trapping sites. FIG. 17E shows moves from filled to unfilled optical trapping sites that avoid collisions between atoms.

The moves were separated into independent subsets and time-ordered to allow for easy parallelization, as shown in Table 3 below. The process of determining moves took approximately 8 ms.

TABLE 3

Time-ordered list of atom moves for a 7 × 7 atom array (1, 2) ← (0, 1)
(1, 4) ← (0, 5)
(1, 5) ← (0, 6)
(2, 3) ← (1, 3) ← (0, 3)
(2, 5) ← (1,6)
(3, 1) ← (2, 0)
(3, 4) ← (3, 5) ← (3, 6)
(4, 3) ← (4, 4) ← (5, 5) ← (6, 6)
(4, 5) ← (5, 6)
(5, 1) ← (6, 2)
(5, 2) ← (5, 3) ← (5, 4) ← (6, 5)

Data transfer to the AWG requires less than 1 ms. The single greatest latency is introduced while mapping the set of moves to a set of waveforms in the AWG. A single move may require 0.3 ms ramp up time, 0.1 ms/μm of movement, and 0.3 ms of ramp down time. Assuming a 3 μm spacing between optical trapping sites and allowing moves only to neighboring sites, each move requires approximately 1 ms. Numerous simulations of a 7×7 array resulted in a maximum of 34 moves, requiring 34 ms to program the AWG.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for performing a non-classical computation, comprising:
   a plurality of trapping sites configured to trap a plurality of atoms, which plurality of atoms correspond to a plurality of qubits;
   a light unit configured to provide a first light and a second light;
   a first optical modulator configured to receive said first light and direct said first light along a plurality of first light paths to at least a subset of trapping sites of said plurality of trapping sites, said at least said subset of trapping sites comprising at least two trapping sites;
   a second optical modulator configured to receive said second light and direct said second light along a plurality of second light paths to said at least said subset of trapping sites, wherein said plurality of first light paths comprise one or more first positive-order light paths and one or more first negative-order light paths and said plurality of second light paths comprise one or more second positive-order light paths and one or more second negative-order light paths; and
   a controller operably coupled to said light unit, wherein said controller is configured to direct said light unit to emit said first light and to emit said second light to implement one or more qubit operations on at least a subset of atoms of said plurality of atoms trapped at said at least said subset of trapping sites, said at least said subset of atoms comprising at least two atoms.

2. The system of claim 1, wherein said first optical modulator and said second optical modulator are oriented such that a frequency difference between said first light and said second light is substantially constant at each trapping site of said at least said subset of trapping sites.

3. The system of claim 1, wherein said first positive-order light paths and said second negative-order light paths each terminate at the same trapping sites of said at least said subset of trapping sites or wherein said first negative-order light paths and said second positive-order light paths each terminate at the same trapping sites of said at least said subset of trapping sites.

4. The system of claim 3, wherein said first positive-order light paths are substantially parallel with said second negative-order light paths or wherein said first negative-order light paths are substantially parallel with said second positive-order light paths.

5. The system of claim 1, wherein said first positive-order light paths and said second positive-order light paths each terminate at the same trapping sites of said at least said subset of trapping sites or wherein said first negative-order light paths and said second negative-order light paths each terminate at the same trapping sites of said at least said subset of trapping sites.

6. The system of claim 1, wherein said first optical modulator or said second optical modulator comprises an acousto-optic deflector (AOD).

7. The system of claim 6, wherein said first optical modulator or said second optical modulator comprises a two-dimensional (2D) AOD.

8. The system of claim 6, wherein said first optical modulator or said second optical modulator comprises a pair of crossed one-dimensional (1D) AODs.

9. The system of claim 1, wherein said one or more qubit operations comprise one or more single-qubit operations.

10. The system of claim 1, wherein said one or more qubit operations comprise one or more two-qubit operations.

11. The system of claim 1, wherein said one or more qubit operations comprise multi-qubit operations.

12. The system of claim 1, wherein a first wavelength of said first light is different from a second wavelength of said second light.

13. The system of claim 1, wherein a first wavelength of said first light is the same as a second wavelength of said second light.

14. The system of claim 1, wherein said one or more qubit operations comprise one or more two-photon excitations of said at least said subset of atoms.

15. The system of claim 1, wherein said one or more qubit operations comprise one or more Rydberg excitations of said at least said subset of atoms.

16. The system of claim 1, wherein said first light and said second light arrive at said at least said at least said subset of trapping sites substantially simultaneously.

17. The system of claim 1, wherein said first light and said second light overlap at each trapping site of said at least said subset of trapping sites.

18. The system of claim 1, wherein said plurality of atoms comprises a 2D array of atoms.

19. The system of claim 1, wherein said plurality of atoms comprises a three-dimensional (3D) array of atoms.

20. The system of claim 1, further comprising one or more phase modulators or wavelength modulators configured to modulate a phase or a wavelength of said first light or said second light.

21. The system of claim 20, wherein said one or more phase modulators or wavelength modulators are located between said light unit and said first optical modulator or between said light unit and said second optical modulator.

22. The system of claim 20, wherein said one or more phase modulators or wavelength modulators comprise one or more members selected from the group consisting of: electro-optic modulators (EOMs) and acousto-optic modulators (AOMs).

23. The system of claim 1, wherein said light unit comprises a single light source configured to emit light and one or more beamsplitters configured to receive said light and to split said light into said first light and said second light.

24. The system of claim 1, wherein said light unit comprises a first light source configured to emit said first light and a second light source configured to emit said second light.

* * * * *